US008383054B2

(12) United States Patent
Tonkovich et al.

(10) Patent No.: US 8,383,054 B2
(45) Date of Patent: Feb. 26, 2013

(54) INTEGRATED COMBUSTION REACTORS AND METHODS OF CONDUCTING SIMULTANEOUS ENDOTHERMIC AND EXOTHERMIC REACTIONS

(75) Inventors: Anna Lee Tonkovich, Marysville, OH (US); Gary Roberts, West Richland, WA (US); Sean P. Fitzgerald, Columbus, OH (US); Paul W. Neagle, Westerville, OH (US); Dongming Qiu, Dublin, OH (US); Matthew B. Schmidt, Columbus, OH (US); Steven T. Perry, Galloway, OH (US); David J. Hesse, Columbus, OH (US); Robert J. Luzenski, Marysville, OH (US); G. Bradley Chadwell, Reynoldsburg, OH (US); Ying Peng, Columbus, OH (US); James A. Mathias, Columbus, OH (US); Nathan P. Gano, Dublin, OH (US); Richard Q. Long, Columbus, OH (US); Wm. Allen Rogers, Marysville, OH (US); Ravi Arora, Dublin, OH (US); Wayne W. Simmons, Dublin, OH (US); Barry L. Yang, Dublin, OH (US); David J. Kuhlmann, Powell, OH (US); Yong Wang, Richland, WA (US); Thomas D. Yuschak, Dublin, OH (US); Thomas Forte, Columbus, OH (US); John Arthur Monahan, Westerville, OH (US); Robert Jetter, Pebble Beach, CA (US)

(73) Assignee: Velocys, Inc., Plain City, OH (US)

( * ) Notice: Subject to any disclaimer, the term of this patent is extended or adjusted under 35 U.S.C. 154(b) by 0 days.

(21) Appl. No.: 13/093,832

(22) Filed: Apr. 25, 2011

(65) Prior Publication Data

US 2011/0300039 A1 Dec. 8, 2011

Related U.S. Application Data

(60) Continuation of application No. 11/825,286, filed on Jul. 3, 2007, now Pat. No. 7,931,875, which is a division of application No. 10/222,196, filed on Aug. 15, 2002, now Pat. No. 7,250,151.

(51) Int. Cl.
  *B01J 8/02* (2006.01)
  *B01J 35/02* (2006.01)
  *B01J 19/00* (2006.01)
  *B01J 8/00* (2006.01)
  *B01J 8/04* (2006.01)

(52) U.S. Cl. ........ 422/211; 422/129; 422/130; 422/198; 422/600; 422/601; 422/602; 422/603; 422/630; 422/631; 422/632; 422/633; 422/634

(58) Field of Classification Search .................. 422/129, 422/130, 600–603, 630–634, 198, 211
See application file for complete search history.

(56) References Cited

U.S. PATENT DOCUMENTS 3,607,130 A 9/1971 Worley et al.
(Continued)

FOREIGN PATENT DOCUMENTS

DE 19841993 9/2000
(Continued)

OTHER PUBLICATIONS

TeGrotenhuis et al.; "Optimizing Microchannel Reactors by Trading-off Equilibrium and Reaction Kinetics through Temperature Management," Prepared for Presentation at AICHE Spring National Meeting, Mar. 10-14, 2002.
(Continued)

*Primary Examiner* — Walter D Griffin
*Assistant Examiner* — Natasha Young
(74) *Attorney, Agent, or Firm* — Frank Rosenberg

(57) ABSTRACT

Integrated Combustion Reactors (ICRs) and methods of making ICRs are described in which combustion chambers (or channels) are in direct thermal contact to reaction chambers for an endothermic reaction. Particular reactor designs are also described. Processes of conducting reactions in integrated combustion reactors are described and results presented. Some of these processes are characterized by unexpected and superior results, and/or results that can not be achieved with any prior art devices.

18 Claims, 35 Drawing Sheets

U.S. PATENT DOCUMENTS

| | | | |
|---|---|---|---|
| 4,522,894 | A | 6/1985 | Hwang et al. |
| 4,690,702 | A | 9/1987 | Paradowski et al. |
| 4,739,124 | A | 4/1988 | Ward |
| 4,760,210 | A | 7/1988 | Sweeney |
| 4,940,826 | A | 7/1990 | Font Freide et al. |
| 5,015,444 | A | 5/1991 | Watanabe et al. |
| 5,114,450 | A | 5/1992 | Paradowski et al. |
| 5,167,865 | A | 12/1992 | Fukuhara et al. |
| 5,219,535 | A | 6/1993 | Giacobbe et al. |
| 5,242,574 | A | 9/1993 | Broutin et al. |
| 5,611,214 | A | 3/1997 | Wegeng et al. |
| 5,674,301 | A | 10/1997 | Sakai et al. |
| 5,689,966 | A | 11/1997 | Zess et al. |
| 5,733,347 | A | 3/1998 | Lesieur |
| 5,752,995 | A | 5/1998 | Kang |
| 5,775,114 | A | 7/1998 | Ji |
| 5,811,062 | A | 9/1998 | Wegeng et al. |
| 5,935,489 | A | 8/1999 | Hershkowitz et al. |
| 5,997,826 | A | 12/1999 | Lodeng et al. |
| 6,056,932 | A | 5/2000 | von Hippel et al. |
| 6,096,286 | A | 8/2000 | Autenrieth |
| 6,117,578 | A | 9/2000 | Lesieur |
| 6,126,723 | A | 10/2000 | Drost et al. |
| 6,129,973 | A | 10/2000 | Martin et al. |
| 6,166,283 | A | 12/2000 | Bharadwaj |
| 6,190,624 | B1 * | 2/2001 | Romatier ............... 422/200 |
| 6,192,596 | B1 | 2/2001 | Bennett et al. |
| 6,200,536 | B1 | 3/2001 | Tonkovich et al. |
| 6,274,113 | B1 | 8/2001 | Heyse et al. |
| 6,313,393 | B1 | 11/2001 | Drost |
| 6,315,977 | B1 | 11/2001 | Cantacuzene |
| 6,352,577 | B1 | 3/2002 | Martin et al. |
| 6,365,543 | B1 | 4/2002 | Schmidt et al. |
| 6,415,860 | B1 | 7/2002 | Kelly et al. |
| 6,488,838 | B1 | 12/2002 | Tonkovich et al. |
| 6,515,146 | B1 | 2/2003 | Perregaard et al. |
| 6,540,975 | B2 | 4/2003 | Tonkovich et al. |
| 6,566,573 | B1 | 5/2003 | Bharadwaj |
| 6,616,909 | B1 | 9/2003 | Tonkovich |
| 6,709,640 | B1 | 3/2004 | Romatier et al. |
| 6,756,340 | B2 | 6/2004 | Voskoboynikov et al. |
| 6,756,515 | B2 | 6/2004 | Rende et al. |
| 6,946,113 | B2 | 9/2005 | Seaba et al. |
| 6,969,506 | B2 | 11/2005 | Tonkovich et al. |
| 7,220,699 | B2 | 5/2007 | Chellappa |
| 7,250,151 | B2 | 7/2007 | Tonkovich et al. |
| 7,288,231 | B2 | 10/2007 | Tonkovich et al. |
| 7,931,875 | B2 * | 4/2011 | Tonkovich et al. ........ 422/211 |
| 2001/0018140 | A1 | 8/2001 | Hermann et al. |
| 2002/0071797 | A1 | 6/2002 | Loffler et al. |
| 2002/0106596 | A1 * | 8/2002 | Hermann et al. ........... 431/12 |
| 2003/0007904 | A1 | 1/2003 | Tonkovich et al. |
| 2003/0110693 | A1 | 6/2003 | Drnevich et al. |
| 2004/0034266 | A1 | 2/2004 | Brophy et al. |
| 2004/0220434 | A1 | 11/2004 | Brophy et al. |
| 2005/0214202 | A1 | 9/2005 | Weil et al. |

FOREIGN PATENT DOCUMENTS

| | | |
|---|---|---|
| EP | 0984500 | 3/2000 |
| WO | WO 00/06295 A1 * | 2/2000 |
| WO | WO 01/12312 A2 * | 2/2001 |
| WO | WO 02/28769 | 4/2002 |
| WO | WO02064248 | 8/2002 |

OTHER PUBLICATIONS

Srinivasan et al.; "Micromachined Reactors for Catalytic Partial Oxidation Reactions"; AIChE Journal; Nov. 1997; vol. 43, No. 11.

Office Action in Canadian Patent Application No. 2,495,335, mailed Dec. 2010.

Office Action in Japanese Patent Application No. 2004-539806, mailed Sep. 2008.

* cited by examiner

P = process product fluid
R = process reactant fluid
F = combustion fuel
E = combustion exhaust
A = combustion air

| Shim # | Description (thickness, mm) | Shim # | Description (thickness, mm) |
|---|---|---|---|
| 1. | End Plate (6.35) | 39. | Endothermic Reaction (0.25) |
| 2-3. | Sacrificial Shims (0.51 each) | 40. | Welded Wall/Product (0.25 each.) |
| 4. | Wall (6.35) | 41. | Endothermic Product (0.41) |
| 5. | Endothermic Product (0.36) | 42. | Welded Product/Wall (0.25 each) |
| 6. | U-turn (0.51) | 43. | Endothermic Reaction (0.25) |
| 7. | Endothermic Reaction (0.25) | 44. | Catalyst Stop (0.25) |
| 8. | Catalyst Stop (0.25) | 45-46. | Solid Wall (0.51 each) |
| 9-10. | Solid Wall (0.51 each) | 47. | Fuel (0.64) |
| 11. | Fuel (0.64) | 48. | Welded Jet/Air/Wall (0.25/0.64/0.25) |
| 12. | Welded Jet/Air/Wall (0.25/0.64/0.25) | 49-51. | Exhaust (0.36/0.25/0.36) |
| 13-15. | Exhaust (0.36/0.25/0.36) | 52. | Welded Wall/Air/Jet (0.25/0.64/0.25) |
| 16. | Welded Wall/Air/Jet (0.25/0.64/0.25) | 53. | Fuel (0.64) |
| 17. | Fuel (0.64) | 54-55. | Solid Wall (0.51 each) |
| 18-19. | Solid Wall (0.51 each) | 56. | Catalyst Stop (0.25) |
| 20. | Catalyst Stop (0.25) | 57. | Endothermic Reaction (0.25) |
| 21. | Endothermic Reaction (0.25) | 58. | U-turn (0.51) |
| 22. | Welded Wall/Product (0.25 each.) | 59. | Endothermic Product (0.36) |
| 23. | Endothermic Product (0.41) | 69. | Wall (6.35) |
| 24. | Welded Product/Wall (0.25 each) | 61-62. | Sacrificial Shims (0.51 each) |
| 25. | Endothermic Reaction (0.25) | 63. | End Plate (6.35) |
| 26. | Catalyst Stop (0.25) | | |
| 27-28. | Solid Wall (0.51 each) | | |
| 29. | Fuel (0.64) | | |
| 30. | Welded Jet/Air/Wall (0.25/0.64/0.25) | | |
| 31-33. | Exhaust (0.36/0.25/0.36) | | |
| 34. | Welded Wall/Air/Jet (0.25/0.64/0.25) | | |
| 35. | Fuel (0.64) | | |
| 36-37. | Solid Wall (0.51 each) | | |
| 38. | Catalyst Stop (0.25) | | |

Fig. 7

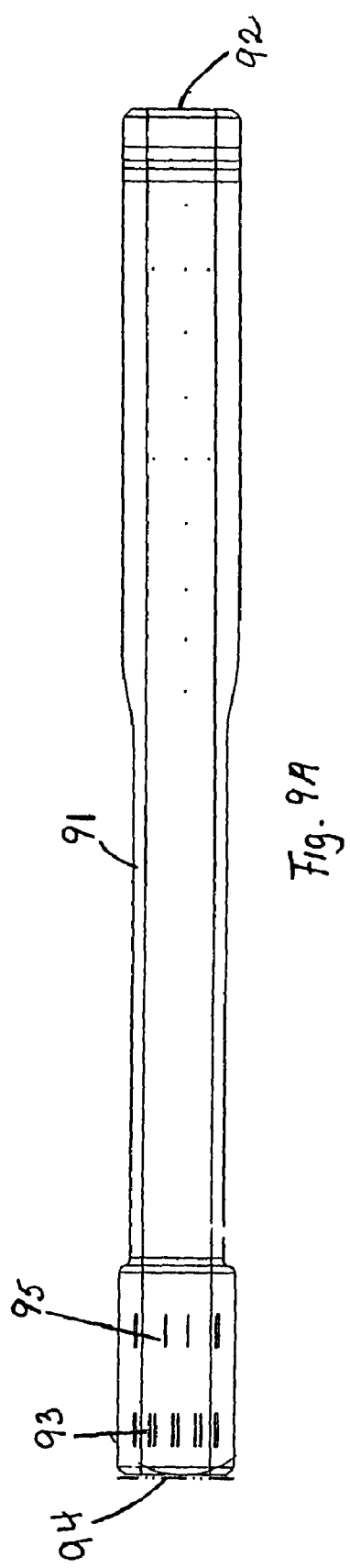
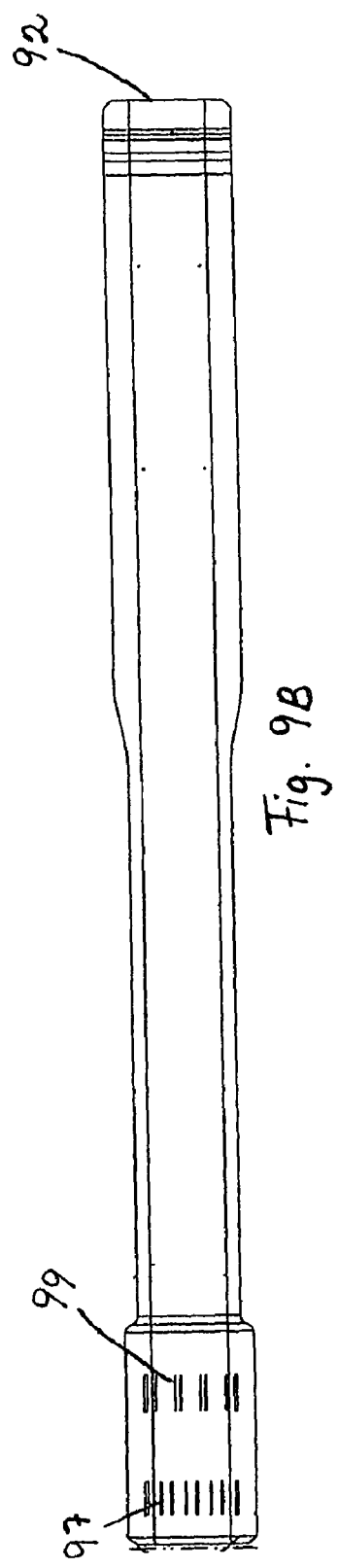
Fig. 9A
Fig. 9B

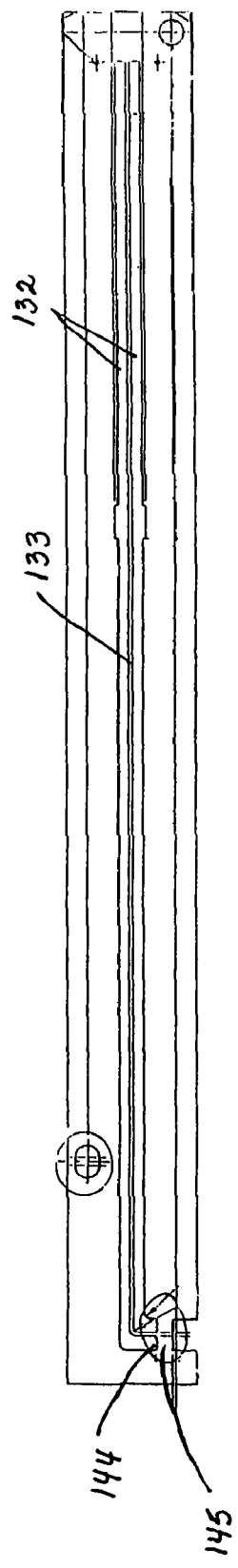
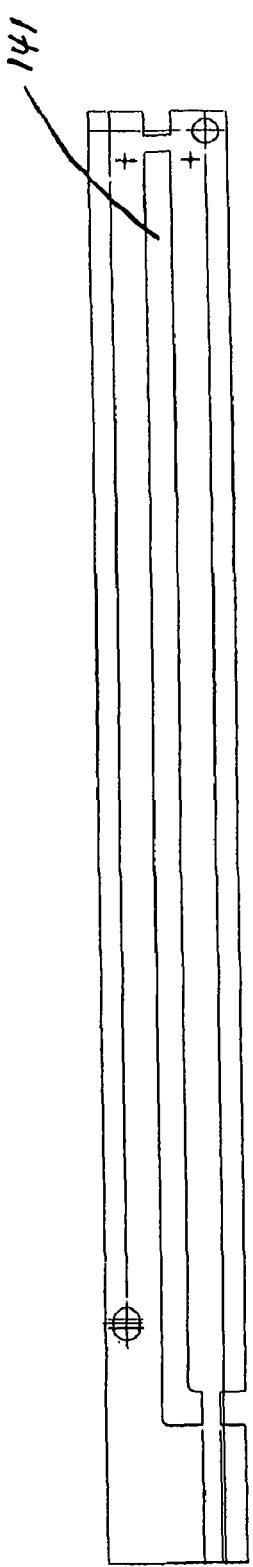
Fig. 13
Fig. 14

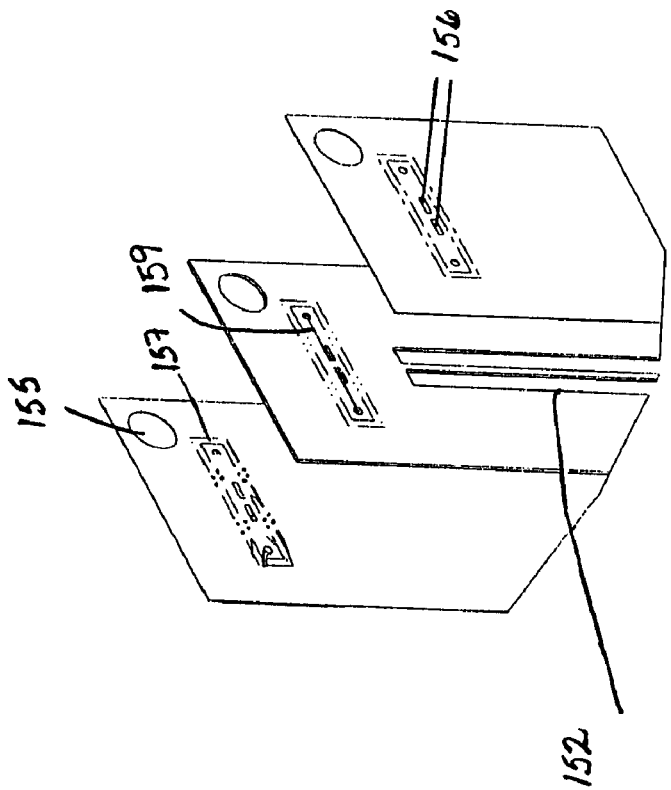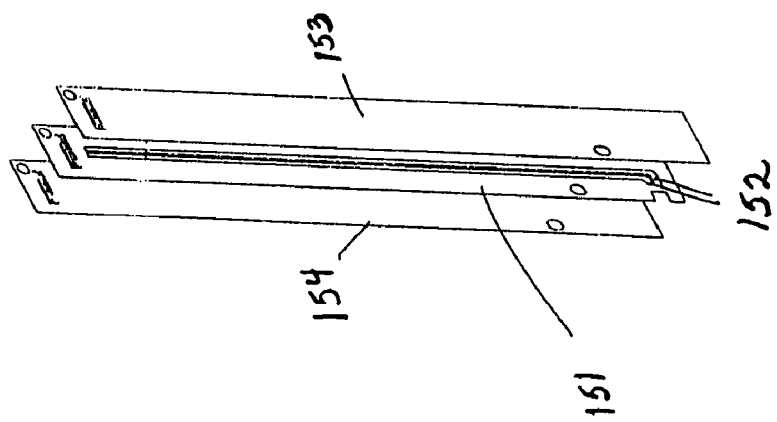
Fig. 15

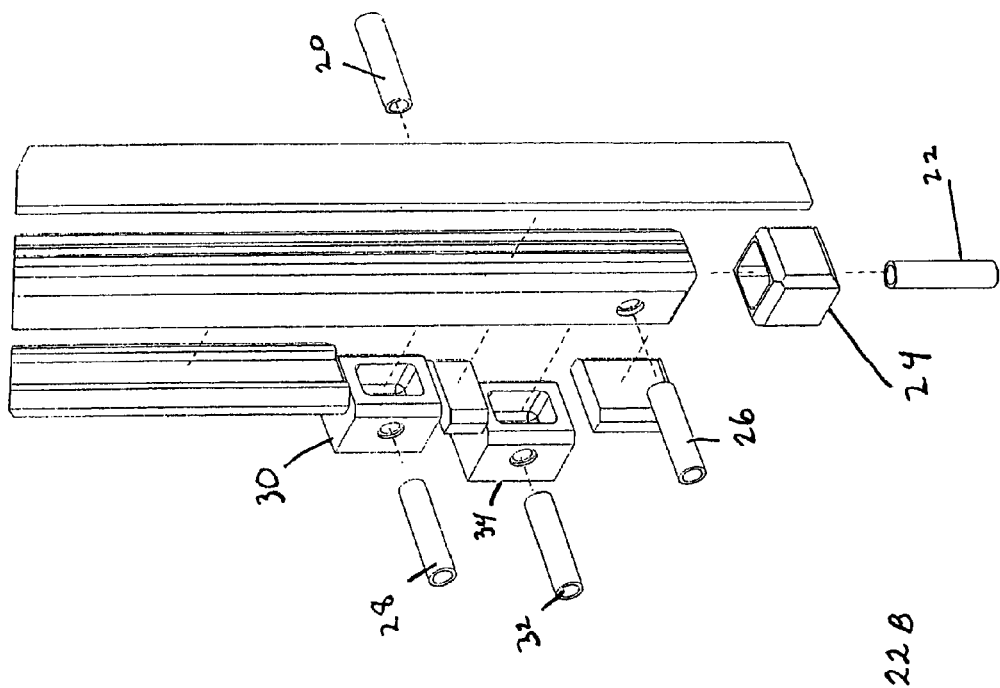
Fig. 22B
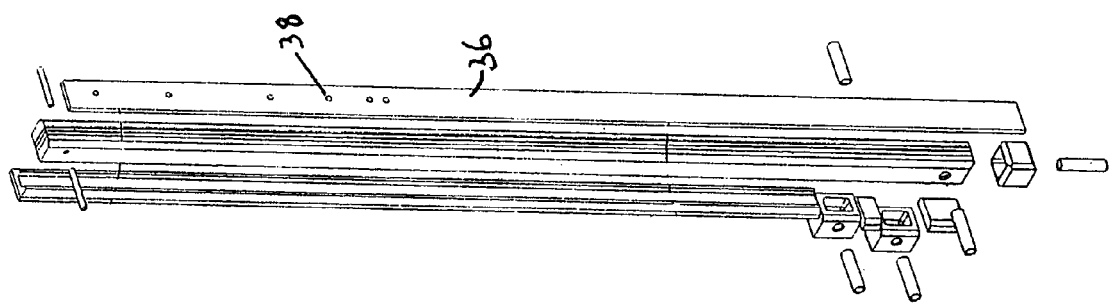

INTEGRATED COMBUSTION REACTORS AND METHODS OF CONDUCTING SIMULTANEOUS ENDOTHERMIC AND EXOTHERMIC REACTIONS

RELATED APPLICATIONS

This application is a continuation of U.S. patent application Ser. No. 11/825,286, filed Jul. 3, 2007, now U.S. Pat. No. 7,931,875 issued Apr. 26, 2011, which was a divisional of U.S. patent application Ser. No. 10/222,196, filed Aug. 15, 2002, now U.S. Pat. No. 7,250,151 issued Jul. 31, 2007.

OTHER APPLICATIONS

The invention may be further understood by reference to U.S. Pat. Nos. 7,014,835, 6,622,519 and 6,969,505, all of which are incorporated herein by reference.

INTRODUCTION

Currently, endothermic reactions performed in microreactors are driven using heat from an external source, such as the effluent from an external combustor. In doing so, the temperature of the gas stream providing the heat is limited by constraints imposed by the materials of construction. For example, a typical microreactor constructed from Inconel 625 might be limited in use for gas service to temperatures of ~1050° C. or less. Practically, this means that the effluent from an external combustor must be diluted with cool gas (i.e. excess air) to bring the gas temperature down to meet material temperature constraints. This increases the total gas flow rate, raising blower/compressor costs. Moreover, heating the gas stream externally introduces heat losses (associated with delivery of the hot gas to the microreactor) and expensive high temperature materials to connect the combustor to the microreactor.

On the other hand, an integrated combustor can produce heat for the reaction in close proximity to the reaction zone, thus reducing heat losses and increasing efficiency. Because traditional combustion catalysts are not stable at high temperatures (above ~1200° C.) due to noble metal sintering, the integrated combustor must remove heat at a rate sufficient to keep local temperatures at the catalyst surface below this level or risk rapid catalyst deactivation.

SUMMARY OF THE INVENTION

In an integrated reactor, combustion/heat generation should occur in close proximity to the endothermic reaction. Preferably, an exothermic reaction occurs in microchannels that are interleaved with microchannels in which there is an endothermic reaction. Co-flow of endothermic and exothermic reaction streams is preferred; however, cross-flow or countercurrent flow are also options. The heat of an exothermic reaction is conducted from the exothermic reaction to the endothermic reaction catalyst, where it drives the endothermic reaction.

Preferably an exothermic reaction channel and/or endothermic reaction channel in the integrated reactors is a microchannel—that is, a channel having at least one dimension of 2 millimeter (mm) or less. The use of channels having a minimum dimension of more than 2 mm may be less effective since heat and mass transfer limitations may be magnified. An integrated combustor can use the high surface area of reactor microchannels to remove heat as it is produced, thus keeping microreactor components from exceeding material temperature constraints while combusting with much less excess air (or diluent) than would be necessary for an external combustor.

In one aspect, the invention provides a method of conducting an endothermic reaction in an integrated combustion reaction, comprising: passing an endothermic reaction composition into at least one endothermic reaction chamber, passing a fuel and an oxidant into at least one exothermic reaction chamber wherein the fuel and oxidant each have a contact time in the combustion chamber of 50 ms or less, wherein the exothermic reaction chamber comprises at least one exothermic reaction chamber wall that is adjacent at least one endothermic reaction chamber, wherein the endothermic reaction chamber comprises an endothermic reaction catalyst in contact with at least the at least one endothermic reaction chamber wall that is adjacent at least one exothermic reaction chamber, and transferring heat from the at least one exothermic reaction chamber into the at least one endothermic reaction chamber at a rate of one or more of the following: at least 0.6 W/cc of combustion chamber volume, or at least 1 W/cm$^2$ as based on the internal surface area of the endothermic reaction chamber. The heat flux can be measured based on either a single exothermic reaction chamber or multiple chambers in a multichamber device. So that, either case is within this aspect of the invention. In various preferred embodiments of the inventive methods and devices, the exothermic reaction chamber has an internal dimension of less than 2 mm, more preferably less than 1.5 mm, and in some embodiments, less than 1 mm; volumetric heat flux, based on reaction chamber volume of greater than 10 W/cc, more preferably greater than 100 W/cc, and still more preferably greater than 500 W/cc. Contact times in the exothermic and/or endothermic reaction chambers are preferably less than 500 ms, more preferably 100 ms or less, still more preferably 50 ms or less, more preferably 25 ms or less and still more preferably 10 ms or less. Area heat flux (for the area of either reaction chamber is preferably 1 W/cm$^2$ or more, preferably 5 W/cm$^2$ or more, more preferably 10 W/cm$^2$ or more, and still more preferably 20 W/cm$^2$ or more.

In another aspect, the invention provides a method of steam reforming in an integrated combustion reactor, comprising: step a) passing steam and hydrocarbon into at least one endothermic reaction chamber wherein the steam to carbon ratio is less than 3:1 with a pressure drop through the endothermic reaction chamber of less than 900 psig (6000 kPa), step b) passing a fuel and an oxidant into at least one exothermic reaction chamber wherein the fuel and oxidant each have a contact time in the combustion chamber of 100 ms or less, wherein the exothermic reaction chamber comprises at least one exothermic reaction chamber wall that is adjacent at least one endothermic reaction chamber, wherein the endothermic reaction chamber comprises an endothermic reaction catalyst in contact with at least the at least one endothermic reaction chamber wall that is adjacent at least one exothermic reaction chamber, step c) converting the steam and hydrocarbon to form CO and H$_2$ such that the at least one endothermic reaction chamber has an output demonstrating a conversion of at least 50% of the hydrocarbon with a selectivity to CO of at least 50%; and simultaneously and continuously conducting steps a, b and c for at least 100 hours with less than a 2 psi increase in pressure drop. Other preferred levels of steam to carbon ratio are less than: 2.5:1; 2:1; and 1.5:1. In another embodiment, a device is characterized by operation for 100 or 500 hours and then cut open to reveal less than 0.1 gram of coke per each kilogram of methane fuel processed.

In another aspect, the invention provides a method of conducting simultaneous exothermic and endothermic reactions in an integrated combustion reactor, comprising: passing an endothermic reaction composition into at least one endothermic reaction chamber, passing a fuel and an oxidant into at least one exothermic reaction chamber wherein the fuel and oxidant each have a contact time in the combustion chamber of 100 ms or less, wherein the oxidant is present in less than a 50% excess needed to completely oxidize the fuel, and converting the fuel and air to products; and passing the products out of the integrated combustion reactor, wherein less than 2500 ppm CO; wherein the exothermic reaction chamber comprises at least one exothermic reaction chamber wall that is adjacent at least one endothermic reaction chamber, wherein the endothermic reaction chamber comprises an endothermic reaction catalyst in contact with at least the at least one endothermic reaction chamber wall that is adjacent at least one exothermic reaction chamber. Alternatively to the low level of CO, or in addition to, where the oxidant is air, the products have less than 100 ppm $NO_x$. The level of excess oxidant is the total excess—in other words, this level of conversion does not include any subsequent treatment steps in which additional oxidant is added in a treatment chamber (for example, a catalytic convertor). Other levels of NOx include: less than 100 ppm, less than 50 ppm, 20 ppm or less, 10 ppm or less and 5 ppm or less.

The invention further provides an integrated combustor, comprising: at least one exothermic reaction microchannel; wherein the exothermic reaction microchannel comprises at least one exothermic reaction microchannel wall that is adjacent at least one endothermic reaction microchannel, wherein the endothermic reaction microchannel comprises an endothermic reaction catalyst in contact with at least the at least one endothermic reaction microchannel wall that is adjacent at least one exothermic reaction microchannel; and further characterized by one or more of the preferred properties when tested using a Heat Flux Measurement Test as described herein.

The invention also provides a layered integrated combustor, comprising: an outer exothermic reaction layer having a first volume; a first combustor layer adjacent to the outer exothermic reaction layer, and disposed between the outer exothermic layer and an inner endothermic reaction layer; the inner endothermic reaction layer having a second volume and disposed between the first combustor layer and a second combustor layer; and the second combustor layer is disposed adjacent the inner endothermic reaction layer; wherein the first volume is 20 to 80% less than the second volume. More preferably, the first volume is 45 to 55% less than the second volume. One nonlimiting example of this ICR is the bonded ICR design described herein.

The invention further provides a method of conducting simultaneous exothermic and endothermic reactions, comprising: flowing a fuel into a combustion chamber; adding an oxidant to the combustion chamber such that the oxidant oxidizes the fuel and temperature in the combustion chamber increases from the front of the combustion chamber to the back; providing an endothermic reaction composition in an endothermic reaction chamber that is disposed adjacent to the combustion chamber, wherein the endothermic reaction chamber and the combustion chamber are separated by a thermally conductive wall; wherein the endothermic reaction composition endothermically reacts to form products. Where not otherwise specified, the front of the combustion chamber is defined as where the flow of fuel contacts a combustion catalyst and an oxidant, and the back of the combustion chamber is defined as the last part of the reaction chamber that contains a combustion catalyst and is in direct thermal contact (i.e., through a wall) with an endothermic reaction chamber.

In the bonded ICR design described herein, the exhaust section is not in direct thermal contact with the endothermic reaction chamber. Alternatively, the back of the combustion chamber can be defined as where 95% of the thermal capacity of the fuel and oxidant has been expended.

The invention also provides a method of conducting an endothermic reaction, comprising: passing a fuel into a first fuel channel and, simultaneously, passing a fuel into a second fuel channel; adding an oxidant in a distributed fashion along the lengths of the first and second fuel channels; passing an endothermic reaction composition through an endothermic reaction channel, said channel having a preheat section connected to an endothermic reaction chamber that contains a catalyst; oxidizing the fuel in the first fuel channel to generate heat and form a first hot exhaust stream, and, simultaneously, oxidizing the fuel in the second fuel channel to generate heat and form a second hot exhaust stream; combining the first exhaust stream and the second exhaust stream in one exhaust channel; transferring a portion of the heat generated in the first fuel channel through a wall and into the endothermic reaction chamber; transferring heat from the first exhaust stream and the second exhaust stream through a wall of the exhaust channel and into the first fuel channel; reacting the endothermic reaction composition in the endothermic reaction chamber to form heated, endothermic reaction products; flowing the heated endothermic reaction products into a product channel; transferring heat from the heated endothermic reaction products in the product channel through a wall and into the preheat section of the endothermic reaction channel.

The invention further provides an integrated combustion reactor, comprising: a combustion microchannel comprising a combustion catalyst; an endothermic reaction microchannel adjacent the combustion microchannel and comprising an endothermic reaction catalyst, the endothermic reaction catalyst having a length, in the direction of flow, of at least 10 cm; and a wall separating the combustion catalyst and the endothermic reaction catalyst. The long reaction catalyst leads to unexpected results of low contact time and high heat flux. The invention also includes methods of conducting endothermic reaction through this ICR, preferably with a low pressure drop. This aspect of the invention is superior over shorter, channels with longer contact times because of a reduced thermal gradient and increased device lifetime. In some preferred embodiments, the endothermic reaction microchannel has a height (the dimension perpendicular to flow and defining the shortest distance from the center of the endothermic reaction microchannel to the combustion microchannel) of 0.5 mm or less. In some preferred embodiments, a gap exists between a wall of the endothermic reaction microchannel and a surface of the endothermic reaction catalyst, and the gap is preferably 8 to 12 mil (0.2 to 0.3 mm)

In another aspect, the invention provides an ICR, comprising: a stack of at least two microchannels wherein at least one of the at least two microchannels comprises a removable catalyst insert and a catalyst door. The invention also includes methods of salvaging or refurbishing an ICR by opening the catalyst door and removing catalyst.

In a further aspect, the invention provides an ICR, comprising: an exterior; an interior comprising at least two microchannels in a stack and a catalyst precursor pathway that connects to at least one of the at least two microchannels and leads to the exterior; wherein the catalyst precursor pathway is separate and distinct from process gas inlets and outlets. The invention also includes methods of adding a catalyst (or removing a catalyst by dissolving) through the catalyst precursor pathway.

In other aspects, the invention provides methods of starting up an ICR. One such method comprises: starting a combustion reaction by adding hydrogen into a fuel channel and subsequently reducing the flow of hydrogen into the fuel channel and increasing the flow of a hydrocarbon. The invention also includes start up methods in which a nonreacting gas is passed through the endothermic process side to approximate the flow rate during operation. Preferably the nonreacting gas is an inert gas such as nitrogen, but could be nonreacting process gas. The invention also includes start up methods in which the total flow rate of fluids through the exothermic and/or endothermic reaction chambers remains substantially constant throughout start up. In another start up method, a hydrocarbon fuel is subjected to a partial oxidation reaction prior to entering the combustion chamber, thus obtaining a lower lightoff temperature.

In another aspect, the invention provides a method of simultaneously conducting an endothermic and an exothermic reaction in an ICR, comprising: passing an endothermic reaction mixture through an endothermic microchannel reaction chamber at two times or greater pressure than the pressure in an adjacent exothermic microchannel reaction chamber.

In another aspect, the invention also provides a method of simultaneously conducting an endothermic and an exothermic reaction in an ICR, comprising: passing a mixture comprising $H_2$ and methane through a microchannel in an ICR; reacting the $H_2$ and methane with an oxidant to form water, $CO_2$ and CO and produce heat, thus removing $H_2$ and methane from the mixture; wherein a greater percentage of methane is removed from the mixture than the percentage of $H_2$ removed from the mixture, as measured by comparing the levels of $H_2$ and methane in the mixture before passing through the microchannel with the levels of $H_2$ and methane at any point after passing through the microchannel. This is an extremely surprising result. The "removing" steps are by chemical reactions—not separation techniques.

The invention further provides a method of forming a laminated device comprising forming a stack of shims that includes void-containing sacrificial shims; and applying heat and pressure to the stack and deforming the sacrificial shims The invention also provides a laminated reactor comprising voids that, during operation, do not contain process streams or heat transfer components.

In another aspect, the invention provides an integrated reactor, comprising: a first channel comprising an outlet; a second channel comprising an outlet; a third channel connected to the outlets of the first and second channels; and a tongue projecting into the third channel that, during operation, deflects flows from the outlets from the first and second channels and directs those flows in substantially the same direction. Preferably, the integrated reactor is formed by laminating shims In another aspect, the invention provides an integrated reactor, comprising: an endothermic reaction chamber that is connected through a u-bend to a counterflow endothermic product channel; and an exothermic reaction chamber that is connected through a u-bend to a counterflow exhaust channel.

In a further aspect, the invention provides an integrated reactor, comprising: a fuel channel that is connected through a u-bend to a counterflow exhaust channel; and an oxidant channel nested between the fuel channel and the exhaust channel.

In another aspect, the invention provides an integrated combustion reactor, comprising a fuel channel and an adjacent oxidant channel that are separated by a wall; wherein the wall comprises jet orifices. In one embodiment, the wall comprises non-circular jet orifices. In another embodiment, the wall has an uneven distribution of jet orifices.

The invention also provides a laminated integrated reactor, comprising one exothermic reaction chamber comprising a reaction chamber wall and at least two exothermic reaction channels adjacent to the reaction chamber wall. For example, an exothermic reaction chamber can be broken into two exothermic reaction microchannels by a support rib.

In yet another aspect, the invention provides an integrated combustion system, comprising: a laminated integrated combustor comprising a fuel inlet side and a combustion side; and at least two connections on the fuel inlet side; wherein the combustion side is relatively free to expand with an increase in temperature, as compared to the inlet side. The connections are typically connections for fluid inlets and outlets but may also include clamps or other means that would restrict the expansion of the ICR. Typically, the two sides divide an ICR into two sides of equal volume.

In a further aspect, the invention provides a laminated ICR, comprising: stacked sheets comprising a first sheet comprising a channel in the plane of the sheet and extending to a first opening at the edge of the first sheet; a second sheet comprising a channel in the plane of the sheet and extending to a second opening at the edge of the second sheet; wherein the edge of the first sheet and the edge of the second sheet are on the same side of the laminated ICR; and a manifold comprising a conduit and an internal space that connects the first and second openings; wherein the conduit is selected from the group consisting of an exhaust conduit, a fuel conduit, an oxidant conduit, an endothermic reactant conduit, and an endothermic product conduit.

The invention further provides an integrated microchannel reactor, comprising: an exothermic reaction microchannel and an endothermic reaction microchannel adjacent to the exothermic reaction microchannel, (optionally) an oxidant channel, an exhaust channel and a product channel; and further, the integrated microchannel reactor is arranged in multiple layers with at least two exothermic reaction layers, and at least two endothermic reaction layers. Additionally, the reactor is characterized by having multiple (more than 1) of each type of channel and microchannel and includes 2 or more manifolds selected from—one connecting at least two endothermic reaction microchannels, one connecting at least two exothermic reaction microchannels, one connecting at least 2 oxidant channels, one connecting at least two exhaust channels, and one connecting at least 2 product channels; wherein at least two of these manifolds are connected at different lengths along the integrated reactor.

In a further aspect, the invention provides a multizone integrated reactor, comprising: a manifold zone, a heat exchanger zone, and a reaction zone. Preferably, these zones are linearly arranged along the body of the integrated reactor. Preferably there is a transition zone between the heat exchanger zone and the reaction zone where fluid streams are split and recombined. In one preferred embodiment, the reactor includes a partial oxidation zone and a combustion zone.

The invention further provides an integrated reactor comprising a contiguous microchannel through a heat exchanger zone and a reactor zone.

In another aspect, the invention provides a method of conducting simultaneous endothermic and combustion reactions in which a fuel is partially oxidized prior to being combusted in a combustion chamber. For example, a hydrocarbon can be fully or partly converted to CO and the CO burned in the combustion chamber. The invention also includes an integrated reactor comprising a partial oxidation catalyst located upstream of a combustion catalyst, wherein the combustion catalyst is located in a combustion chamber that is adjacent to an endothermic reaction chamber. The partial oxidation catalyst is preferably disposed within a fuel channel (or combustion channel) and can be in the form of a flow through catalyst that occupies substantially all of a cross-section of the channel or a flow-by catalyst that leaves a bulk flow path through the channel.

In yet another aspect, the invention provides an endothermic reaction catalyst insert (preferably disposed in an integrated reactor) comprising a dense support (such as a metal foil) that is coated with a catalytically active metal. Preferably, the dense support includes a porous layer for increasing surface area of the active metal.

In another aspect, the invention provides a microchannel reactor, comprising: a first microchannel having a first length; an adjacent and overlapping second microchannel having a second length defined by at least one microchannel wall; wherein the second length is shorter than the first length; and a catalyst insert disposed in the second microchannel. The at least one microchannel wall prevents the catalyst insert from sliding down the longer microchannel.

The invention also includes devices having any of the unique structural features or designs described herein. For example, the invention includes a device having exothermic and/or endothermic reaction channels in a cross-flow relationship with the corresponding product channels.

The invention also includes processes using any of the devices, structural features designs or systems, or processes characterized by any of the properties or results described herein. In some preferred embodiments, the invention can be defined by a set of characteristics that could not be obtained from prior art devices or methods; various aspects of the invention can be defined by characteristics including one or more of the following: volumetric heat flux, area heat flux, pressure drop through an exothermic or endothermic reaction channel, contact time, levels of $NO_x$ or CO in the combustion exhaust, thermal efficiency, low excess air, combustion conversion, approach to equilibrium of an endothermic reaction, conversion percent, product selectivity, thermal profile, fuel composition, steam to carbon ratio in a steam reforming reaction, level of coke formation, performance at a given level of steam reforming pressure, pressure differential between the endothermic and exothermic reaction channels, and performance as a function of time. Levels of these and other characteristics can be found in the Detailed Description and the Examples sections.

In preferred embodiments, aspects of the invention are combined; for example, in a preferred embodiment an inventive method is characterized by contact time and approach to equilibrium of an endothermic reaction.

Various embodiments of the present invention may possess advantages such as: low pressure drop, low requirement for excess air, high combustion stability, short contact time for the endothermic and/or exothermic reactions, low CO and/or NOx formation, operation at near stiochiometric air feed, greater safety, and high thermal cycling durability. Operation with a near stoichiometric air feed reduces the overall load on the systems air blower or compressor which will lead to significant cost savings.

An additional advantage by reducing the combustion temperature (or temperature of the exothermic reaction) required to drive the endothermic reaction is use of alternate metals or metallurgy such that lower cost materials or longer device life may be achieved.

Although the combustion may have both homogeneous and heterogeneous contributions, catalytic combustion in a microchannel (or channel with a minimum open dimension less than or slightly greater than the quench diameter) will reduce the contribution of homogeneous reactions and favor heterogeneous (catalytic) combustion. This will also further enhance safety by reducing gas phase reactions that might otherwise take the combustion mixture well above the safe operating temperature limit of the material Inhibition of gas phase combustion grows stronger with decreasing channel minimum dimension and with increasing catalytic surface area.

GLOSSARY, CALCULATIONS AND TESTING PROTOCOLS

"Shims" refer to substantially planar plates or sheets that can have any width and height and preferably have a thickness (the smallest dimension) of 2 millimeter (mm) or less, and in some preferred embodiments between 50 and 500 μm.

"Unit operation" means chemical reaction, vaporization, compression, chemical separation, distillation, condensation, heating, or cooling. "Unit operation" does not mean merely mixing or fluid transport, although mixing and transport frequently occur along with unit operations.

A "microchannel" has at least one internal dimension of 2 mm or less.

An "open channel" is a gap of at least 0.05 mm that extends all the way through a reaction chamber such that gases can flow through the reaction chamber with relatively low pressure drop.

"ICR" refers to an integrated combustion reactor that includes at least one combustion channel adjacent to at least one endothermic reaction channel.

During operation of preferred embodiments, a reactant enters a combustion or reaction chamber in a bulk flow path flowing past and in contact with a "porous material" or "porous catalyst." In these embodiments, a portion of the reactant molecularly transversely diffuses into the porous catalyst and reacts to form a product or products, and then the product(s) diffuses transversely into the bulk flow path and out of the reactor.

The term "bulk flow region" or "bulk flow path" refers to open areas or open channels within the reaction chamber. A reaction chamber with a bulk flow path (or region) will contain a catalyst and there is a gap between the catalyst surface and a reaction chamber wall or a second catalyst surface. A contiguous bulk flow region allows rapid gas flow through the reaction chamber without large pressure drops. In preferred embodiments there is laminar flow in the bulk flow region. Bulk flow regions within a reaction chamber preferably have a cross-sectional area of $5 \times 10^{-8}$ to $1 \times 10^{-2}$ m$^2$, more preferably $5 \times 10^{-7}$ to $1 \times 10^{-4}$ m$^2$. The bulk flow regions preferably comprise at least 5%, more preferably 30-80% of either 1) the internal volume of the reaction chamber, or 2) the cross-section of the reaction chamber.

"Equilibrium conversion" is defined in the classical manner, where the maximum attainable conversion is a function of the reactor temperature, pressure, and feed composition. For the case of hydrocarbon steam reforming reactions, the equilibrium conversion increases with increasing temperature and decreases with increasing pressure.

"Reaction chamber volume" is the internal volume of a reaction chamber (either exothermic or endothermic). This volume includes the volume of the catalyst, the open flow volume (if present) and metal support ribs or fins (if present) within the reaction chamber volume. This volume does not include the reaction chamber walls. The reaction chamber volume must contain a catalyst somewhere within its cross-section and must be directly adjacent another reaction chamber for heat transport. For example, a reaction chamber that is comprised of a 2 cm×2 cm×0.1 cm catalyst and a 2 cm×2 cm×0.2 cm open volume for flow immediately adjacent to the catalyst, would have a total volume of 1.2 cm³. If the same catalyst were divided into two sections or channels comprising a catalyst volume of 1 cm×2 cm×0.1 cm (2 volumes of 0.2 cm³ each) in each channel along with an open space immediately adjacent to each catalyst of 1 cm×2 cm×0.2 cm (two volumes of 0.4 cm³ each) and if there were a metal rib or spacing between the two catalyst channels of 0.1 cm×2 cm×0.3 cm (0.06 cm³), and if there was an adjacent reaction chamber of the opposite type (that is, an exothermic reaction chamber adjacent to an endothermic reaction chamber) then the total reactor volume is defined as 1.26 cm³. This volume is used for calculations of endothermic reaction chamber volumetric heat flux, area heat flux, and endothermic reaction contact time.

The "reactor core volume" is defined as the reaction chamber volume and all combustion chamber volume and the metal webs that separate the two chambers. The combustion chamber volume is defined as the chamber volume in which the exothermic heat generating reaction occurs and is adjacent to the reaction chamber volume. Perimeter metal is not included in reactor core volume.

As an example, a reactor that contains a reaction chamber volume of 2 cm×2 cm×0.3 cm and a combustion chamber volume of 2 cm×2 cm×0.2 cm and a separating web of 2 cm×2 cm×0.1 cm would have a total reactor core volume of 2.4 cm3.

The reactor core volume does not include any preheat exchanger zone volume that may or may not be attached to the reactor core volume. The preheat exchanger zone may be attached to the reactor but does not contain an endothermic reaction catalyst along any plane that bisects the device orthogonal to the direction of flow.

"Endothermic reaction chamber heat flux" is defined as the endothermic reaction heat duty divided by the reaction chamber volume.

"Reactor core volume heat flux" is defined as the endothermic reaction heat duty divided by the reactor core volume.

"Heat exchanger flux" is defined as the total heat transferred to the cold streams divided by the heat exchanger core volume.

"Heat exchanger core volume" is defined as the total heat exchanger volume inclusive of microchannels, ribs between microchannels, and the walls separating microchannels for all fluid streams transferring heat. The heat exchanger volume is inclusive of the heat exchanger zone described in the text and accompanying figures. The heat exchanger core volume does not include the perimeter metal or manifolds or headers. The heat exchanger core volume does not include the endothermic reaction chamber nor any volume that could be included within any plane that bisects the endothermic reaction chamber orthogonal to the direction of flow.

"Average area heat flux" is defined as the endothermic reaction heat duty divided by the area of the endothermic reaction chamber heat transfer surface. The endothermic heat transfer surface is defined by a planar area, which may be intermittent in the case of ribs or other structures in the endothermic reaction chamber, above which there is area for flow of reactants and below which there is a wall that separates the endothermic reaction chamber and the exothermic reaction chamber. This area is the path for heat transfer from the exothermic reaction chamber to the endothermic reaction chamber.

"Web" is defined as the wall that separates the endothermic reaction chamber and the exothermic reaction chamber.

$NO_x$ measurements are made of the exhaust stream while testing a selected device. The concentration of $NO_x$ (in ppm) measured at 50% excess air, with combustion flows sufficient to maintain at least 850° C. combustion chamber temperature is called herein "the standard $NO_x$ test measurement." The measured value can be compared to $NO_x$ levels exceeding 100 ppm in conventional methane steam reformers.

The "apparent equilibrium conversion temperature" is the apparent temperature based on methane conversion (or, more generally, hydrocarbon conversion) or the temperature required to produce an equilibrium methane conversion equal to the measured methane conversion at the measured average process pressure. Average process pressure was assumed to be the average of the measured inlet and outlet pressures. Equilibrium gas compositions were calculated using the NASALEWIS thermodynamic equilibrium code or ChemCAD. Methane conversion was calculated from the dry product gas composition as measured by gas chromatograph according to the equation:

$$CH_4 \text{ conversion} = 1 - \frac{y_{CH_4}}{y_{CH_4} + y_{CO} + y_{CO_2}}$$

where $y_i$ is the mole fraction of component i.

Similarly, the apparent temperature based on selectivity to CO was estimated to be the temperature required to produce an equilibrium selectivity to CO value equal to the measured selectivity to CO at the measured average process pressure.

The gaseous hourly space velocity (GHSV), is the inverse of the contact time, multiplied by a conversion factor to convert milliseconds into hours:

$$GHSV = \left(\frac{1}{CT}\right)\left(\frac{3600000 \text{ ms}}{\text{hr}}\right)$$

where CT is the contact time in milliseconds. The rate of volumetric flow rate fed to the reactor is defined at the standard condition of 0° C. and 1.013 bar for the purposes of calculating either contact time or GHSV. Thus the contact time and GHSV depend only on the inlet molar flowrate and the reaction chamber volume.

Heat Flux Measurement Test #1

Operate the device for a methane steam reforming reaction at 850 C, an outlet pressure of no more than 1.70 bar (10 psig), 3:1 steam-to-carbon ratio, and a contact time of 100 ms. Contact time is defined as the total reaction chamber volume divided by the total volumetric inlet flowrate of reactants at standard temperature and pressure (STP: 273K and 1 atm absolute).

For example, if the reaction chamber volume is 1 cubic centimeter, then the inlet total flowrate of reactants would be 0.6 standard liters per minute for 100 ms contact time. The inlet flowrate of methane would be 0.15 standard liters per minute and the inlet flowrate of steam would be calculated to be 0.45 liters per minute at standard temperature and pressure. For this example, the inlet molar flowrate of methane would be roughly 0.00045 moles per second for the 100 ms contact time. These numbers scale linearly with the total reaction chamber volume. A 2 cubic centimeter reaction chamber volume would require 0.0009 moles per second.

Methane conversion is determined by measuring the outlet product composition and the outlet flowrate of methane reforming reaction products and then calculating based on the following formula.

Conversion %=100×(moles methane in−moles methane out)/(moles methane in)

Moles methane in=inlet flowrate of methane at STP/(22.4 L/mol)

Moles methane out=[outlet flowrate of total product dry gas/(22.4 L/mol)]×% methane in dry gas GC analysis Dry gas is defined as the product gas stream flowrate after condensing the unreacted water or other condensable fluids.

Selectivity to CO %=100×(moles of CO/(moles of CO2+moles of CO+moles of C(s) if present))

Selectivity to $CO_2$%=100×(moles of CO2/(moles of CO2+moles of CO+moles of C(s) if present))

Endothermic Heat load=(Conversion %/100)×Moles methane in×(Heat of reaction of steam reforming to carbon monoxide at 850 C (226800 J/mol)×selectivity to CO %+Heat of reaction of steam reforming of methane to carbon dioxide at 850 (193200 J/mol)×selectivity to $CO_2$%)/100, units of Watts Endothermic Reaction Chamber Heat flux=Endothermic Heat load/endothermic reaction chamber volume, units of Watts/cm$^3$ Reactor Core Volumetric Heat flux=Endothermic Heat load/reactor core volume, units of Watts/cm$^3$ The following conditions must be met for the combustion reaction that supplies heat for the heat flux measurement test:
1. The gas phase fuel that must be used is hydrogen or methane.
2. The air to fuel ratio is maintained at an excess air percentage of 5 to 100%. The excess air is defined as the total molar flow rate of oxygen in the combination of fuel and air divided by the molar flow rate of oxygen needed to fully oxidize the fuel at its molar flow rate. For example, one mole of oxygen can fully oxidize two moles of hydrogen, so 100% excess air would correspond to a 4.76:1 molar ratio of air to hydrogen. Air is taken as 21% mole percent oxygen, balance nitrogen.
3. The air and fuel flowrates and inlet temperature are adjusted to maintain the combustion reaction zone at 850° C. as measured by either averaging the metal temperature over the last 25% of the reaction zone or as measured by the endothermic reaction product mixture giving an apparent equilibrium conversion temperature of 850° C. or higher.

Select conditions within the above-listed ranges to optimize performance. Calculate the endothermic reaction chamber heat flux by dividing the endothermic heat load by the reaction chamber volume. Calculate the reactor core volumetric heat flux.

Heat Flux Measurement Test #2
Operate the device for a methane steam reforming reaction at 850 C, an outlet pressure of no more than 1.70 bar (10 psig), 3:1 steam-to-carbon ratio, and a contact time of 20 ms. Contact time is defined as the total reaction chamber volume divided by the total volumetric inlet flowrate of reactants at standard temperature and pressure (STP: 273K and 1 atm absolute).

Methane conversion is determined by measuring the outlet product composition and the outlet flowrate of methane reforming reaction products and then calculating based on the following formula.

Conversion %=100×(moles methane in−moles methane out)/(moles methane in)

Moles methane in=inlet flowrate of methane at STP/(22.4 L/mol)

Moles methane out=[outlet flowrate of total product dry gas/(22.4 L/mol)]×% methane in dry gas GC analysis Dry gas is defined as the product gas stream flowrate after condensing the unreacted water or other condensable fluids.

Selectivity to CO %=100×(moles of CO/(moles of CO2+moles of CO+moles of C(s) if present))

Selectivity to $CO_2$%=100×(moles of CO2/(moles of CO2+moles of CO+moles of C(s) if present))

Endothermic Heat load=(Conversion %/100)×Moles methane in×(Heat of reaction of steam reforming to carbon monoxide at 850 C (226800 J/mol)×selectivity to CO %+Heat of reaction of steam reforming of methane to carbon dioxide at 850 (193200 J/mol)×selectivity to $CO_2$%)/100, units of Watts Endothermic Reaction Chamber Heat flux=Endothermic Heat load/endothermic reaction chamber volume, units of Watts/cm$^3$ Reactor Core Volumetric Heat flux=Endothermic Heat load/reactor core volume, units of Watts/cm$^3$ The following conditions must be met for the combustion reaction that supplies heat for the heat flux measurement test:
1. The gas phase fuel that must be used is hydrogen or methane.
2. The air to fuel ratio is maintained at an excess air percentage of 50%. The excess air is defined as the total molar flow rate of oxygen in the combination of fuel and air divided by the molar flow rate of oxygen needed to fully oxidize the fuel at its molar flow rate. For example, one mole of oxygen can fully oxidize two moles of hydrogen, so 100% excess air would correspond to a 4.76:1 molar ratio of air to hydrogen. Air is taken as 21% mole percent oxygen, balance nitrogen.
3. The air and fuel flowrates and inlet temperature are adjusted to maintain the combustion reaction zone at 850° C. or higher as measured by either averaging the metal temperature over the last 25% of the reaction zone or as measured by the endothermic reaction product mixture giving an apparent equilibrium conversion temperature of 850° C. or higher.

Select conditions within the above-listed ranges to optimize performance. Calculate the endothermic reaction chamber heat flux by dividing the heat load by the reaction chamber volume. Calculate the reactor core volumetric heat flux.

Heat Flux Measurement Test #3
Operate the device for a methane steam reforming reaction at 850 C, an outlet pressure of no more than 1.70 bar (10 psig), 3:1 steam-to-carbon ratio, and a contact time of 25 ms. Contact time is defined as the total reaction chamber volume divided by the total volumetric inlet flowrate of reactants at standard temperature and pressure (STP: 273K and 1 atm absolute).

Methane conversion is determined by measuring the outlet product composition and the outlet flowrate of methane reforming reaction products and then calculating based on the following formula.

Conversion %=100×(moles methane in−moles methane out)/(moles methane in)

Moles methane in=inlet flowrate of methane at STP/ (22.4 L/mol)

Moles methane out=[outlet flowrate of total product dry gas/(22.4 L/mol)]×% methane in dry gas GC analysis Dry gas is defined as the product gas stream flowrate after condensing the unreacted water or other condensable fluids.

Selectivity to CO %=100×(moles of CO/(moles of CO2+moles of CO+moles of C(s) if present))

Selectivity to $CO_2$%=100×(moles of CO2/(moles of CO2+moles of CO+moles of C(s) if present))

Endothermic Heat load=(Conversion %/100)×Moles methane in×(Heat of reaction of steam reforming to carbon monoxide at 850 C (226800 J/mol)× selectivity to CO %+Heat of reaction of steam reforming of methane to carbon dioxide at 850 (193200 J/mol)×selectivity to $CO_2$%)/100, units of Watts Endothermic Reaction Chamber Heat flux=Endothermic Heat load/endothermic reaction chamber volume, units of Watts/cm$^3$ Reactor Core Volumetric Heat flux=Endothermic Heat load/reactor core volume, units of Watts/cm$^3$ The following conditions must be met for the combustion reaction that supplies heat for the heat flux measurement test:
1. The gas phase fuel that must be used is hydrogen or methane.
2. The air to fuel ratio is maintained at an excess air percentage of 5 to 100%. The excess air is defined as the total molar flow rate of oxygen in the combination of fuel and air divided by the molar flow rate of oxygen needed to fully oxidize the fuel at its molar flow rate. For example, one mole of oxygen can fully oxidize two moles of hydrogen, so 100% excess air would correspond to a 4.76:1 molar ratio of air to hydrogen. Air is taken as 21% mole percent oxygen, balance nitrogen.
3. The air and fuel flowrates and inlet temperature are adjusted to maintain the combustion reaction zone at 850° C. or higher as measured by either averaging the metal temperature over the last 25% of the reaction zone or as measured by the endothermic reaction product mixture giving an apparent equilibrium conversion temperature of 850° C. or higher.

Select conditions within the above-listed ranges to optimize performance. Calculate the reactor core volume heat flux by dividing the heat load by the reactor core volume. Calculate the reactor core volumetric heat flux.

Pressure Test—High Temperature Test for ICR

In preferred embodiments, any of the devices described herein are capable of withstanding internal pressure differences. For example, some preferred embodiments meet the requirements of the following pressure test. For a microchannel unit operation device with at least one critical channel dimension less than about 2 mm, operate with at least two inlet fluid streams. The first fluid stream must be at 850 C and 180 psig. The second fluid stream must be at 800 C and 10 psig. Any flow rate may be used, or alternatively, stagnant flow may be used with the ends of the two fluid streams exiting the device temporarily sealed. Operate the device with these pressures and temperatures for 300 hours. After 300 hours operation, pressurize each fluid flow line to 50 psig and hold for 2 hours. The pressure must remain constant indicating minimal leak paths to the environment. Then, pressurize the second fluid flow line to 50 psig, leaving the first fluid flow line open to atmosphere, and hold for 2 hours. The pressure must remain constant indicating minimal internal leak paths. A minimal leak path is defined as a leak rate of less than $10^{-6}$ standard cubic centimeters per second of helium when helium is used as the fluid for the final leak test.

BRIEF DESCRIPTION OF THE FIGURES

FIG. 7 is a list of ordered shims for assembling an ICR device with a two-stream loop.

FIGS. 8-21 are illustrations of shim designs for a two-stream loop bonded ICR device.

FIGS. 22A-22C are illustrations of shim designs for a welded ICR device. Testing results from ICRs having this design are reported in the Examples section (Devices N2, N3, M1, and M2).

DETAILED DESCRIPTION OF THE INVENTION

An integrated reactor according to the present invention includes an exothermic reaction chamber and an adjacent second reaction chamber that contains a catalyst capable of catalyzing an endothermic reaction. A reaction chamber wall separates the exothermic and endothermic reaction chambers.

Figure 1:
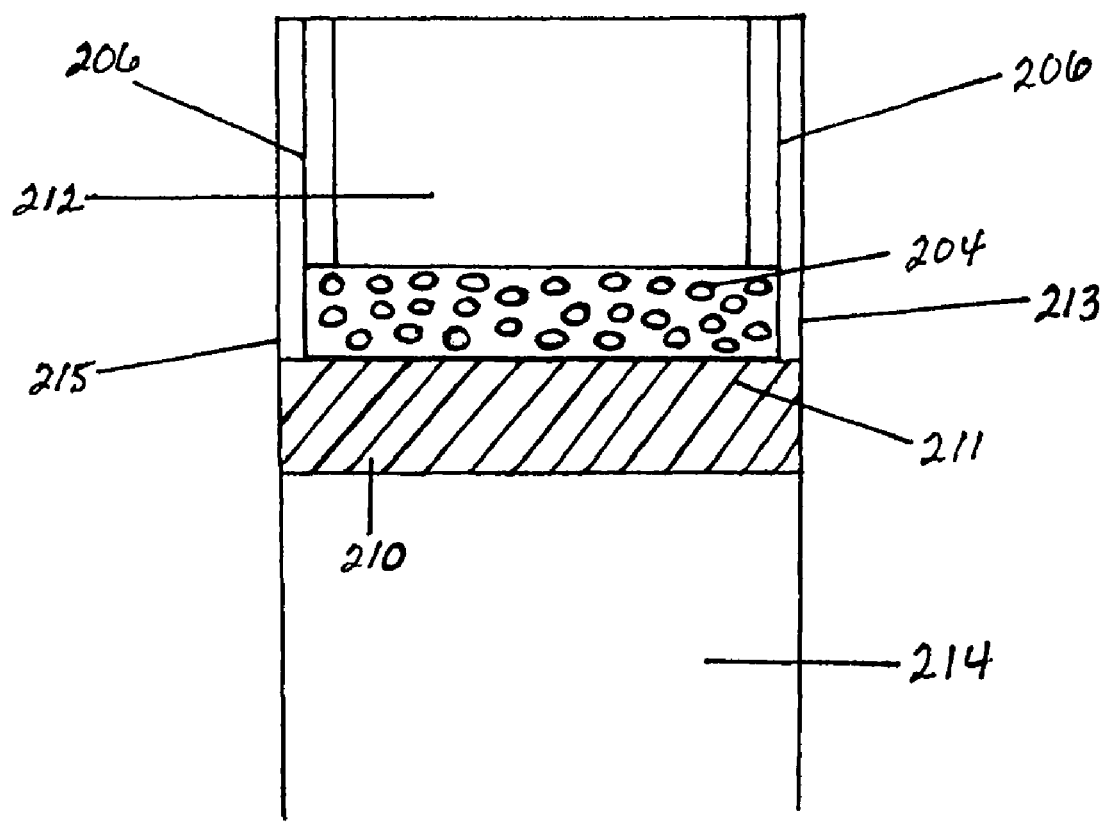
FIG. 1 schematically illustrates a cross-sectional view of a reactor of the present invention.

A cross-sectional view of one embodiment of an exothermic reaction channel and endothermic reaction channel is illustrated in FIG. 1. The exothermic (e.g., combustion) channel and/or endothermic (e.g., reforming) channel can contain a catalyst insert 204 with spacers 206. The spacers 206 press the catalyst insert against reaction chamber wall 210. In this illustration, flow in either channel is into or out of the page. Wall 210 separates catalyst insert 204 from reaction chamber 214. Preferably, the catalyst insert 204 contacts channel surface 211, and for enhanced thermal conduction also contacts internal wall surfaces 213 and 215. Preferably the spacers 206 are adjacent to (and preferably contact) the reaction chamber wall surfaces 213 and 215. The spacers could be integral to the catalyst insert that is pre-formed in a single piece, or separate items placed on the catalyst insert.

In the present invention, the exothermic (and/or endothermic) reaction chamber(s) preferably has a height (a dimension that is perpendicular to flow, and, in laminated devices, the stacking direction) of 2 mm or less, more preferably 1 mm or less, and in some embodiments 0.5 mm or less, and in some embodiments in the range of 0.1 to 1 mm. The dimensions of a reaction chamber are the internal dimensions and include catalyst but do not include chamber walls. A reaction chamber wall (separating the exothermic and endothermic reaction chambers) should be thermally conductive and preferably has a height (the distance between reaction chambers) of 5 mm or less, more preferably 2 mm or less, and in some embodiments a height of 1 to 2 mm. A short heat transport distance is desired for good performance. It has been discovered that these short heat transport distances, combined with preferred reactor configurations, can provide surprisingly high volumetric productivity and low pressure drop.

A reaction chamber has dimensions of height, width and length. The height and/or width is preferably about 2 mm or less, and more preferably 1 mm or less. The length of the reaction chamber is typically longer. Preferably, the length of the reaction chamber is greater than 1 cm, more preferably in the range of 1 to 50 cm. Surprisingly, it has been discovered that superior results can be obtained in an integrated reactor having a reaction channel length of at least 10 cm, more preferably at least 17 cm, and in some embodiments in the range of 10 cm to 50 cm. Preferably, the adjacent endothermic and exothermic reaction channels have substantially the same length to match the heat generation load with the heat consumption in the endothermic reaction.

Typically, the sides of a reaction chamber are defined by reaction chamber walls. These walls are preferably made of a hard material such as a ceramic, an iron based alloy such as steel, or monel, or high temperature nickel based superalloys such as Inconel 625, Inconel 617 or Haynes 230. Preferably, the reaction chamber walls are comprised of a material which is durable and has good thermal conductivity.

Preferably an exothermic reaction chamber contains a bulk flow path. In some preferred embodiments, an exothermic and/or endothermic reaction chamber has an inlet and an outlet with a contiguous bulk flow path from the inlet to the outlet. Preferably, the height of the bulk flow path (open channel gap) within a reaction chamber is less than or equal to 1 mm and the length (direction of net flow) is preferably less than or equal to 20 inches (50 cm). The width of a catalyst within a bulk flow path may vary but is preferably at least 20% and more preferably 50% of the circumference of the bulk flow path. In these preferred embodiments, the pressure drop from inlet to outlet is preferably less than 20%, more preferably less than 10% of system inlet pressure. The pressure drop is preferably less than 350 kPa, more preferably the pressure drop is less than 200 kPA and still more preferably the pressure drop is less than 70 kPa. A low pressure drop is desired to reduce the size and cost of other system equipment such as pumps and compressors. In other less preferred embodiments, the reaction chamber may include a section, such as a porous plug, that interferes with bulk flow.

The integrated combustion reactor preferably utilizes designs that 1) prevent combustion reaction upstream of the endothermic microchannel catalyst, and 2) distribute one of the combustion reactants across the microchannel cross-section, which may include uniform distribution, distribution with disproportional loading at the front (the upstream section) of a reaction chamber, and distribution with disproportional loading at the back of a reaction chamber. An especially preferred method of distributed flow is the use of jets from which a pressurized oxidant shoots into a fuel channel—most preferably, this oxidant flows onto a combustion catalyst that is disposed on a reaction chamber wall that is directly adjacent to an endothermic reaction chamber. The absolute pressure of the oxidant need only be slightly larger than the absolute pressure of the fuel stream, from a tenth of a psi to ten psi or more.

Reactors can be designed to simultaneously conduct one exothermic reaction and one endothermic reaction. Alternatively, a single device can be designed to simultaneously conduct numerous exothermic and/or endothermic reactions. For example, two or more different exothermic (and/or endothermic) reactions could be conducted on separate layers within a single device. Alternatively, multiple reactions can be conducted within the same layer of a device. For example, a single channel can have a partial oxidation reaction chamber followed by a combustion chamber. Such a construction could be especially useful, for example, to partially oxidize methane or other hydrocarbon in a fuel composition and flowing the partially oxidized fuel into the combustion chamber. Alternatively, a hydrocarbon mixture could be partly or fully pre-reformed to methane prior to being reformed to hydrogen in an endothermic reaction chamber.

In some preferred embodiments, the inventive reactors contain preheat zones for the fuel, oxidant and/or endothermic reactants. In some preferred embodiments, the preheat zones are or include upstream portions of the same microchannels through which a composition travels to the exothermic or endothermic reaction chambers. In especially preferred embodiments, this can be accomplished by flowing heated products through a u-bend and then back down through a channel that is adjacent the upstream portion of the microchannel containing the reaction chamber (see the Examples).

In some preferred embodiments, the exhaust from the combustion chamber is used to preheat fuel and/or endothermic reactants. In some preferred embodiments, a microchannel exhaust chamber is located within the integrated combustion reactor and downstream of the combustion chamber. Preferably, the exhaust chamber contains a combustion catalyst because additional heat can be generated and because pollutants can be reduced. In some preferred embodiments involving steam reforming, the endothermic reaction chamber contains a steam reforming catalyst while the portion of the flow path downstream of the reforming catalyst does not have a catalyst—this improves yield since the reaction is inhibited from re-equilibrating as it cools. Even without a catalyst in the process product return channel, the reactor walls may have some inherent catalytic function and partially re-equilibrate the products. For steam reforming of a hydrocarbon, this may be advantageous if the desired product is hydrogen, as the water gas shift reaction is enhanced at cooler temperatures. If synthesis gas is desired, it is advantageous to inhibit re-equilibration of the product stream.

In view of the need to conduct multiple operations on a fluid stream in an integrated reactor, in some preferred embodiments, the integrated reactors include a substantially continuous microchannel (i.e., one that has microchannel dimensions substantially throughout its length) or microchannels that have a length of at least 1 cm, more preferably at least 10 cm, and in some embodiments 1 to 200 cm.

In some embodiments, reaction chambers have the shape of parallelopipeds; however, it should be appreciated that other shapes such as cylinders (for example, adjacent cylinders or cylinders with an exothermic catalyst partly surrounded by an arc containing an endothermic reaction catalyst, or vice versa), or prisms (preferably close packed prisms to reduce heat transport distance and maximize surface area for thermal transport). Such shapes could be made, for example, by drilling through a block or laminating a stack of shims with shapes, aligned apertures such that the stacked and bonded shims form a passage having borders defined by the edges of the apertures. To increase surface area, in some embodiments, the reaction chamber (either exothermic, endothermic, or both) can have a projections or a set of microchannels. In some preferred embodiments, a reaction chamber wall has fins. The fins can have any shape and can extend partly or completely over the width of a reaction chamber. Preferably, a catalyst or catalysts are deposited over the reaction chamber walls to form exothermic or endothermic reaction chambers.

In addition to thermal transfer between adjacent reaction chambers, in some embodiments, a reaction chamber can be in thermal contact with a microchannel heat exchanger. This combination of reaction chamber(s) and heat exchanger(s) can result in high rates of thermal transfer. Examples and more detailed description including the use of microchannel heat exchangers are provided in U.S. patent application Ser. No. 09/492,246, filed Jan. 27, 2000, incorporated herein by reference. In some embodiments, the reaction chamber(s) and heat exchangers have a heat flux of at least 0.6 W per cubic centimeter of reactor volume.

Adjacent layers of exothermic and endothermic reaction chambers is a general feature of the invention, and in some preferred embodiments there are at least 2, more preferably at least 5 layers of endothermic reaction chambers alternating with at least 1, more preferably at least 4 layers of exothermic reaction chambers. Preferably, the apparatus is designed, and the methods performed such that outer layers have less (most preferably, one half) the mass flow of reactants as compared with inner layers of the same type; for example, in a device having 2 exothermic reaction layers interleaved between 3 endothermic reaction layers, the outer 2 endothermic reaction layers preferably have one half the flow of the inner endothermic reaction layer. In the bonded ICR device described below, each two-stream loop (having an "M" configuration) is a layer; but the layers on the top and bottom of the shim stack are half two-stream loops that, during operation, contain only half the mass flow of the internal layers (which are full two-stream loops). The feature of two streams entering from the bottom of a device, flowing up through manifold, exchanger, and reaction zones, and then merging near the U-bend before returning as a conjoined flow back through the zones is referred to as a two-stream loop.

The devices may be made of materials such as plastic, metal, ceramic and composites, depending on the desired characteristics. Walls separating the device from the environment may be thermally insulating; however, the walls separating adjacent exothermic and endothermic reaction chambers should be thermally conductive.

There are numerous possible configurations for the ICR reactor system of the present invention. In a preferred embodiment, a single integrated device contains a reactor zone, a preheat or recuperative heating zone, and a manifold zone. More preferably, this device is characterized by a free-end to allow for thermal expansion and stress minimization at the hottest end of the device. To create a free-end, the reactant stream makes a U-bend to form the product stream. The combustion stream (combined fuel and air) also makes a U-bend to form the combustion exhaust stream. The "free end" is characterized by having a greater degree of freedom than the non-free end; this is accomplished by having relatively few or, more preferably, no connections for fluid inlets and outlets; instead, the fluid inlet and outlets are concentrated on the non-free end of the reactor that is subjected to less thermal stress. During operation, the free end of the reactor is typically hotter than the non-free end of the device. The free end of the reactor should be relatively free of clamps or other components that would inhibit thermal expansion.

Figure 2:
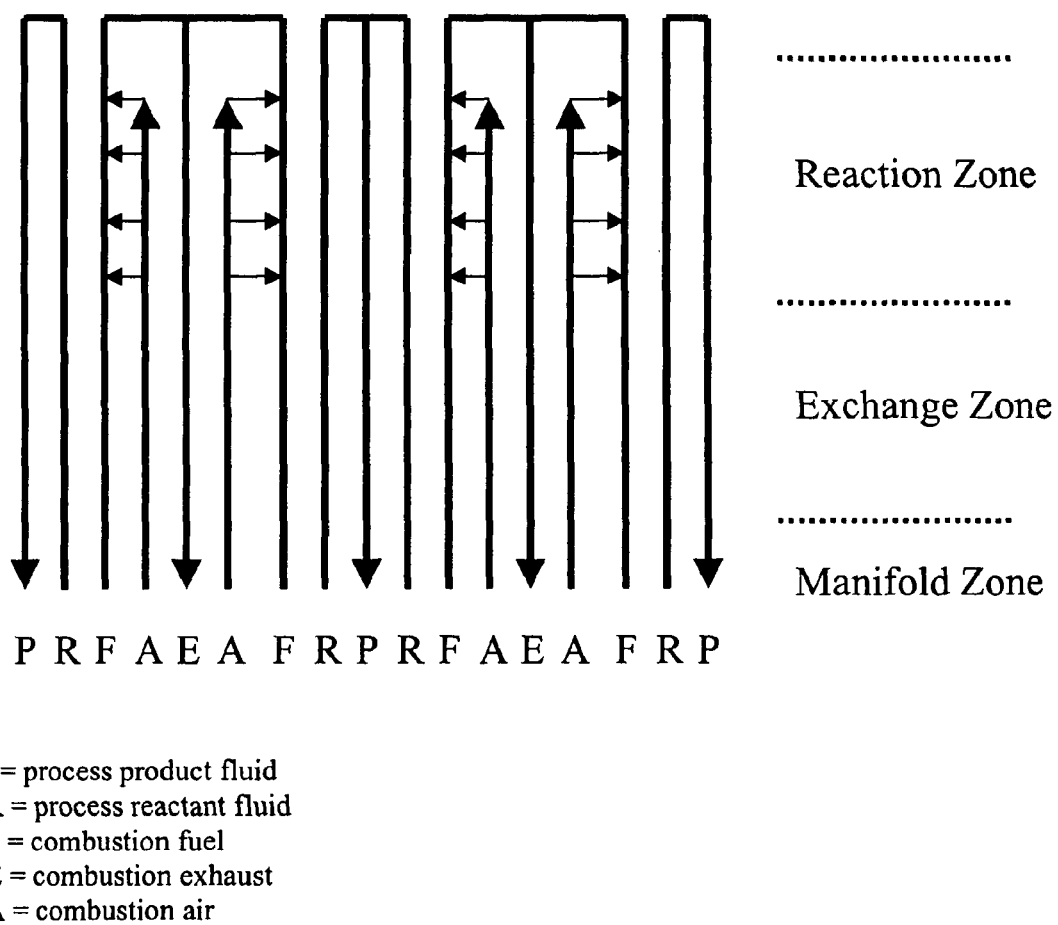
FIGS. 2-4 are schematic illustrations of various designs for fluid flow in an ICR.

In some preferred embodiments, the flow orientations are characterized by a two-stream loop geometry (see schematic in FIG. 2). A reaction layer contains a reactant channel that flows through a manifold zone, through a pre-heat zone, and then into the reaction zone (reaction chamber volume) within the same reaction microchannel. This process reaction stream then makes a U-turn into a product return stream that flows countercurrent to the originating reaction channel. Preferably, at all times during the flow path, the fluids are contained within a channel that has at least one dimension in the microchannel range. On the other side of the product return channel, a second reactant channel flows in a counter-current manner. Near the top of the U-bend, the two process reaction channels preferably join to form the common product return channel down the center. As the two process reaction streams merge into a single product return stream, preferably there is an interspaced tongue to prevent direct flow impingement and reduce flow instabilities.

Adjacent to the process layer, is a combustion layer. The outermost channels of the combustion layer are comprised of a fuel channel. Fuel flows through a manifold zone at the bottom of device, then through the preheat or recuperative heat exchanger zone in a contiguous microchannel, and then into a combustion reaction zone (combustion chamber volume). Preferably, air (or other oxidant) flows in an oxidant channel that is adjacent to each of the fuel channels through the manifold and exchanger zones. Air is then bled into the combustion chamber or zone through the use of jet orifices to meter air along the length of the combustion zone. The oxidant channel stops before the U-bend section. The two fuel channels are joined near the end of the reaction zone. The two streams are preferably merged into a single exhaust channel that flows down the innermost channel of the combustion layer. As the two combustion streams merge into a single exhaust return stream, preferably there is an interspaced tongue to prevent direct flow impingement and reduce flow instabilities.

The process reaction and combustion layers may be repeated multiple times to achieve the desired capacity. The terminating layer of the repeating unit is characterized by a single process reaction channel, adjacent to the combustion layer, which makes a U-bend into a product return channel that comprises flow from a single reactant channel. Alternatively, the outermost layer could be comprised of a combustion layer rather than a reactant layer.

The recuperative heat exchanger zone is comprised of 5 fluids that exchange heat. The repeating channels are as follows: product, reactant, fuel, air, exhaust, air, fuel, reactant, product, reactant, fuel, and so on. Heat from the product and the combustion exhaust streams preheat the reactant, combustion fuel, and combustion air streams.

The five streams are preferably manifolded at the cooler end of the device to enhance the device mechanical life. In a particularly preferred embodiment, one fluid is manifolded directly out the bottom of the device. The other four streams can be divided two per side. Each of the five manifold areas are connected to external pipes to bring in or remove fluids from the device.

Figure 3:
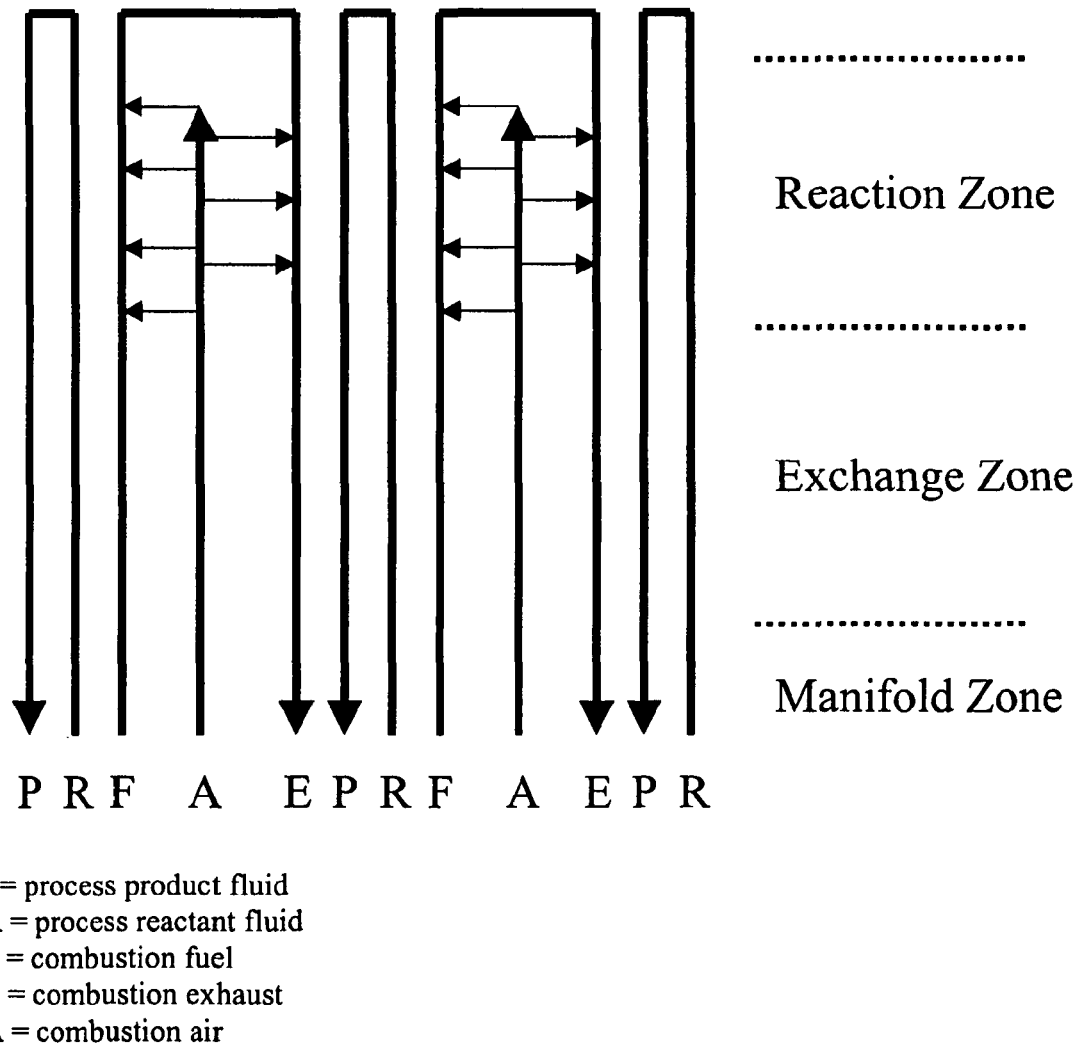

In one alternative design, see schematic in FIG. 3, the flow orientation is characterized by a single reaction and combustion channel that make a U-turn and return to the manifolding zone. In this design, referred to as a "single-stream loop," the flowpaths are as follows. Reactant flows through a manifold zone, through a pre-heat zone, and then into the reaction zone within the same reaction microchannel. This process reaction stream then makes a U-turn into a product return stream that flows countercurrent to the originating reaction channel. This product return stream may also contain catalyst and as such may support further reaction. After flowing through the reaction zone, the product channel enters the heat exchange zone before flowing out the manifolding zone. Adjacent to this process reaction layer is a combustion layer. Parallel to the reactant channel, but separated by a metal web, is the fuel channel. Fuel flows through a manifold zone at the bottom of device, then through a preheat or recuperative heat exchanger zone in a contiguous microchannel, and then into a combustion reaction zone. Air flows adjacent to the fuel channel through the manifold and exchanger zone. In preferred embodiments, air (or other oxidant) is fed into the combustion zone through the use of jet orifices to meter air along the length of the combustion zone. The air channel stops before the U-bend section. The fuel channel then makes its U-turn overtop of the air channel to connect with the exhaust return channel. The exhaust channel may still contain catalyst and promote further combustion. The air channel, which is internal to the combustion U—fuel to exhaust, can contain a second set of apertures on the opposite wall to the first set to meter air into the downstream combustion channel as desired. Combustion on the return pass after the U-bend provides heat to the endothermic reaction that occurs on the adjacent wall. The corresponding endothermic reaction channel can be on the return path of the endothermic process channel after the U-bend. The reactant and combustion U-bend layers are repeated as often as required to provide sufficient capacity for the device. The terminating layer of the repeating unit on one end of the device is characterized by a single process reaction channel, adjacent to the combustion zone, which makes a U-bend into a product return channel that comprises flow from a single reactant channel. The outer end will require a lower capacity reactant channel and no catalyst in the product return channel corresponding to no combustion heat at the outermost edge of the device. Alternatively, the outermost layer could be designed to include a combustion layer with combustion only occurring on the first pass in the combustion zone.

The recuperative heat exchanger zone is comprised of 5 fluids that exchange heat. The repeating channels are as follows: product, reactant, fuel, air, exhaust, product, reactant, fuel, and so on. Heat from the product and the combustion exhaust stream, preheat the reactant, combustion fuel, and combustion air.

The five streams are manifolded at the cold end of the device. One fluid is manifolded directly out the bottom of the device. The other four streams are divided two per side. Each of the five manifold areas are connected to external pipes to bring or remove fluids to or from the device. This is in an analogous manner as to the previous embodiment.

Figure 4:
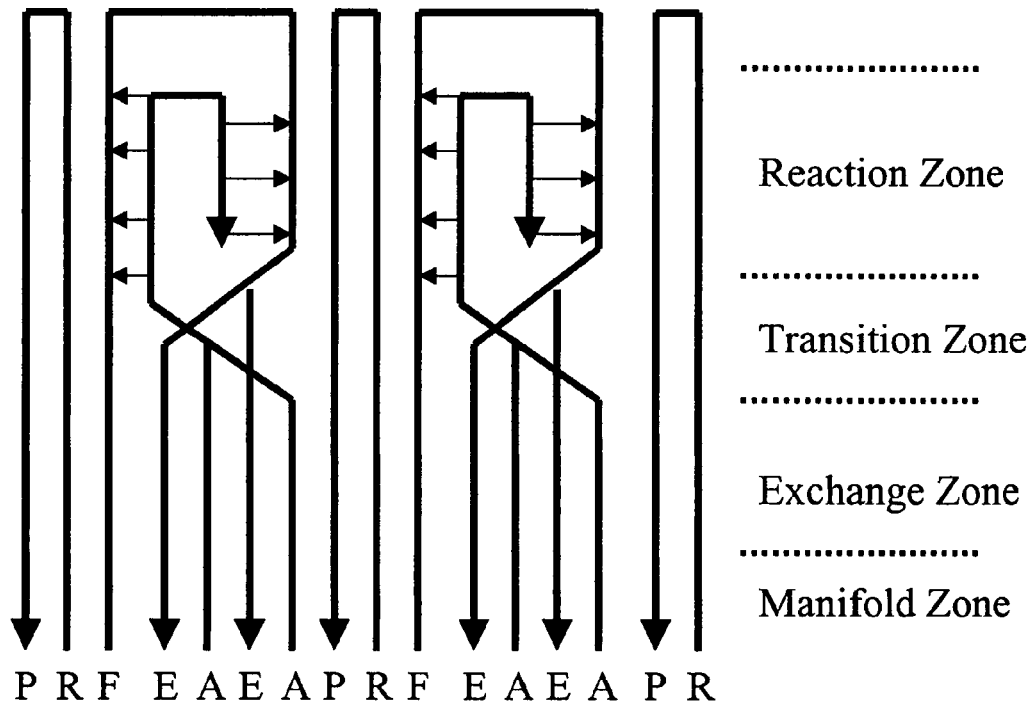

In another alternative embodiment of the device, see the schematic diagram in FIG. 4, the flow orientation is a single-stream loop geometry to create a free end for the device. In this embodiment, additional internal microchannel features are added in the zone between the reaction zone and heat exchange zone. This region, which will be termed a transition zone, accomplishes a rearrangement of the streams so that they have different orientations between the reactor and heat exchange zones. The transition zone may also act to split or merge streams to create more or fewer fluid channels in the exchanger zone. The flowpaths are as follows. Reactant flows through a manifold zone, through a pre-heat zone, and then into the reaction zone within the same reaction microchannel. This process reaction stream then makes a U-turn into a product return stream that flows countercurrent to the originating reaction channel. This product return stream may also contain catalyst. After progressing out of the reaction zone, the product channel undergoes heat exchange and then the product fluid enters the manifolding zone to make its way to the outlets of the device. Adjacent to this process reaction U layer, is a combustion layer. Parallel to the reactant channel, but separated by a metal web is the fuel channel. Fuel flows through a manifold zone at the bottom of device, then through the preheat or recuperative heat exchanger zone in a contiguous microchannel, and then into a combustion reaction zone. Air (or other oxidant) flows adjacent to the fuel channel through the manifold and exchanger zone. Air is then fed into the combustion zone through the use of jet orifices to meter air along the length of the combustion zone. In this embodiment, the air channel also performs a U-bend, with the air U occurring entirely within the combustion U. The fuel channel makes its U-turn overtop of the air U to connect with the exhaust return. The exhaust channel contains catalyst which promotes further combustion. The air channel downstream U contains the small apertures which are used to meter air into the downstream combustion U as desired. The air channel dead ends, and does not return into the heat exchanger zone. The process reaction and combustion layers may be repeated multiple times to achieve the desired capacity. As they are repeated, fresh reactant in an upstream reaction channel can be matched with and is separated by a wall from the upstream combustion channel where fuel and air mix. Likewise, downstream combustion is matched with downstream reaction.

The terminating layer of the repeating unit on one end of the device is characterized by a single process reaction channel, adjacent to the combustion zone, which makes a U-bend into a product return channel that comprises flow from a single reactant channel. If downstream reactions are being employed, then the opposite end will feature a lower capacity downstream product channel fed by a corresponding lower capacity reactant channel which does not have any catalyst and does not undergo reaction at the outermost channel. Alternatively, the outermost layer could be a combustion layer.

The recuperative heat exchanger zone is comprised of 5 fluids that exchange heat. These fluids are actually contained in 7 different flowpaths, where air is joined from two fluid channels in the heat exchanger zone into one channel entering the reaction zone. The exhaust channel is split into two channels as it heads into the heat exchanger zone. The repeating channels in the heat exchange zone are as follows: product, reactant, fuel, exhaust, air, exhaust, air, product, reactant, fuel, and so on. Heat from the product and the combustion exhaust streams, preheat the reactant, combustion fuel, and combustion air streams.

In order to achieve this orientation, the air stream and exhaust stream must split and interleave within the transition zone. This is accomplished by taking advantage of the three dimensional nature of the microchannels, allowing the two flows to bypass one another as they split and exchange locations. This also takes advantage of the space below the air channel's dead end within the reaction zone. Splitting and joining air and exhaust streams allows for the microchannel exchanger in the exchanger zone to operate much more effectively, as channels with smaller hydraulic diameters are created that enhance heat transfer rates.

The five fluids are manifolded at the cold end of the device. One fluid is manifolded directly out the bottom of the device. The other four streams are divided two per side. Each of the five manifold areas is connected to external pipes to bring or remove fluids to or from the device. This is in an analogous manner to the previous embodiments.

It is recognized that the embodiments of the ICR design could be achieved by alternate shim design styles, including slicing the shims in any of the three planes that comprise a device.

In some preferred embodiments, the combustion zone is enhanced by operating with a partial oxidation ("POx or POX") catalyst preceding the combustion catalyst to convert the hydrocarbon fuel to mostly hydrogen and carbon monoxide. The synthesis gas fuel in the combustion zone is an easier fuel to combust than some hydrocarbons such as methane. The POx catalyst may be in the form of a flow through structure such as a foam, wad, pellet or powder, or gauze. The POX catalyst may be in the form of a flow by structure such as a felt with a gap adjacent, a foam with a gap adjacent, a fin structure with gaps, a washcoat, or a gauze that is parallel to the flow direction with a corresponding gap for flow. The POX catalyst may be directly washcoated on the walls of the POx zone. The wall gap may be made thinner than the combustion zone to enhance mass transfer to the catalyst coating on the wall.

The POX-assisted combustion can be incorporated into either the two-stream loop concept or the single-stream loop concepts. POX-assisted combustion in a microchannel may also be further extended to other designs and design concepts, or wherever one may desire to combust a hydrocarbon fuel in a microchannel either with or without a concurrent endothermic reaction.

The POx catalyst could be inserted in the device prior to assembly and bonding. The POX catalyst could be washcoated prior to bonding using the same access holes used for the combustion washcoat catalyst. The POx catalyst could be inserted in the device through the cold-end, if the fuel channel is selected as the stream that enters the bottom of the device and thus allowing a straight channel for catalyst insertion.

An additional advantage of the POx assisted combustion is the ease of device startup. Many hydrocarbons require elevated temperature to initiate combustion, whereas the POx reaction can be partially initiated at much lower temperatures. As an example, for methane the POx light off temperature is less than 400 C, where as a temperature exceeding 800 C is required for direct methane combustion.

The use of POx assisted combustion allows for fuel flexibility with an integrated combustion reactor. The optimal jet spacing often is dependent upon the nature of the fuel combustion. POx assisted combustion will allow one device to operate efficiently with multiple combustion fuels and multiple endothermic reaction hydrocarbons—if the same catalyst is effective for multiple endothermic reactions such as hydrocarbon reforming.

For the POx-assisted combustion, a mixture of fuel and air flows along the fuel chamber through the exchanger zone, and then through the POx zone before entering the combustion zone. The air required for the POx reaction could be mixed inside the microchannel device to enhance safety of the process. For methane, a typical fuel to oxygen ratio in the POx zone is 2:1. More oxygen may be added to keep the mixture out of a coking regime. The mixture could drop as low as 1.5:1.

Alternatively, air could be mixed into the fuel stream prior to or during the POX zone via the use of jets to control the air distribution.

The use of POx assisted combustion may be used in any of the presented design configurations for the ICR, or alternatively it could be used in modified or alternative design configuration.

Thus, the invention also includes combustion methods in which the hydrocarbon/CO mass ratio in a fuel decreases before the fuel is combusted in a combustion chamber. In some preferred embodiments, the hydrocarbon/CO mass ratio decreases by at least 20%, more preferably at least 50%, and in some embodiments essentially all of the hydrocarbon is eliminated.

Tongue Description

Figure 23:
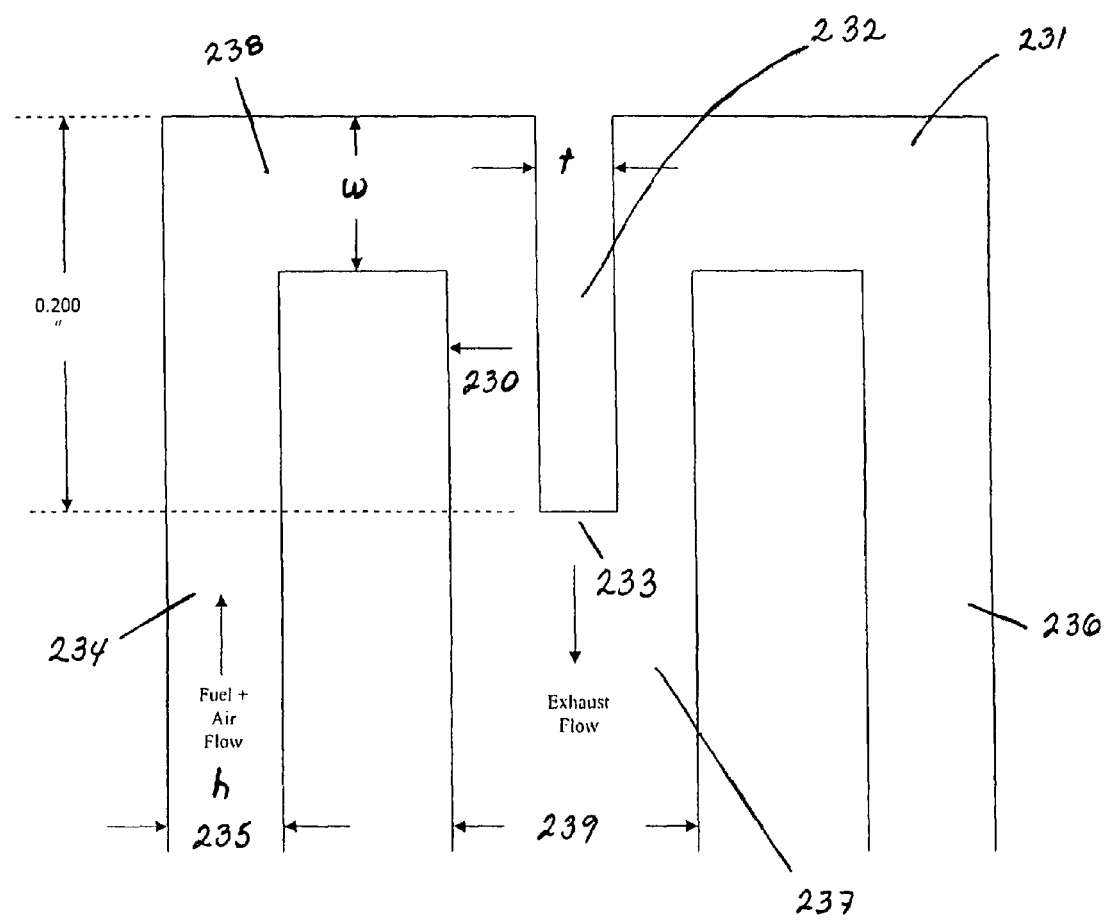
FIG. 23 is a schematic illustration of a tongue that can redirect flows in a two-stream loop.

In the present invention, it is preferred to force the streams to flow in the same direction prior to combining the flows of two streams. Preferably this is accomplished by use of a tongue 232 as shown in FIG. 23. In the illustrated embodiment, two parallel combustion streams 234 and 236 flow through u-bends 238, 231, against tongue 232 and into combined flow path 237. Combination of the streams in this manner resolves the momentum impulse forces into the same direction and permits the two streams to combine independently of the value of the individual flow rates. Thus, intermittent flow is minimized Recirculation eddies will exist in the corners as well as the bottom of the u-bend. The size of these recirculation zones can be minimized by adjusting the gap sizes 230, 235 and 239. The size of the u-bend inlet 235 should be similar to the size of the u-bend outlet 230. Preferably the cross-sectional area (height×depth) ratio of 235/230 is in the range of 0.1 to 10, more preferably 0.6 to 1.8, and still more preferably in the range of 0.8 to 1.3, preferably the u-bend inlet, u-bend and u-bend outlet are coplanar and the same depth (relative to FIG. 23, depth is perpendicular to the paper). Preferably, the combined flow channel 239 is similar in size to the combination of the inlet channels 235 and 236. Preferably the cross-sectional area (height×depth) ratio of (235+236)/239 is in the range of 0.1 to 10, more preferably 0.5 to 2.0, and still more preferably in the range of 0.8 to 1.3, preferably the u-bend inlet, u-bend and u-bend outlet are coplanar and the same depth (relative to FIG. 23, depth is perpendicular to the paper). The height, h, of the u-bend inlet 235 is preferably in the range of 0.01 mm to 10 mm, more preferably 0.02 mm to 1.5 mm, and still more preferably in the range of 0.1 mm to 0.7 mm. The height, h, of the u-bend outlet 239 is preferably in the range of 0.02 mm to 1 mm, more preferably in the range of 0.08 mm to 0.6 mm. The u-bend width is preferably in the range of 0.05 mm to 20 mm, more preferably in the range of 0.1 mm to 5 mm, and preferably the ratio of the cross-sectional area (height×depth) of u-bend inlet 235 to the cross-sectional area (depth x width) of u-bend 238 is in the range of 0.1 to 5. Too large a u-bend width introduces large eddies into the corners and bottom of the u-bend, while too small a u-bend width may induce a new recirculation zone on the return path out of the u-bend due to boundary layer separation.

Flow expansion at the tip 233 of the tongue will induce boundary layer separation and a stagnation zone centered under the tongue. These problems can be minimized by minimizing tongue height, t. Preferably, the tongue height is less than 1 mm, more preferably less than 0.5 mm, and still more preferably less than 0.2 mm thick. For economy of construction and structural support, the tongue may have a constant height, alternatively, the height can be tapered with the narrowest section where the streams combine.

Combustion Jet Design

In some preferred embodiments, the heat source for the endothermic reaction is delivered directly to the wall in contact with the endothermic catalyst. This follows from the fact that metal conduction is a more efficient mode of heat transfer than either convective or radiative heat transfer.

In contrast to premixed combustion, where the heat release will occur primarily in the homogeneous phase, combustion jets can direct a concentrated stream of air into a separate fuel channel stream. The two streams subsequently mix and undergo an oxidation reaction. In order to suppress homogeneous combustion and promote heterogeneous catalytic combustion on the channel wall, unique jet design features have been implemented. Important features include (1) geometry, (2) size, and (3) relative location and spacing.

The jets should not only impinge on the wall but also spread out the combustion oxidant as uniformly as possible along the entire width of the channel. Furthermore, heterogeneous combustion is preferably concentrated at the combustion wall in closest proximity to the endothermic reaction catalyst. Combustion on other walls represents a heat loss and furthermore has a disadvantageous impact on thermal stresses in the device.

In order to raise the temperature of an SMR reaction and reduce the likelihood of coke formation at the beginning of the reactor zone or in the heat exchanger zone reactant or product channels, more air should be delivered for combustion against the wall at the beginning of the reactor zone. Concentration of jets in this region as well as application of non-circular jet orifices can successfully meet this objective.

All the goals above are desired to be accomplished with a minimal pressure drop for both economic reasons as well as for the purposes of preserving back pressure in the ICR device to ensure good flow distribution. To this end, a hybrid of circular and rectangular slot orifices can be implemented in the jet design. Alternatively, other non-rectangular non-circular jets could be used such as diamonds, triangles, semi-circles, quarter-moons, and the like. Computational fluid dynamics (CFD) predictions indicate that a combination of these two jet geometries provide a more ideal heterogeneous fuel-oxidant mixture distribution on the combustion channel wall opposite the jet shim. It is recognized that other non-circular jet orifices could also be used at the entrance of the combustion zone or anywhere down the length of the reactor. It is also recognized that the combustion orifices could start before the reaction zone in the recuperative heat exchanger section to further preheat the reactants or further tailor the thermal profile of the device.

Control of the relative proportion of homogenous and heterogeneous combustion can be achieved by manipulation of the jet design. Either homogeneous or heterogeneous combustion can be increased as needed depending upon the application. As an example, a microchannel combustor that did not include an endothermic reaction may be enhanced via jet design by promoting homogenous combustion to reduce hydrocarbon or CO emissions or to provide a hot gas stream for subsequent use in a unit operation.

While the examples show preferred embodiments in which the oxidant goes through the jets, it should be appreciated that fuel could alternatively flow through jets to combine with an oxidant.

The distribution of jet orifices may depend on the intended use of the device. Hydrogen burns immediately, thus, to avoid hot spots, the jets should be spaced more evenly over the combustion chamber. Methane, which burns more slowly, preferably has jets loaded near the front of the combustion chamber. When the fuel is syngas, the distribution of jets is intermediate.

The endothermic and exothermic reaction chambers preferably contain catalysts. Catalysts suitable for catalyzing a selected exothermic or endothermic reaction are well known to chemists and chemical engineers.

In some preferred embodiments of the present invention, catalysts (especially an endothermic catalyst) can be a porous catalyst. The "porous catalyst" described herein refers to a porous material having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. The porous material can itself be a catalyst, but more preferably the porous material comprises a metal, ceramic or composite support having a layer or layers of a catalyst material or materials deposited thereon. The porosity can be geometrically regular as in a honeycomb or parallel pore structure, or porosity may be geometrically tortuous or random. In some preferred embodiments, the support of the porous material is a foam metal, foam ceramic, metal felt (i.e., matted, nonwoven fibers), or metal screen. The porous structures could be oriented in either a flow-by or flow-through orientation. The catalyst could also take the form of a metal gauze that is parallel to the direction of flow in a flow-by configuration.

Alternatively, the catalyst support could also be formed from a dense metal shim or foil. A porous catalyst layer could be coated on the dense metal to provide sufficient active surface sites for reaction. An active catalyst metal or metal oxide could then be washcoated either sequentially or concurrently to form the active catalyst structure. The dense metal foil or shim would form an insert structure that would be placed inside the reactor after bonding or forming the microchannel structure. Preferably, the catalyst insert contacts the wall or walls that are adjacent both the endothermic and exothermic reaction chambers.

The porous catalyst could alternatively be affixed to the reactor wall through a coating process. The coating may contain a first porous layer to increase the number of active sites. Preferably, the pore diameter ranges from tens of nanometers (for example, 10 or 20 nm) to tens of microns (for example, 10 or 50 micrometers). An active metal or metal oxide catalyst can then be sequentially or concurrently washcoated on the first porous coating.

Preferred major active constituents of the catalysts include: elements in the IUPAC Group IIA, IVA, VA, VIA, VIIA, VIIIA, IB, IIB, IVB, Lanthanide series and Actinide series. The catalyst layers, if present, are preferably also porous. The average pore size (volume average) of the catalyst layer(s) is preferably smaller than the average pore size of the support. The average pore sizes in the catalyst layer(s) disposed upon the support preferably ranges from $10^{-9}$ m to $10^{-7}$ m as measured by $N_2$ adsorption with BET method. More preferably, at least 50 volume % of the total pore volume is composed of pores in the size range of $10^{-9}$ m to $10^{-7}$ m in diameter. Diffusion within these small pores in the catalyst layer(s) is typically Knudsen in nature for gas phase systems, whereby the molecules collide with the walls of the pores more frequently than with other gas phase molecules.

In preferred embodiments, catalysts are in the form of inserts that can be conveniently inserted and removed from a reaction chamber. Reaction chambers (either of the same type or of different types) can be combined in series with multiple types of catalysts. For example, reactants can be passed through a first reaction chamber containing a first type of catalyst, and the products from this chamber passed into a subsequent reaction chamber (or a subsequent stage of the same reaction chamber) containing a second type of catalyst in which the product (or more correctly termed, the intermediate) is converted to a more desired product. If desired, additional reactant(s) can be added to the subsequent reaction chamber.

The catalyst (which is not necessarily porous) could also be applied by other methods such as wash coating. On metal surfaces, it is preferred to first apply a buffer layer by chemical vapor deposition, thermal oxidation, etc. which improves adhesion of subsequent wash coats.

The devices can be made by forming chambers within a single block of material, by joining multiple components, and, most preferably, by stacking and bonding shims The aperture-containing shims can be formed by processes including: conventional machining, wire EDM, laser cutting, photochemical machining, electrochemical machining, molding, water jet, stamping, etching (for example, chemical, photochemical and plasma etch) and combinations thereof. For low cost, stamping is especially desirable. The shims may be joined together by diffusion bonding methods such as a ram press or a HIP chamber. They may also be joined together by reactive metal bonding or other methods that create a face seal. Alternately, laser welding shims could join the devices or sheets to form seals between flow paths. Devices could alternatively be joined by the use of adhesives. In preferred embodiments, devices are laminated in a single step, in less preferred embodiments, a first set of shims is bonded together and subsequently bonded to a second (or more) set of shims In some preferred embodiments, a set of shims is bonded together in a single step and then the resulting bonded article is cut into multiple devices.

Sacrificial Shims for Diffusion Bonding

Diffusion bonding of shims can create undesired channel compression. Due to the high temperatures required for diffusion bonding, the material that is under load will inelastically deform to some extent due to loading beyond its yield strength and creep strain during the time required for bonding. Channel compression can be mitigated through the use of sacrificial shims placed on either side (or alternatively only one-side) of the shim stack and separated from the flow channels by at least one wall shim or wall plate. The sacrificial shim is generally described as a large open pocket that covers the otherwise open pockets in the shim stack. The sacrificial shim pocket takes up a portion of the deformation produced by the bonding force and generally is compressed after the bonding cycle. Sections of a shim stack wherein there is no material will not transfer any force.

Figure 5:
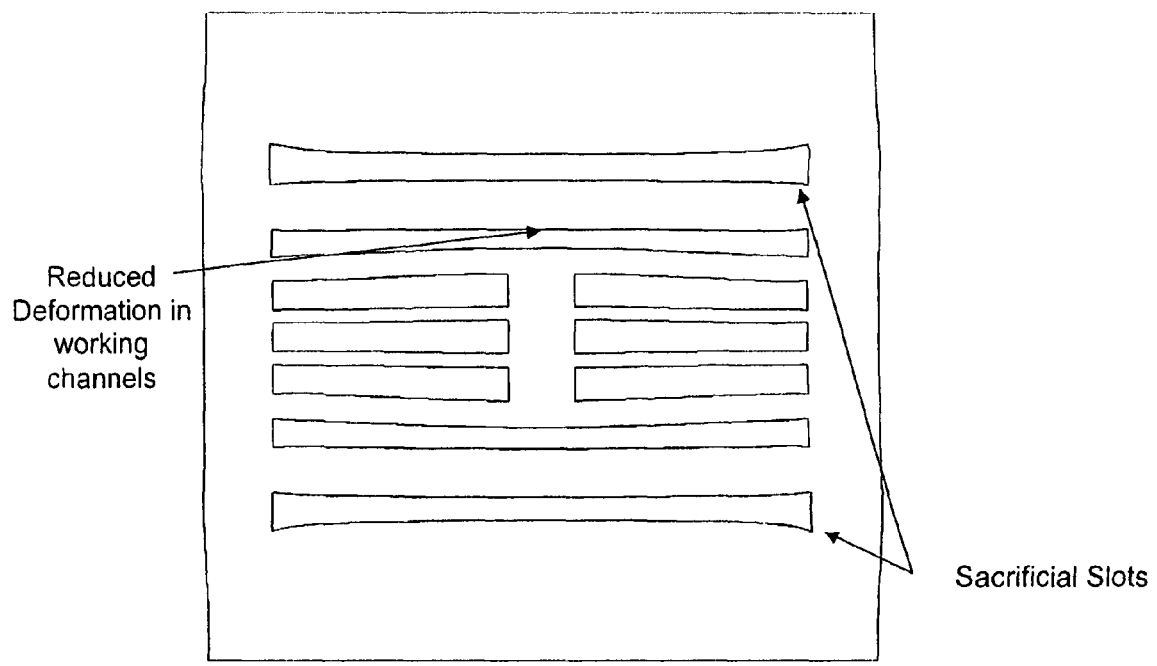
FIG. 5 illustrates channel deformation resulting from press bonding.

In press bonding, the sacrificial shims absorb the deformation forces and help keep the internal dimensions consistent in the open areas which are used for operation. See FIG. 5 where the internal voids are unaffected while the outer voids (sacrificial slots) are significantly deformed.

For any bonding method (axial pressing or isostatic pressing) if the open areas in the sacrificial shims are extended wider than the operating channels, the ends of the channels are not loaded directly, and the change in length in the working channels is reduced. Thus, preferably, sacrificial voids extend further (for example, are longer) than the working channels they are protecting.

Sacrificial shims may take the form of one or multiple shims that are stacked together or separated by solid walls. The sacrificial shims may be near the desired shim stack and separated by a single shim having a thickness (height) of 0.25 mm or less. The sacrificial shims could alternatively be placed a greater distance from the shim stack, or more than 6 mm. Although sacrificial shims preferably are outside (that is, closer to a surface than) the process channels, sacrificial shims could also be placed elsewhere within the shim stack. In all cases, the channels in the sacrificial shim are not in fluid contact with any of the streams that, during device operation, participate in the desired device unit operations. The chambers are vacant, or could alternatively be later filled with a fluid to either promote or minimize thermal losses to the environment or to axial conduction along the length of the device.

Figure 6:
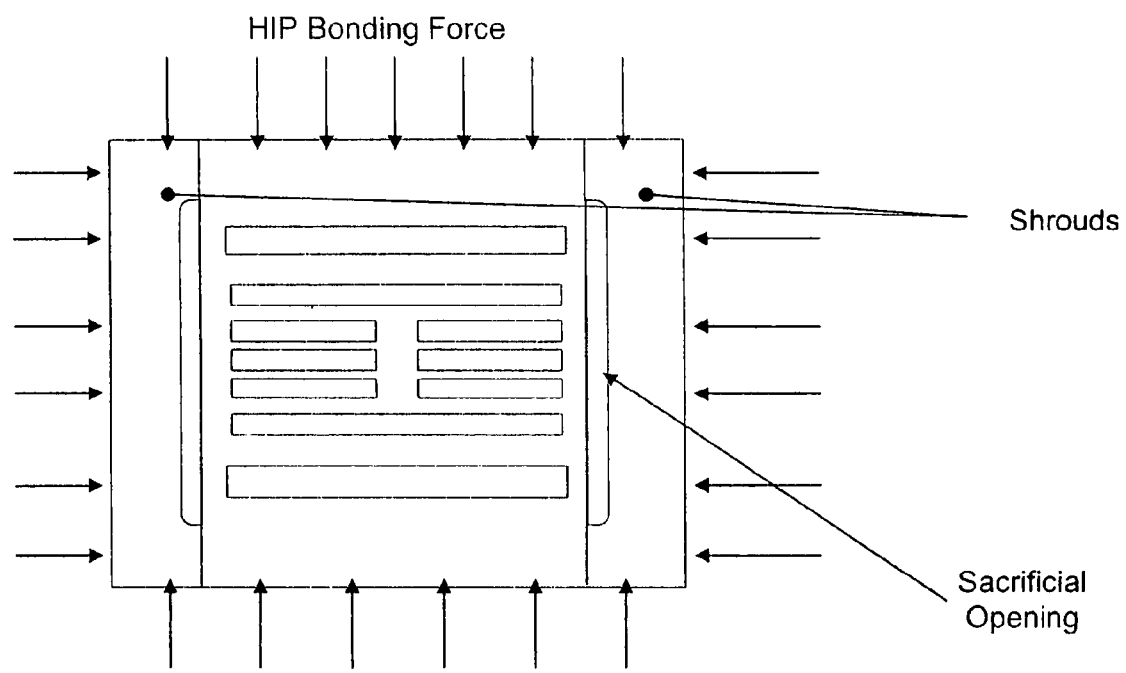
FIG. 6 illustrates sacrificial channels to protect internal channels from deformation during hot isostatic press bonding.

The concept of sacrificial shims could also be extended to application in 3-D bonding methods such as HIP which also load the shims perpendicular to the bonding direction. The sides of the shims could be covered with a shroud or an open pocket to take up the compression during bonding without deforming the desired channels. See FIG. 6. In alternative configurations, the pockets could be formed in external components attached to the side of the shim stack, or pockets could be formed in each shim in the stack to create the sacrificial shroud.

In its broader aspects, the invention relates to any pair (or more) of endothermic and exothermic reactions. For example, different compositions can be run through different reaction chambers having different catalysts. All of the examples and most of the description are directed to gas phase reactions. However, the present invention could also be used for liquid phase reactions. In the case of liquid phase reactions, the critical channel dimension will likely be smaller than that for gas phase reactions to accommodate the reduced mass diffusion rate that brings reactants to the catalytic surface.

Catalytic processes (either exothermic or endothermic) of the present invention include: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, methanation, nitration, oxidation, preferential oxidation, partial oxidation, polymerization, reduction, reformation, reverse water gas shift, Sabatier reaction, sulfonation, telomerization, transesterification, trimerization, and water gas shift.

One preferred endothermic reaction is steam reforming in which water (steam) and a hydrocarbon (or hydrocarbons) are reacted in an endothermic reaction chamber to form hydrogen and carbon oxides. A variety of hydrocarbons can be reformed to produce hydrogen, including methane, ethane, propane, butane, isobutane, higher alkanes, alkenes, alcohols, ethers, ketones, and the like including blends and mixtures such as gasoline, diesel, kerosene, and others.

For providing sufficient heat to an endothermic reaction, it is preferred that the reaction in the exothermic reaction chamber be highly exothermic. Combustion of hydrogen, CO, or a hydrocarbon (or hydrocarbons as listed above) is especially preferred.

It should be appreciated that in any of the devices described herein, alternative reactants could be used in place of any of the reactants mentioned. For example, other fuels could be used in place of methane.

As described in greater detail below, preferred processes of the invention can be described by the configuration of the apparatus and/or by measurable characteristics such as (but not limited to) heat flux, volumetric productivity, and/or pressure drop (which could also be described in conjunction with process conditions such as flow rate, temperature, etc.).

Preferred reactors and methods of conducting reactions in integrated reactors can be characterized by their properties. Unless specified otherwise, these properties are measured using the testing conditions described in the Examples section. The invention can be characterized by any of the properties individually or in any combination. Average volumetric heat flux is preferably at least 1 W/cc, or, in other preferred embodiments, at least 5, or 10, or 20, or 50, or 100, and in some embodiments between 10 and about 120 W/cc. The endothermic reaction chamber heat flux is preferably at least 10 W/cc, or, in other preferred embodiments, at least 50, 100, 200 or greater than 500 W/cc, and in some embodiments between 10 and about 700 W/cc. The devices can be characterized by the low $NO_x$ output when measured by the standard $NO_x$ test measurement that is described in the Examples section. $NO_x$ output is preferably less than 100 ppm, more preferably less than 50 ppm, still more preferably less than 10 ppm, and still more preferably less than 5 ppm, and in some embodiments, $NO_x$ output is in the range of about 5 to 20 ppm. The inventive processes involving combustion preferably use less than 100% excess air (or, equivalently, excess oxygen), more preferably less than 75%, still more preferably less than 50%, yet still more preferably less than 25%, or 10% or 5% excess air. For characterizing devices, excess oxygen is measured under the conditions set forth in the Heat Flux Measurement Test or (if characterized in conjunction with $NO_x$ output) measured under the conditions set forth in the standard $NO_x$ test measurement. Pressure drop through the exothermic and/or endothermic reaction chambers is preferably less than the following (in order of preference, based on length of reaction chamber) 295,000; 250,000; 125,000; 50,000; 25,000; 12,500; 2500; or 1500 Pa/cm. For devices, the pressure drop is measured under the conditions set forth in the Heat Flux Measurement Tests.

Another advantage of the present invention is that good yields (or other measures of good performance) can be obtained with short contact times. In preferred methods, the contact time is less than 100 milliseconds (ms), more preferably less than 50 ms, more preferably less than 25 ms, and still more preferably less than 10 ms, and in some embodiments between 1 and 25 ms for gas phase reactions. Liquid phase reactions would be expected to be at least three orders of magnitude slower, thus necessitating longer contact times as compared to gas phase but faster than conventional liquid phase reactions that have contact times ranging from minutes to days. Contact time may be reduced by reducing the diffusion distance between the bulk flow and the porous catalyst while concurrently reducing channel length. At these contact times, in a preferred embodiment of hydrocarbon steam reforming, at least 70%, more preferably at least 90%, of the absolute or equilibrium conversion of the hydrocarbon entering the beginning of said at least one reaction chamber is converted to hydrogen, carbon monoxide and/or carbon dioxide. Similar improvements can be obtained in other processes.

Some process characteristics of some preferred inventive processes include the following: (1) Operate safely at a fuel:oxygen ratio near stoichiometric (less than 100% excess air) for the use of combustion as the exothermic reaction. This reduces the required air which improves the overall system thermal efficiency and reduces the required duty for the external air blower or compressor. (2) Operate steam reforming at short contact times or conversely at high gas hourly space velocities. This is required to create a compact device. (3) Operate with a high heat flux. This is required to operate at short contact times. (4) Operate with a low pressure drop per unit length of reactor. This enables a higher productivity per unit volume. (5) Optionally, quench/inhibit gas phase reactions. As the channel dimension nears the quench diameter or drops below, then the contribution of the unwanted gas phase homogeneous combustion reaction is reduced.

In steam reforming, gas hourly space velocity is preferably greater than 10,000, more preferably greater than 50,000, and may range from about 100,000 hr$^{-1}$ to over 10$^6$ hr$^{-1}$ corresponding to a contact time on the order of 360 to 3.6 milliseconds, respectively. Operating pressures for methane steam reforming preferably range from 1 atm to 50 atm. A range of 1 to 30 atm is more preferred. Steam-to-carbon ratios may range from 1 to 10; a range of 1 to 3 is preferred.

Preferred Thermal Profile within the Reactor

The thermal profile within the integrated combustion reactor is rarely isothermal. The temperature is typically coolest at the front of the reactor where the heat duty of the endothermic reaction is the highest. The temperature is typically hottest at either the middle or end of the reactor, as defined by the direction of reactant flow. In some preferred embodiments, it is desired to operate the reactor with the hottest point near the end of the reaction chamber. Higher temperatures lead to increased metal expansion and thus it is desired to have most expansion occurring at the free end of the device rather than in the front end or in the middle of the reaction zone where the metal can bulge. Minimization of thermal stresses in an ICR can be achieved by creating a monotonically increasing thermal profile along the flow length of the reactor. Preferably, temperature increases substantially monotonically in the direction of flow in both the exothermic and endothermic reaction chambers. In some cases, the temperature is not rigorously required to be hottest at the very end of the reactor, but should have the hottest point in the last half of the reaction chamber.

The thermal profile can be controlled by placement of the air jets or apertures along the length of the combustion channel. The placement is affected by the combusting fuel. Hydrogen burns in a facile manner and is best suited to a more even distribution of air that includes jets along most of the length of the reactor. Less facile combustion fuels such as methane or natural gas requires more air toward the front and center of the reactor and less toward the end. Methane is more challenging to burn and requires additional time for air and fuel to contact each other and burn along the length of the reactor.

An additional consideration in selecting the optimal thermal profile within the reactor is the coking potential on the endothermic reaction. As an example, a steam reforming reaction with a relatively high steam-to-carbon (>2.5:1) can tolerate a much cooler front end temperature to avoid coking (<800 C). A steam reforming reaction with a relatively low steam-to-carbon (<2.5:1) may utilize a higher front-end temperature (>800 C) to avoid coking. The coking potential can be weighed in conjunction with the thermal stresses to tailor both the front end temperature and the slope of the increasing thermal profile along the length of the reactor.

Preferred Characterictics:

| Element | Preferred | More Preferred | Most preferred |
|---|---|---|---|
| Endothermic chamber volumetric heat flux (W/cc) | at least 2.5 | 10 to 1000 | 200 to 600 |
| Volumetric heat flux (W/cc) | at least 0.6 | 10 to 250 | 50 to 120 |
| Area heat flux (W/cm2) | at least 1 | 10 to 100 | 10 to 50 |
| Combustion dP | <10 bar | <3 bar | <2 bar |
| Endothermic reaction dP | <10 bar | <3 bar | <1 bar |
| Combustion CT | <100 ms | <50 ms | <25 ms |
| Endothermic CT | <500 ms | <100 ms | <25 ms |
| NOx emissions | <100 ppm | <50 ppm | <10 ppm |
| CO emissions | <2500 ppm | <1000 ppm | <500 ppm |
| Thermal efficiency | >75% | >85% | >90% |
| Excess air | <50% | <25% | <10% |
| Combustion conversion (absolute) | >90% | >95% | >99% |
| Combustion fuel | H$_2$, methane, NG, hydrocarbon fuel | | |
| Approach to equilibrium on endothermic reaction | Within 80% of equilibrium | Within 90% of equilibrium | Within 95% of equilibrium |
| SMR conversion | >50% | >60% | >70% |
| SMR selectivity to CO | >50% | >60% | >65% |
| S:C on SMR side | <4:1 | <3:1 | <2:1 |
| SMR pressure | <1000 psig | <500 psig | <300 psig |
| Pressure differential | <900 psig, >5 psig | <500 psig, | <300 psig |
| Time on stream | >50 hours | >200 hours | >500 hours |
| Heat exchanger flux | >1 W/cm3 | >2 W/cm3 | >4 W/cm3 |

Low CO and $NO_x$ are measured from the exhaust of the combustion reaction. The output of a reforming reaction can be controlled to maximize $H_2$ production in which case, low CO selectivity is preferred, or syngas production, in which case, high CO selectivity is desired. For hydrogen production, a CO selectivity is preferably 75% or less, more preferably 68% or less and in some embodiments CO selectivity is in the range of 60 to 70%. "Pressure differential" refers to the pressure difference between an endothermic reaction chamber and an adjacent exothermic reaction chamber.

Various startup procedures are described in the Examples section.

One method of conditioning (or refurbishing) a reactor, that contains a catalyst insert, includes steps of (1) raising the pressure in the reaction chamber that contains the insert, (2) lowering the pressure, and (3) operating the process. Pressure can be increased with the process gas or an inert gas. Surprisingly, it was discovered that this conditioning step will sometimes significantly improve reactor performance; perhaps this improvement is a result of the insert becoming better pressed against the reaction chamber wall.

Description of Some Preferred Embodiments

FIGS. 8-22 are engineering drawings of shims for fabrication. The shim shapes and dimensions shown in the drawings are illustrative but are not necessarily optimized and not necessarily from a single device but are intended to represent shim designs of devices that were manufactured and tested. Some of the figures may contain distances in inches and related lines or partial lines—these are artifacts of the design purposes of the figures and may be deleted.

Bonded ICR Device—Two-Stream Loop

In this embodiment, a single integrated device contains a reactor zone, a preheat or recuperative heating zone, and a manifold zone.

The device is characterized by a free-end to allow for thermal expansion and stress minimization at the hottest end of the device. To create a free-end, the reactant stream makes a U-bend to form the product stream. The combustion stream (combined fuel and air) makes a U-bend to form the combustion exhaust stream.

The flow orientations are characterized by a two-stream loop geometry. A reaction layer contains a reactant channel that flows through a manifold zone, through a pre-heat zone, and then into the reaction zone within the same reaction microchannel. This process reaction stream then makes a U-turn into a product return stream that flows countercurrent to the originating reaction channel. On the other side of the product return stream, a second reactant channel flows in a counter-current manner. At the top of the U-bend, the two process reaction channels join to form the common product return channel down the center. As the two process reaction streams merge into a single product return stream, there is an interspaced tongue to prevent direct flow impingement and corresponding instabilities.

Adjacent to the process layer, is a combustion layer. The outermost channels are comprised of a fuel channel. Fuel flows through a manifold layer at the bottom of device, then through the preheat or recuperative heat exchanger zone in a contiguous microchannel, and then into a combustion reaction zone. Air flows adjacent to each of the fuel channels through the manifold and exchanger zone. Air is then bled into the combustion zone through the use of jet orifices to meter air along the length of the combustion zone. The air channel stops before the U-bend section. The two fuel channels are joined near the end of the combustion zone. The two streams are merged into a single exhaust channel that flows down the innermost channel of the combustion layer. As the two combustion streams merge into a single exhaust return stream, there is an interspaced tongue to prevent direct flow impingement and corresponding instabilities.

The process reaction and combustion layers may be repeated multiple times to achieve the desired capacity. The terminating layer of the repeating unit is characterized by a single process reaction channel, adjacent to the combustion zone, which makes a U-bend into a product return channel that comprises flow from a single reactant channel. Flow in this outermost layer is half that in the inner repeating process layers.

The recuperative heat exchanger zone is comprised of 5 fluids that exchange heat. The repeating channels are as follows: product, reactant, fuel, air, exhaust, air, fuel, reactant, product, reactant, fuel, and so on. Heat from the product and the combustion exhaust stream, preheat the reactant, combustion fuel, and combustion air.

The five streams are manifolded at the cold end of the device. One fluid is manifolded directly out the bottom of the device. The other four streams are divided two per side. Each of the five manifold areas are then connected to external pipes to bring or remove fluids to or from the device.

Figure 8:
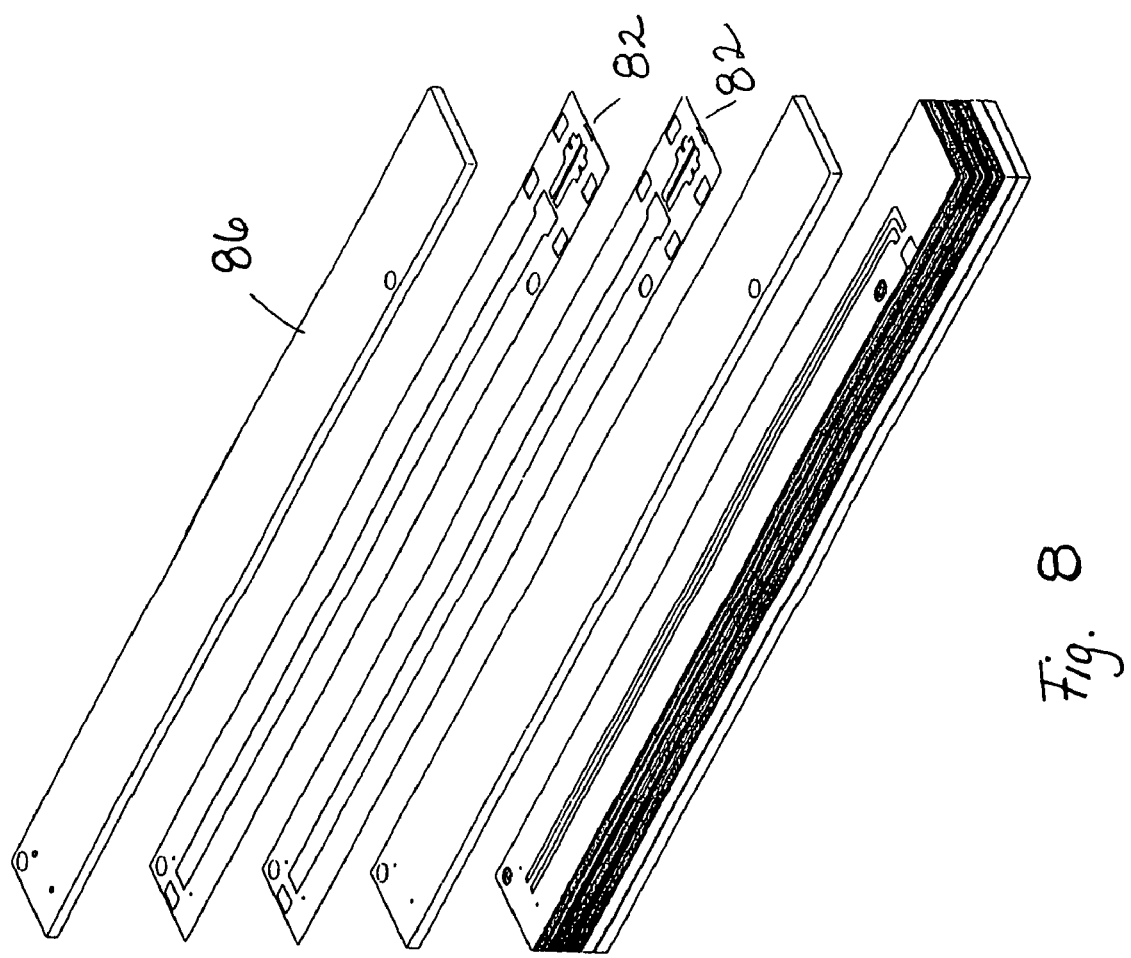

A typical ICR is made from numerous shims; for example an ICR has been constructed from the 63 shim stack shown in FIG. 7 (this device is sometimes referred to as a two-stream loop device). A partly exploded view of this device is illustrated in FIG. 8. The shim stack included sacrificial shims 82 located adjacent end plate 86. During the bonding process, the sacrificial shims deformed, relieving stress from the applied bonding pressure and reducing deformation of the process channels. The shims have a length of about 21 inches (53 cm), a width of about 1.4 inch (3.6 cm) and variable thicknesses (heights) ranging from about 0.25 mm to about 0.64 mm, and endplates as thick as 6.4 mm. Endothermic reaction channels are 9.7 mm wide. Air, fuel, exhaust, and two-stream loop product channels are 4.1 mm wide. There are two of each of these channels for every endothermic reaction channel. Single-stream loop channels on the outermost edges contain two product channels that are 33 mm wide.

The two-stream loop device was made using Alloy-617 metal shims that were diffusion bonded together to form a microchannel reactor. The Alloy-617 shims were initially formed by a combination of laser cutting and wire-EDM. Prior to having shims cut, the sheets of material were initially coated with an average 300-micro inch layer of Nickel-sulfamate (Acteron, San Carlos Calif.). End plates were made using conventional machining and they were also coated with an average 300-micro inch layer Nickel-sulfamate coating. The cut shims and coated endplates were cleaned in a denatured alcohol bath for several minutes and then wiped dry. Two different sets of shims were laser welded to preseal the air microchannel prior to diffusion bonding. The stacked shim set was diffusion bonded using a vacuum ram press at 1150° C. and approximately 29,700 force-pounds for 6 hours.

The diffusion bonded part was then machined using a plunge-EDM to open the slots on the sides and top of the device. The external manifolds for the air, fuel, and the SMR reactant and product lines were then TIG welded. The device was then cleaned by first pumping hexane into the device, soaking for 5 minutes, then pumping hexane through all the channels until it came out clean. The device was then purged with argon, and the procedure repeated using 20% nitric acid. Then de-ionized water was pumped through the device until the pH was >5, after which ethanol was pumped through the device for 30 seconds. Finally, the device was purged with argon for 5 minutes at a flow of ~10 SLPM. The cleaned device was then heat treated and washcoated with combustion catalyst (as described in the examples section). The oxide formed on the catalyst door and plugs was removed via grinding near the welding edge. The SMR catalyst was then loaded in the device. The exhaust manifold was welded to the device.

FIG. 9A shows one side of a partly assembled ICR 91 with slots 93 and 95. A view of the opposite side is shown in FIG. 9B with slots 97 and 99. The circled sections indicate the sections that are manifolded to handle flows into and out of the ICR. End 92 has catalyst insertion ports (described in greater detail below) and end 94 has exhaust ports (not shown) that feed into an exhaust manifold.

Figure 10:
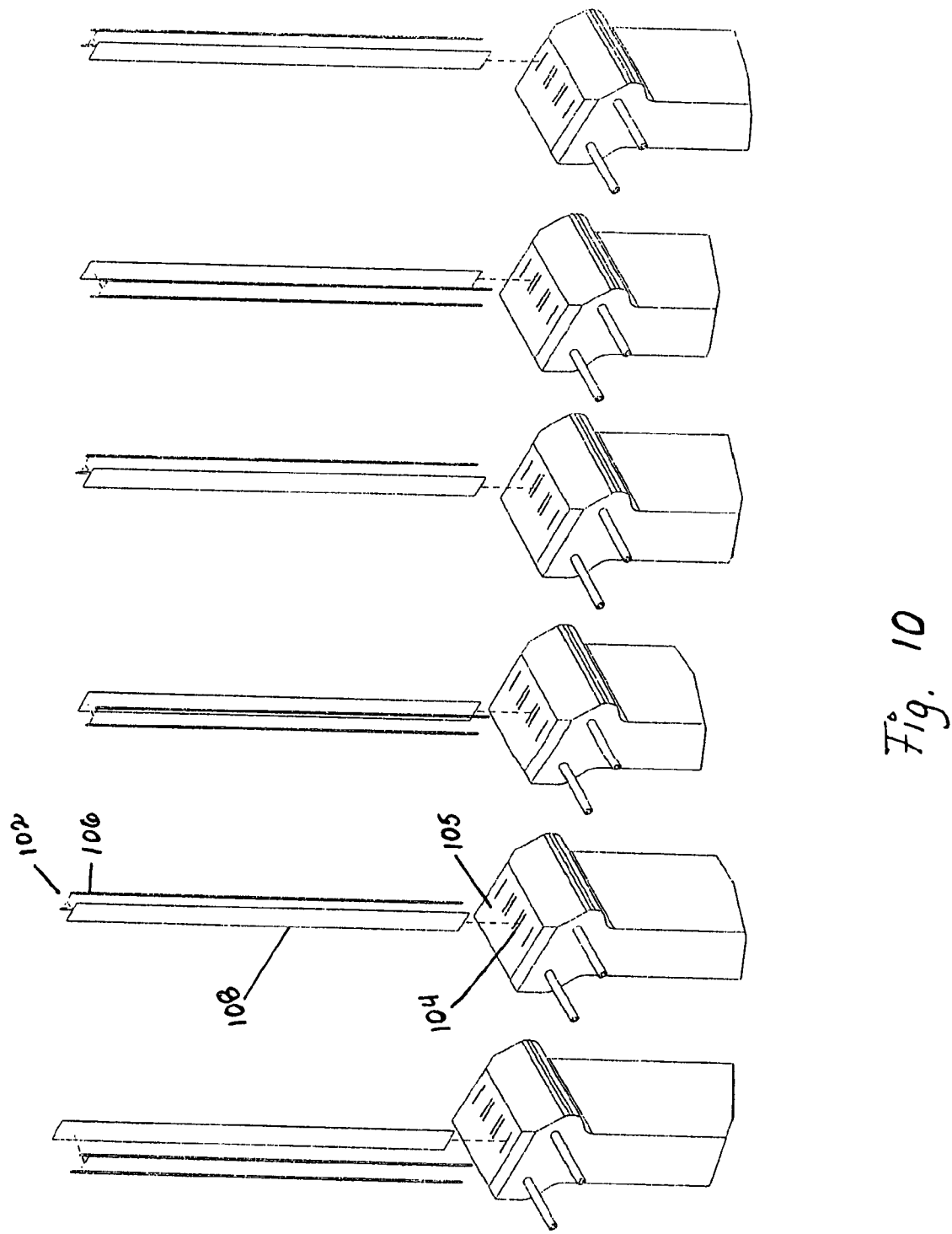

The insertion of catalyst inserts is schematically illustrated in FIG. 10. Each catalyst subassembly 102 is slid into insertion slot 104 and supports 106 brace the catalyst insert 108. After the catalysts are inserted, catalyst doors are inserted into each slot (the doors substantially blocking flow) and a slotted cap (not shown) was welded onto end 105 and the slots in the cap are welded closed, thus sealing one end of the endothermic reaction channels.

Figure 11:
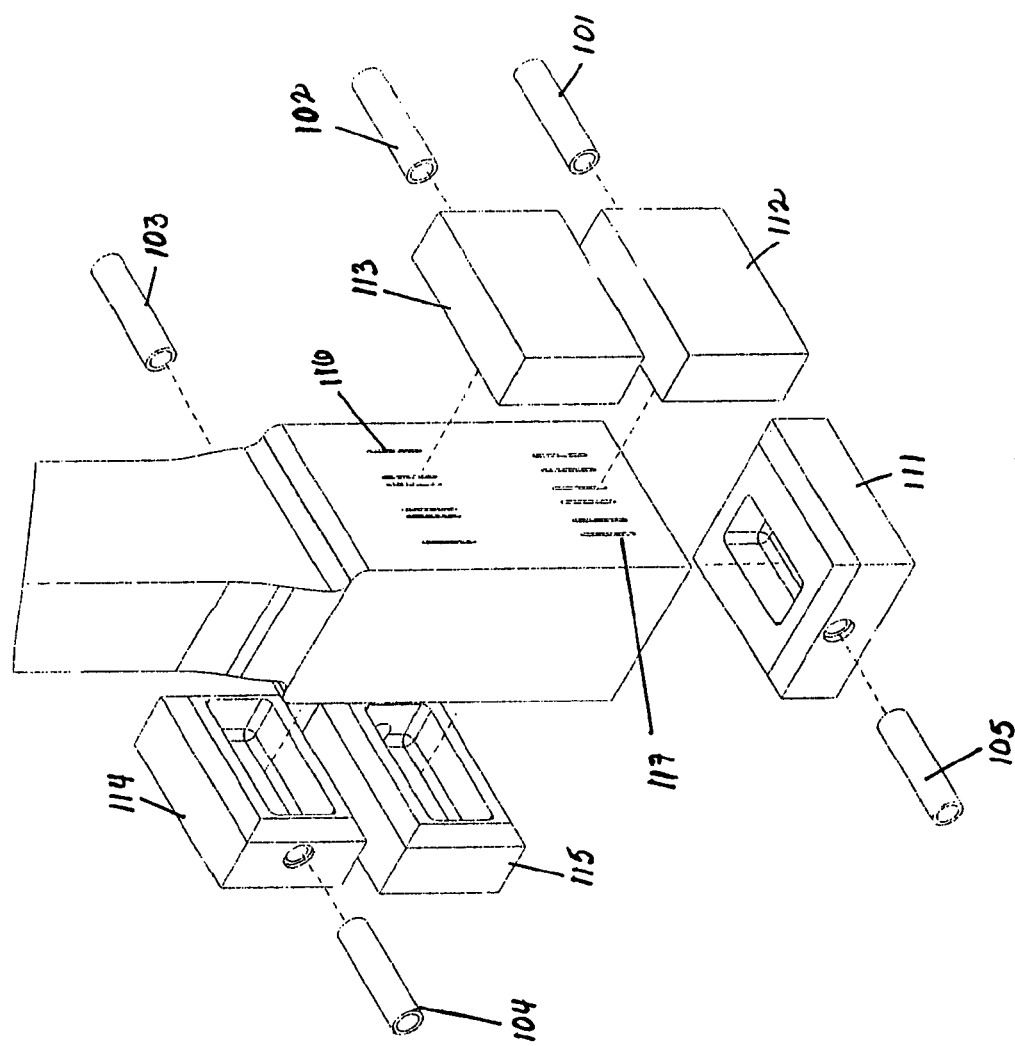
Figure 12:
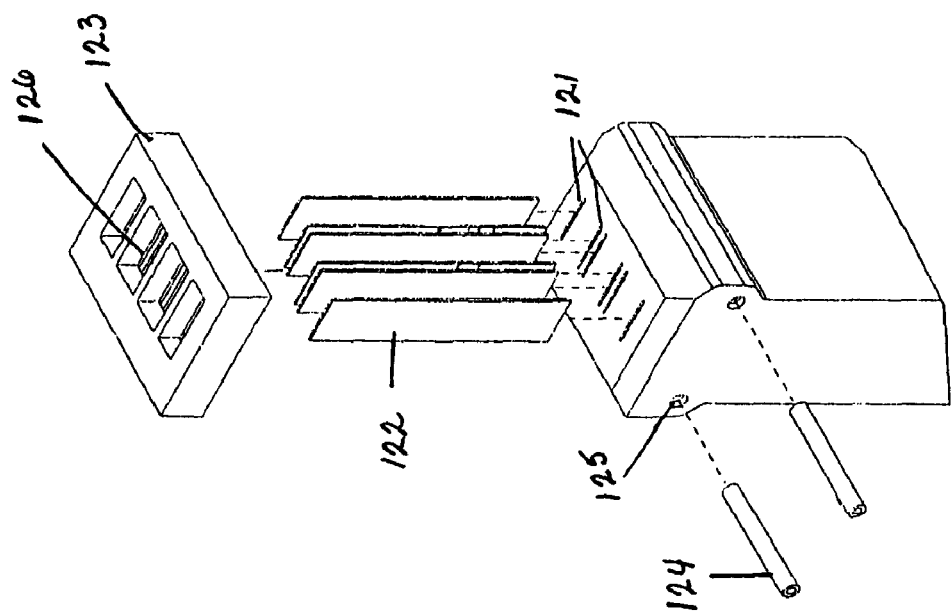

FIG. 11 is an exploded view of the manifold end illustrating fuel inlet 101, reactant inlet 102, air inlet 103, product outlet 104, and exhaust 105. Each of these tubes was welded into the corresponding manifolds 111-115. Reactant flows into reactant channels through reactant inlets 116 while fuel flows in through fuel inlets 117.

At the other end of the device (see FIG. 12) are catalyst access ports 121. Catalyst doors 122 are slid in through the access ports. The catalyst doors are metal strips that are sized to fit into catalyst channels and hold the catalyst insert in place. In one device, the catalyst doors had dimensions of 50 mm×10 mm×0.5 mm. A cap 123 is placed over the end of the device and grooves 126 were plugged prior to operation. Tubes 124 connect into catalyst precursor access ports 125 and provide for a combustion catalyst precursor composition.

FIG. 13 illustrates a 0.64 mm thick combustion shim of the type used in Example 2. The shim has flow channels 132 separated by rib support 133. During operation, fuel enters through the right, travels through the flow channels and exits through outlet 134. Metal area 135 is removed after bonding. Like all shims except one endplate, the shim contains catalyst precursor passages 136. Notches are cut into the combustion shim to receive and hold in place flow stabilization inserts immediately (~1 mm) upstream of the first air jet. The device of Example 2 included a porous flow stabilization insert in each fuel channel immediately upstream of the first point of air injection. These porous inserts were made from rectangular pieces of FeCrAlloy foam (~95 pores per inch) measuring 0.7 mm thick, 13 mm long (flow direction) by about 5 mm wide, although other materials of construction could be used to accomplish the same purpose.

FIG. 14 illustrates a 0.25 mm thick shim containing endothermic reaction channel 141 that is similar to the combustion shim except the reaction channel does not have a rib support.

FIG. 15 illustrates a welded subassembly containing a 0.64 mm thick air shim 151 containing air channels 152 sandwiched between wall shim 153 (0.25 mm thick) and jet shim 154 (0.25 mm thick). In the ICR device of Example 1, the jet shim contained 28 circular orifices with the first four jets near the beginning of the reactor zone (1 mm downstream) and the last two jets about 0.75" (19 mm) upstream of the combustion u-bend. The circular orifices had a diameter of approximately 0.31 mm with non-uniform center-to-center spacing along the length of the combustion channel. Along the width of the channel the orifice pair placement is alternately staggered on "quarter centers", i.e., ¼ and ¾ across the width of each of the channels in the combustion shim or 1.02 mm and 3.05 mm across each 4.06 mm wide channel. In the 28 jet construction, the first four jets (farthest upstream) were placed on both quarter centers of both channels on each jet shim and the remaining 24 jets staggered alternately as described above along the length of the reactor zone. Specifically, the orifice placement for the 28 jet construction was in pairs along the length of the reaction zone at locations of 1 mm (four jets) and 8, 15, 24, 34, 46, 58, 72, 87, 104, 122, 142, and 160 mm from the plane of the leading (upstream) edge of the SMR catalyst, staggered on quarter centers. In the ICR device of Example 2, the jet shim contained only 24 circular orifices at increasing intervals along the length of the reactor zone. Specifically, the orifice placement for the 24 jets were in pairs along the length of the reaction zone at about 1, 8, 15, 24, 34, 46, 58, 72, 87, 104, 122, and 142 mm from the plane of the leading (upstream) edge of the SMR catalyst, staggered on quarter centers.

The shims include alignment hole 155 and exhaust passages 156. The exhaust passages were isolated by laser welds 157. The air shim 151 contains a connecting channel 159 between the catalyst precursor pathway and the exhaust passages 156; after bonding, a catalyst precursor composition flows into the exhaust passages 156 and then into the exhaust and combustion channels. During the deposition of the combustion catalyst, the device was oriented with respect to gravity such that the catalyst precursor filled only the desired length (in this case, about 18 cm) of the combustion and exhaust channels.

Figure 16A:
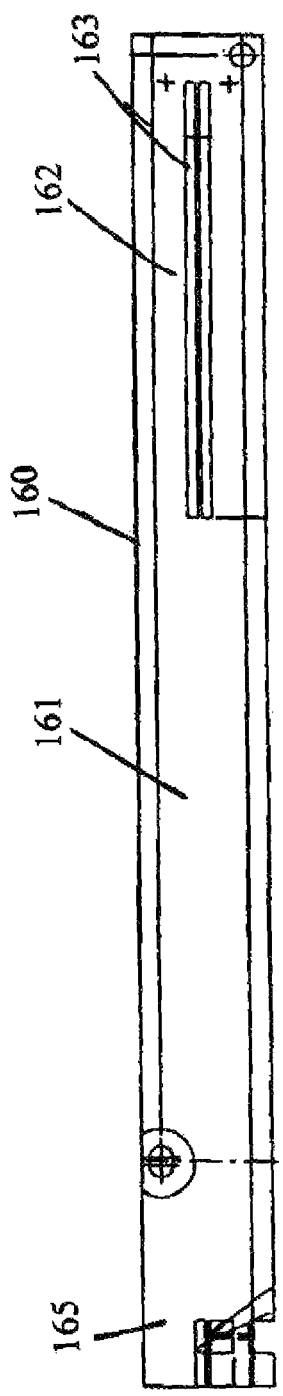
Figure 16B:
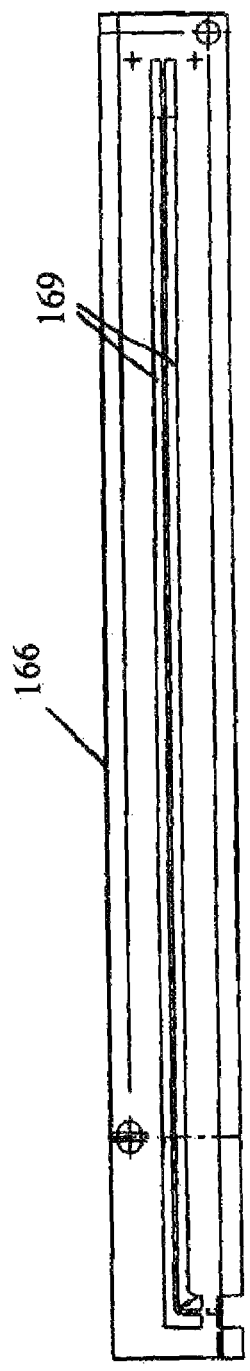
Figure 17:
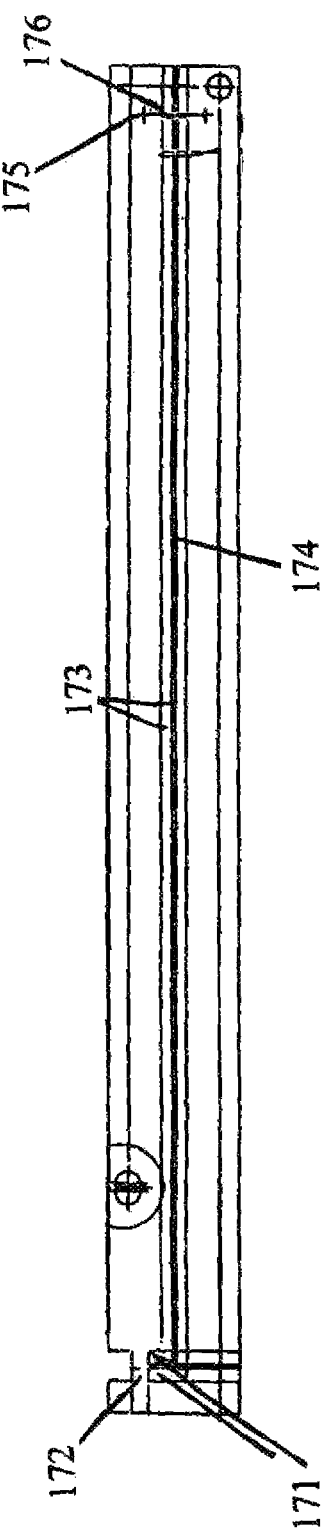

In an alternate construction (such as that used in Example 1) a 0.41 mm thick combustion shim 165 is illustrated in FIG. 16A that contains a solid heat transfer region 161 and combustion region 162 containing combustion channels 163. The combustion channels 163 provide additional volume for a combustion reaction that runs over the length of the combustion channel (7 inch, 18 cm). Shim 160 is bonded to 0.25 mm thick combustion shim 166 (see FIG. 16B) which has continuous flow channels 169. In this construction, each shims 165 and 166 together form a combustion channel that is more narrow in the preheat zone and provides combustion flow stabilization during operation (as discussed in the Examples section), eliminating the need for a flow stabilization insert. When this construction is used, shim 166 is stacked adjacent to the wall nearest to the air channel shim while shim 165 is stacked adjacent to the wall nearest to the endothermic reaction channel shim FIG. 17 illustrates a 0.64 mm thick air channel shim. Air enters through inlet 171 (metal strip 172 is cut off after bonding) and fills the length of channels 173. Dividing rib 174 has a width of 0.06 in (1.5 mm) Separate from, and unconnected to, the air channels 173 are u-bend passages 175 and catalyst precursor passages 176.

Figure 18:
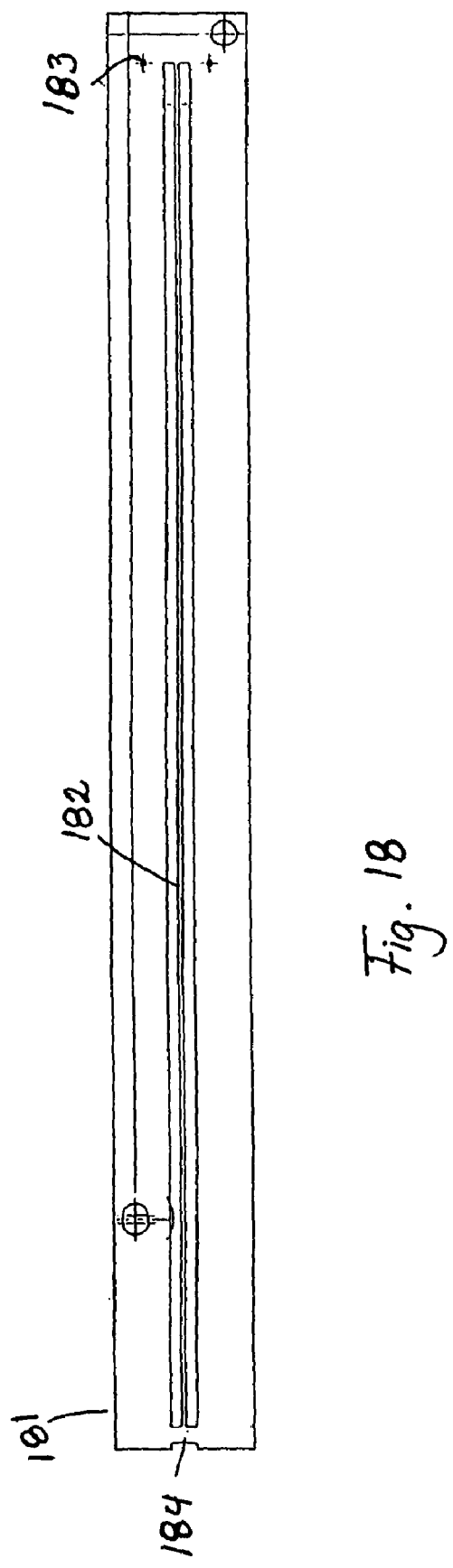

An exhaust channel shim 181 is illustrated in FIG. 18. A support rib 182 separates the channels, and catalyst precursor passages 183 are also present. Section 184 is removed after bonding to form a path to the exhaust manifold. Typically 3 similarly configured exhaust shims are stacked (i.e., 3 consecutively stacked exhaust shims) to form the exhaust channel and tongue. The shim thicknesses (height) of the exhaust channel shims in the order they are stacked is 0.36, 0.25, and 0.36 mm. The middle shim in the 3 shim exhaust stack forms the tongue feature and has a slightly shorter channel length, stopping about 5 mm short of the u-turn.

Figure 19:
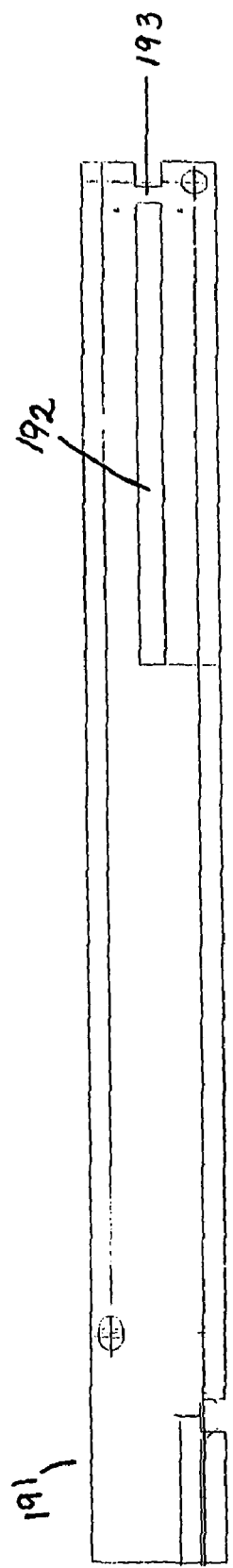
Figure 20:
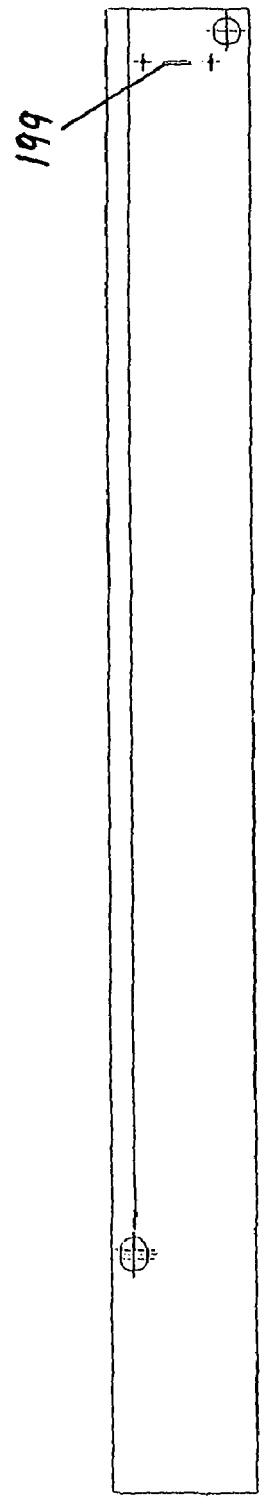

A 0.25 mm thick catalyst stop shim 191 (for the endothermic catalyst) is illustrated in FIG. 19. This shim contains a 188 mm channel 192 that holds in place the catalyst insert. Metal strip 193 is removed after bonding. FIG. 20 illustrates a shim (0.25 mm thick) that forms a wall for the endothermic reaction channel and separates the endothermic reaction channel from the endothermic product channel. A u-bend passage 199 allows passage of endothermic products.

Figure 21A:
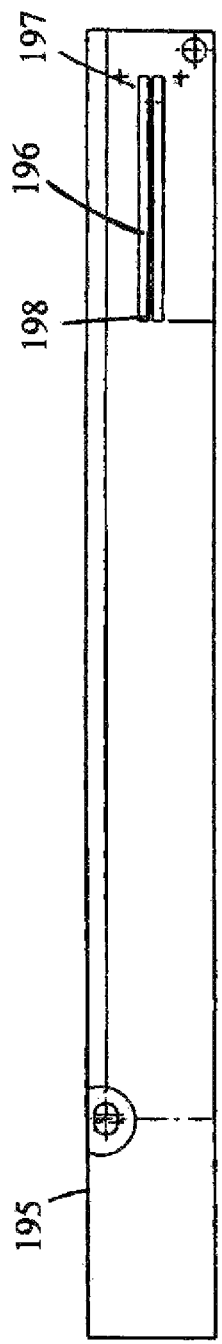
Figure 21B:
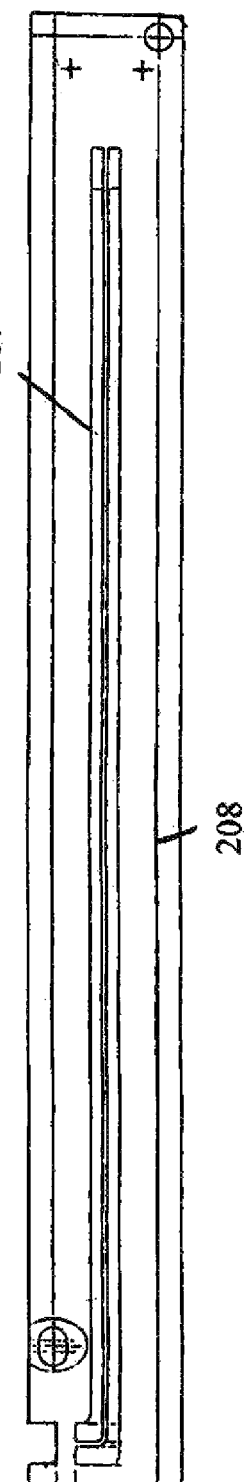

FIG. 21A illustrates a product channel shim 195 (0.25 mm thick). The illustrated shim has 4.5 inch (11 cm) channels 196 and is laser welded to the endothermic wall shim of FIG. 21B. FIG. 21B illustrates a second product channel shim (0.41 mm thick) with 44.3 cm channels 207. Product shim 208 forms the product channel tongue and is stacked between two product channel shims 195. In these channels, product enters at 197 from the u-bend aperture in the adjacent shim and then flows into endothermic product channel 207 in an adjacent shim 208. In the outermost product channels, where only a single reactant channel feeds the product channels, a slightly thinner product channel shim (0.36 mm thick) is used similar to product channel shim 208 (FIG. 21B) but with a longer channel, extending the entire 47 cm from the u-turn to the product manifold.

Welded ICR Devices—N and M Types have Essentially the Same Structure but Differing Catalysts A welded ICR was constructed from Inconel Alloy-617 and 625. All parts were made from a combination of conventional machining, wire EDM, and laser cutting. All parts were cleaned with hexane and heat treated. Oxide was removed via grinding near the weld edge, recleaned in alcohol and stacked. The device was perimeter welded using TIG welding. Tubing was welded to the device to form connections for air, fuel, exhaust, reactant and product.

Figure 22A:
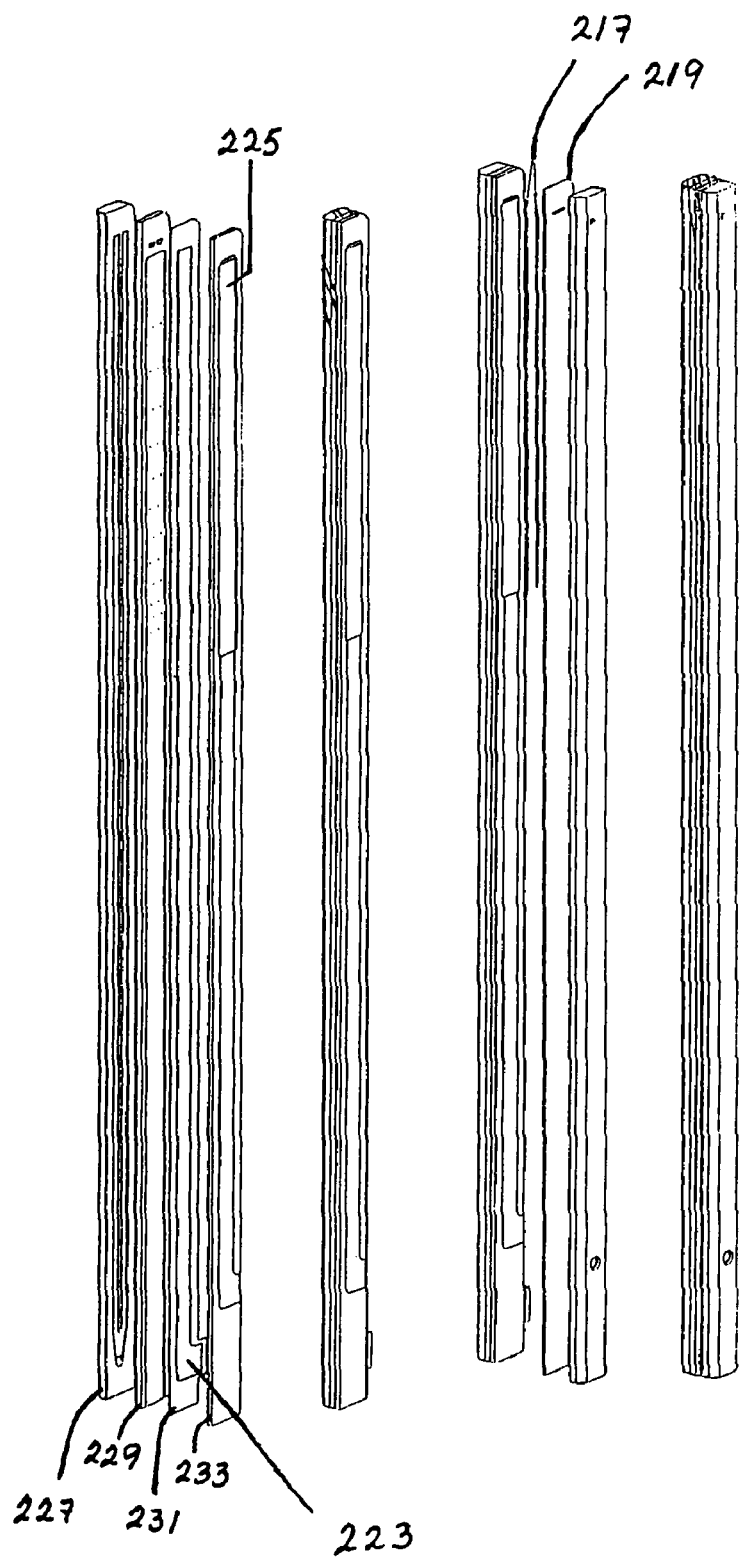

FIG. 22A shows an exploded view of the welded ICR. In the assembled device, fuel enters through fuel inlet 223. After welding the device, a steam methane reforming catalyst (including a metallic felt support) was placed into catalyst slot 225. The device was made by welding endplate 227 (3/8 inch thick with 0.014 inch channels), air shim 229 (20 mil air channel covered by a jet plate), fuel channel shim 231 (25 mil thick with channel machined through shim), endothermic reaction shim 233 (0.105 inch thickness including a 24 mil rib (not shown) that projected into the air channel, a 10 mil deep reactant channel, and 20 mil deep endothermic reaction chamber 225. For the N2 construction, 2 inches of the rib were machined off shim 233 and a Pox catalyst inserted into the fuel channel. Catalyst support strips 217 were tack welded in and contacted u-bend shim N19 and pressed the catalyst (not shown) against the wall of reaction chamber 225 which typically contained a 12 mil thick catalyst insert. U-bend shim 219 contained a u-bend orifice having dimensions of 60 mil× 380 mil. The other end plate was identical to 227 except the channels were 30 mil deep.

FIG. 22B shows a partially exploded view of the welded ICR-N design including product tube 20, air tube 22 and air manifold 24, exhaust tube 26, endothermic reactant tube 28, manifold 30, fuel tube 32 and manifold 34. In this tested device, outer plate 36 contains holes 38 for inserting thermocouples to monitor gas temperature.

Figure 22C:
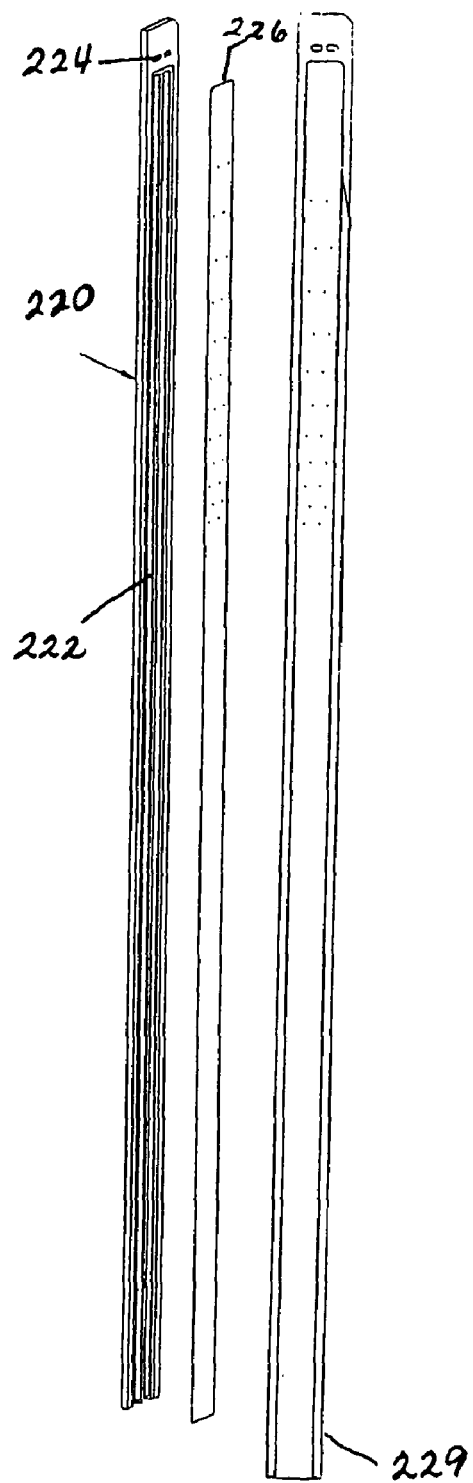

FIG. 22C shows that the two shims that make up welded jet subassembly 229. Conventionally machined air channel shim 220 has air channels 222 and exhaust u-bend 224. Jet shim 226 was laser welded over the air channel shim to form subassembly 229. This laser welding step forms a seal along the entire perimeter of the jet shim except at the air inlet on the manifold end, thus preventing the fluid in the air channels from bypassing the jet holes during operation. During operation, air from the jet subassembly passes through the jet holes and shoots against the catalyst-coated wall of the combustion channel that is adjacent the endothermic catalyst insert—thus causing combustion at the wall and maximizing the rate of heat transport into the endothermic reaction. The air channel shim had a thickness of 0.64 mm and the jet shim had a thickness of ~0.30 mm. The jet shim contained 2 slot orifices of approximate dimensions 0.31 mm by 0.91 mm including full rounds centered across the width of the channel at the beginning of the reactor zone. The first slot jet is oriented with the long dimension in the direction of flow (in the axial direction) whereas the second slot orifice is oriented with the long dimension orthogonal to the direction of flow. These two slots are followed by 10 circular orifices have a diameter of approximately 0.31 mm on staggered quarter centers. The final 2 orifices just upstream of the U-bend are paired on centered quarters with an approximate diameter of 0.31 mm. Non-uniform spacing is employed between successive jets.

Catalyst Insertion in Bonded Devices

The SMR catalyst inserts were in the form of a 178 mm long section of FeCrAlY felt coated with active catalyst material. The insert was nominally 0.25-0.30 mm thick and 9.4 mm wide. Alternatively, thinner or thicker materials could have been used, as well as wider or narrower sections of felt.

The catalyst section was inserted into the bonded integrated ICR reactor with an insertion tool. The insert included two metallic spacers (Inconel 625, 0.2 mm×0.2 mm cross section) that are held at each side of the felt to ensure that it sits against a channel wall while also maintaining an open gap for gas to flow adjacent to the catalyst.

The major components of the insertion tooling are the holding fixture, the pressure differential guide assembly and the pusher assembly. The holding fixture holds the device in position during the catalyst insertion. The pressure differential guide assembly contains a channel to hold the catalyst and spacers in position. It provides a guide for an insertion tongue which provides a vacuum to hold the catalyst and spacer assembly sandwich in place during insertion. The pressure differential guide assembly locates a pressure differential over the sandwich and provides a guide for the pusher assembly. The pusher assembly is a worm gear slide assembly. A direct current controlled stepper motor is used with pressure feedback to insert the catalyst.

Figure 24A:
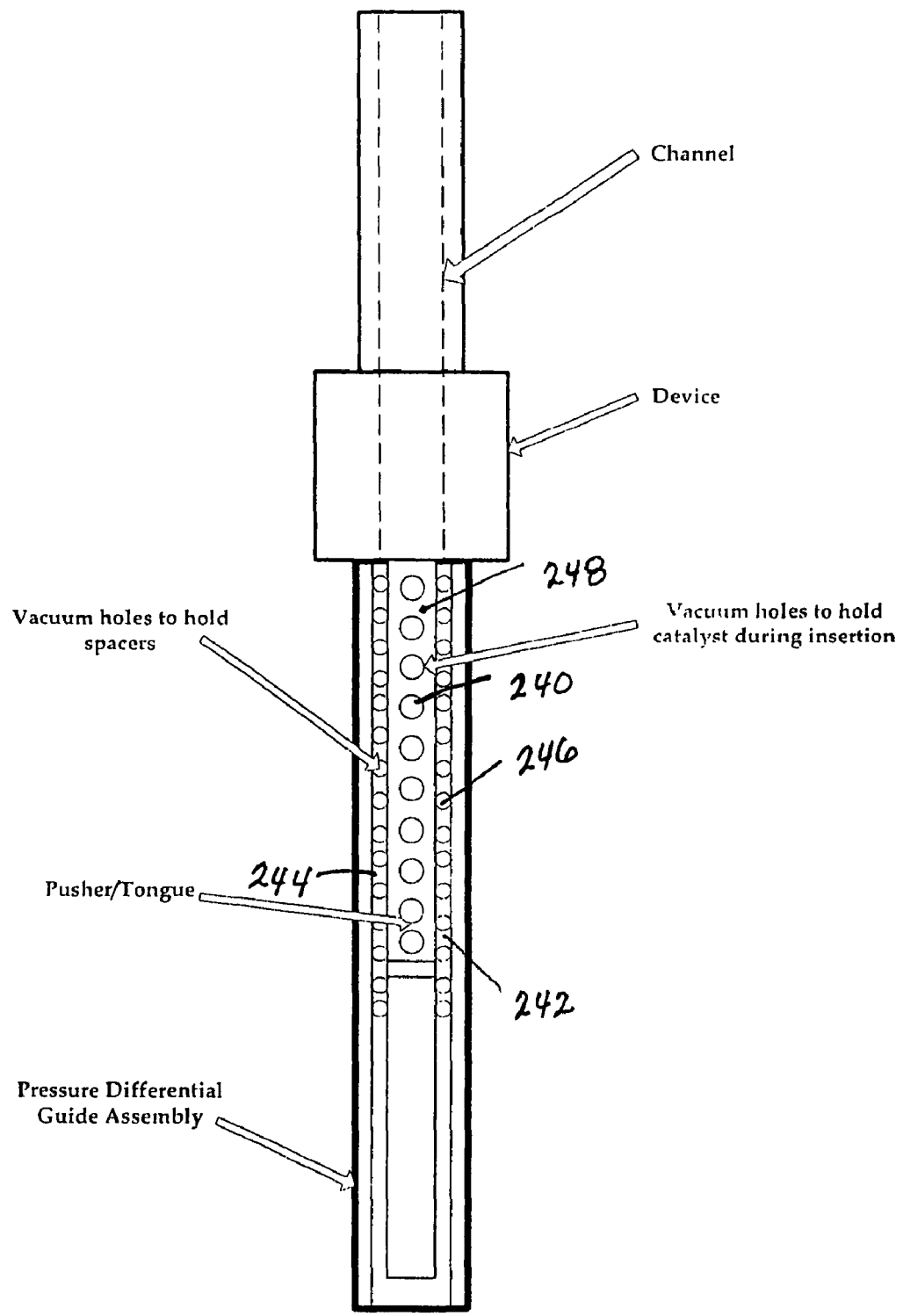
FIGS. 24A-24C illustrate tooling for inserting a catalyst insert into a bonded reactor.
Figure 24B:
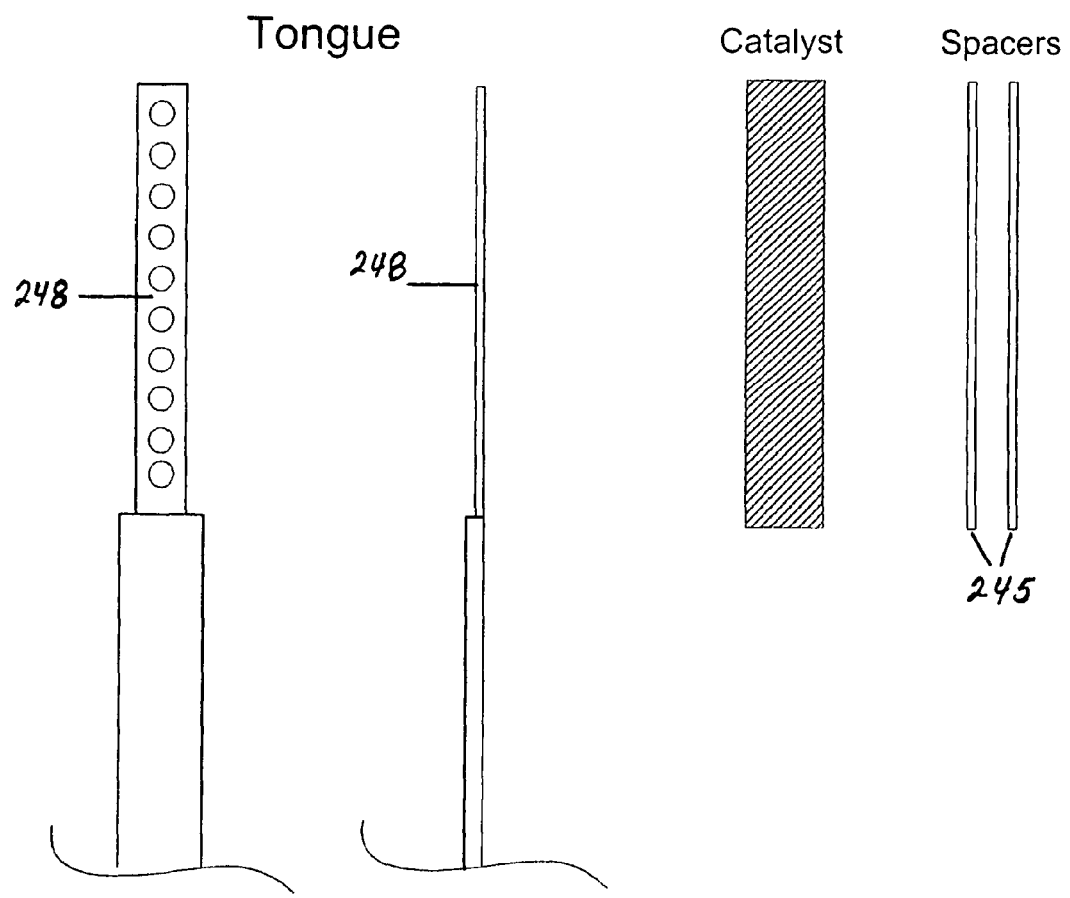

FIG. 24A shows a schematic plan view of the insertion tool. The spacers (245 in FIG. 24B) are loaded into channels 242, 244. Vacuum is applied through holes 246 to hold the spacers in place. The catalyst (not shown) is placed over the tongue 248 and spacers. A plate (not shown, having a thickness of 0.5 inch; the plate supports the top of the catalyst insert so that it does not buckle when being pushed into a microchannel) is placed over the sandwich created by the spacers and catalyst and catalyst is then pushed into the device. The side of the device is indicated schematically by the block labeled "device" and the internal channel is indicated by dashed lines. Tongue 248 is 6 mil (0.15 mm) thick and the pressure differential guide assembly is about 0.5 inch (1.2 cm) wide.

Figure 24C:
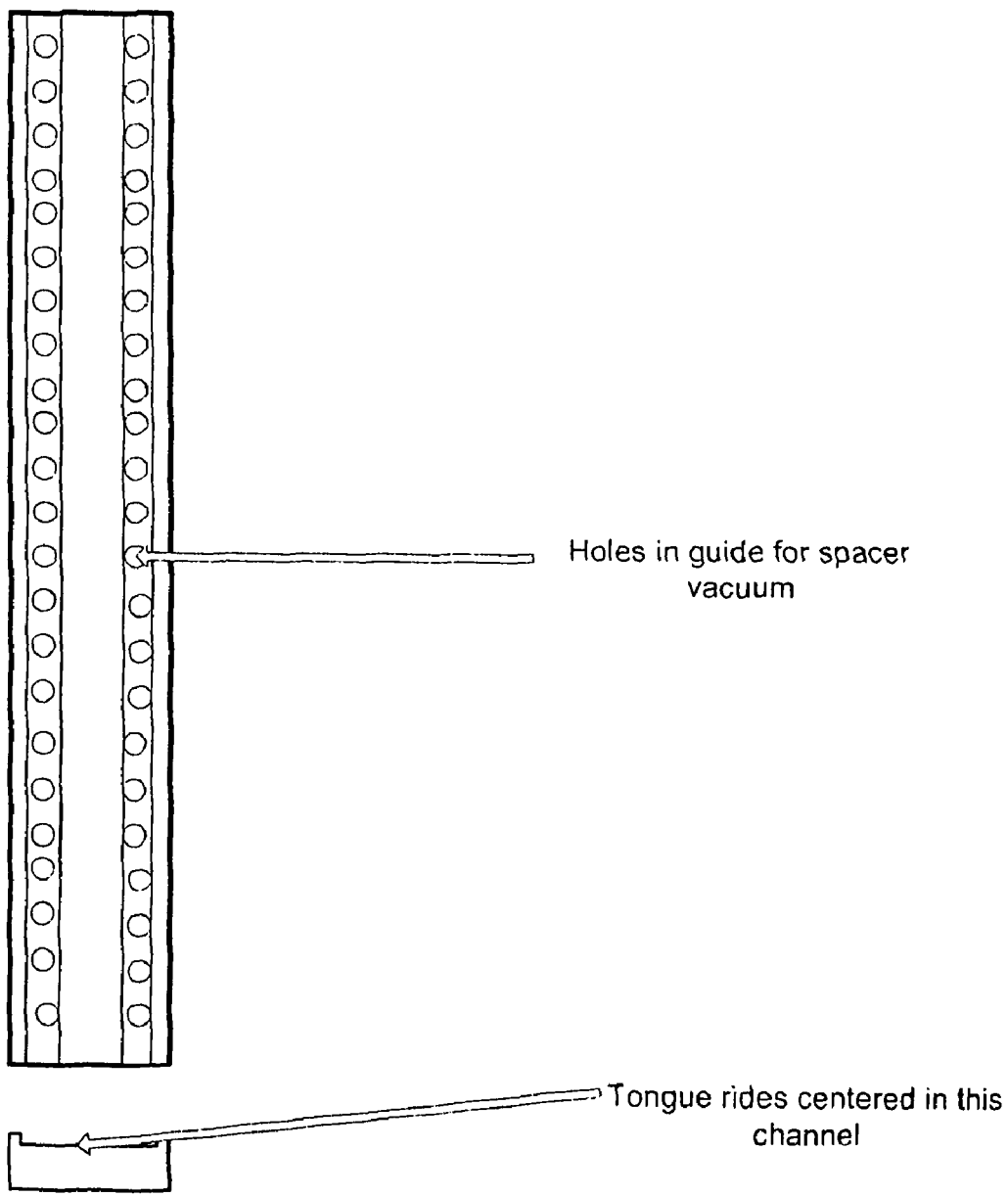

The bonded ICR reactor is placed within a holding fixture and clamped in place. The catalyst and spacers are concurrently inserted into the device with the aid of the tooling (see FIGS. 24A-C) that continuously applies a vacuum along the length of the catalyst section and spacer assembly. The vacuum ensures that the catalyst is held in place. The vacuum holding the spacers is released and the tongue which holds the catalyst in place via vacuum is then inserted into the nominally 20 mil high channel for the entire 7" (18 cm) length of the reaction channel. The pressure differential guide assembly and plate remain outside the device. The pusher assembly has an automated feature to monitor pressure or load down the length of the channel This ensures that the catalyst does not snag against a wall. When the catalyst has reached the end of the entire 7 inch reaction chamber, the vacuum is stopped and the catalyst releases to be adjacent to the wall. The vacuum acts to slightly compress the porous catalyst and when released, the catalyst expands and the catalyst and spacer assembly create a snug fit within the reactor.

Manifolding

The integrated ICR reactor system contains five distinct fluid streams connected to the device: process reactant in, process product effluent, air inlet, fuel inlet, and exhaust outlet. One fluid stream (exhaust) exits the bottom of the device. Alternatively, any of the other streams could be manifolded out the bottom, or cold end, of the device. The exhaust stream was selected to exit through the bottom of the device to minimize overall pressure drop. An external manifold is welded on the bottom of the device to connect the flow path to a pipe for easy connection in the testing infrastructure.

The four remaining streams are manifolded on the sides of the device. Each fluid enters or exits along the sides of the shims The fluid streams enter or exit at different levels along the length of the ICR. Each fluid is self-contained within a shim or several adjacent shims and does not break through the plane of a wall shim that separates each of the fluids within the device. There is no opportunity for an interstream leak except at the edge of the device if the external manifolds are not properly joined and sealed or if the shims are not properly joined and sealed in the area between the catalyst precursor pathways and the reactor fluid channels. Alternatively, streams could be made to share a common shim within the device, but this places additional challenges in manifolding and sealing streams.

For multi-stream devices, fluids may enter or be withdrawn at different heights of the device. This allows ease of manifolding while preventing interstream leakage as well as allowing for tailoring of the thermal profile of the exchanger. Streams that enter the device much warmer than other streams may be selected to be manifolded farther down the length of the device, or into the warmer section of the recuperator zone.

The air stream was manifolded from approximately 13 mm from the bottom of the ICR to approximately 64 mm from the bottom of the device. In this discussion, the device is viewed standing on one end with the fluid inlets and outlets on the bottom. However, the open slots allowing the air into the bonded device were only about 13 mm tall and allow the channels to turn approximately 90 degrees as it enters the integrated multi-stream recuperator zone. The height of the opening for air or other fluids is selected to generally minimize overall pressure drop. Smaller heights could be selected if higher pressure drops were allowable. Similarly if lower pressure drops were desired, then the inlets and outlets could be positioned closer to the reaction zones.

The fuel stream enters the device also approximately 13 mm from the bottom of the device to approximately 64 mm from the bottom of the device. The fuel was manifolded however on the opposite side of the ICR. The fuel enters along different planes from the air and is separated from all other streams via interleaved containment walls.

Farther along the length of the device, the process reactant and product were manifolded on opposing sides of the device. At roughly 7.5 to 11 cm from the end of the device, the product streams either enter or exit the device, respectively. External manifolds were welded on the outside of the device to join each like stream, and the manifolds join with external pipe connections. Each stream enters from the side and makes an approximately 90 degree turn before flowing straight through the device. The stream stays within the same microchannel from the time it enters the device, through the exchanger zone, through the reactor zone, around the U-bend, back through the exchanger zone, and then it exits as the process product effluent along a different plane and out the side on the opposing face of the hardware.

EXAMPLES

Preparation of the engineered steam reforming catalyst used in the Examples consists of catalyst powder preparation, slurry preparation, FeCrAlY felt preparation, and engineered catalyst preparation. The procedure for each step is described as follows:

Catalyst Powder Preparation:

Catalyst powder used for the steam reforming consists of 10 wt % Rh/4.5 wt % MgO/85.5 wt % $Al_2O_3$ The specific details of sample preparation are described below.

1) Spinel Support Synthesis
   1. Grind a neutral gamma-phase aluminum oxide, $Al_2O_3$ ($\geq 0.8$ cc/gram and $\geq 200$ m$^2$/gram), and sieve to +100-mesh
   2. Calcine the alumina powder at 350° C. for 3-hours at a ramp rate of 5° C./min
   3. In a container, add a known volume of the magnesium impregnation solution dropwise onto the alumina powder in a quantity sufficient to produce incipient wetness of the powder
   4. The magnesium impregnation solution is made by dissolving sufficient quantity of magnesium (II) nitrate hexahydrate (99%), $Mg(NO_3)_2.6H_2O$, in deionized water (at room temperature) which is then diluted to a volume (after dissolution of the precursor salt) of 1.87-mL per gram of precursor, using a shaker or ultrasonication to aid in dissolution
   5. Mix/blend the powder continuously during impregnation
   6. After impregnation, continue to mix and/or shake the catalyst powder for ~15-minutes
   7. Spread out and dry the catalyst powder at 100° C. for ~24-hrs
   8. Lightly re-crush the dried catalyst to break-up any agglomeration that occurs during drying
   9. Calcine the dry spinel catalyst powder at 900° C. for 2-hours at a ramp rate of 5° C./minute 2) Catalyst Synthesis
   1. In a container, add a known volume of the rhodium impregnation solution (rhodium nitrate solution, ~10wt % from Engelhard) drop wise onto the spinel powder in a quantity sufficient to produce incipient wetness of the powder
   2. Mix/blend the powder continuously during impregnation
   3. After impregnation, continue to mix and/or shake the catalyst powder for ~15 minutes.
   4. Spread out and dry the catalyst powder at 100° C. for 24-hrs.
   5. Calcine the dried catalyst powder at 500° C. for 3-hours at a ramp rate of 5° C./minute
   6. Re-sieve the catalyst powder to +100 mesh
   7. This should produce a catalyst powder with a composition of about 10-wt % Rh, 6-wt % MgO, and 84-wt % $Al_2O_3$.

Catalyst Slurry Preparation:

Catalyst slurry is used to coat the engineered substrate material (FeCrAlY felt), which consists of finely milled steam reforming catalyst in deionized water at a certain water-to-catalyst ratio.
   1. Combine the catalyst powder with deionized water in a water-to-catalyst weight ratio of about 6.5:1 and place in a ceramic milling container with 3-mm (diameter) highpurity alumina spherical grinding media in a media-to-catalyst weight ratio of about 20:1
2. Place on a ball mill grinder (U.S. Stoneware, Model 755 RMV) at the highest speed possible without cascading occurring in the milling container
3. Ball mill for 24-hours
4. Separate out the slurry from the milling media using a transfer pipette FeCrAlY "Felt" Preparation:

Substrates such as FeCrAlY felts are used as the support material for engineered catalyst (Technetics, Deland, Fla., 0.25 mm thickness with a porosity of 75%). Such supports are cleaned and heat-treated to grow a thin oxide layer. Subsequently, the support was coated with a sub-micron layer of alumina using chemical vapor deposition (CVD) technique to protect the substrate from corrosion under hydrothermal conditions and to provide an inert surface.

1. Cut the FeCrAlY alloy "felt" (nominally 0.25 mm thick) to the desired dimensions, using either mechanical, wire electrical discharge machining (wire EDM) or laser-cutting techniques. The required catalyst support dimensions were 11.9 mm×88.9 mm for the devices of Examples 3 and above (two catalysts were laid end to end to cover the 178 mm reaction chamber length) [welded ICR M and N devices] and 9.4 mm×178 mm for the devices of Examples 1-2 [bonded ICR devices].
2. Clean felts ultrasonically in acetone and then 2-propanol for 20 minutes each.
3. Dry felt pieces at 110° C. for 30 minutes.
4. Place the cut felt pieces in a furnace in air and heat to 900° C. at a rate of 20° C./min and hold at 900° C. for 2-hours, then allow them to cool to room temperature slowly (~20° C./min)
5. Flow $N_2$ gas containing aluminum oxide precursor such as aluminum alkoxide, particularly aluminum isopropoxide over the heat-treated felts in an oxidizing environment containing 14 vol % of $O_2$ under 5 Torr at 850° C. for 1.5 hours in a CVD chamber.

Engineered Catalyst Preparation

Engineered catalyst is prepared using a dip coating method to achieve a target weight gain of 0.1 g/in$^2$.

1. Dip the felts into the catalyst slurry under agitation; making sure entire felt is immersed at one time
2. Pull the felt out and allow excess slurry to drop out, wiping excess on the rim of the container if necessary
3. Dry the catalysts at 100° C. for 1 hour
4. Repeat 1-3 until a loading of about 0.1-grams of dry catalyst per square inch of metal felt substrate is achieved
5. Calcine the dried engineered catalysts according to the following temperature program:
   Ramp to 350° C. at a rate of 5° C./min and hold at 350° C. for 3 hours
   Cool slowly to room temperature (-5° C./min)

Combustion Catalyst

To coat the combustion catalyst in the devices of Examples 1-2, the device was heat treated in flowing air by ramping from room temperature to 1000° C. at 3.5° C./minute and then holding at 1000° C. for 3 hours. The device was then allowed to cool to room temperature at a slow ramp rate of 3.5° C./minute. The device was then flushed with DI water for particulate removal. The device was then heat treated again in flowing air by ramping from room temperature to 1000° C. at 3.5° C./minute and then holding at 1000° C. for 1 hour. The device was then allowed to cool to room temperature at a slow ramp rate of 3.5° C./minute. Throughout the heat treatment, hydrocarbon-free air from a cylinder was used to purge the device at a flow rate of 150 cc/min.

Then, syringe pumps were used to flood the device through the catalyst precursor passageways with a known volume of an aqueous solution of Ce and Pd salts at a Ce:Pd ratio of 4:1. 14.32 cc of Ce/Pd solution was needed to flood the device to a height of 7 inches (18 cm). After the desired volume of solution was flooded into the device, the solution was allowed to equilibrate for 2 minutes before being drained. Nitrogen was used to purge the device to ensure that the air holes were cleared from catalyst solution. Purging was done with nitrogen flowing from the combustion channel to the air channel The device was calcined in flowing air by ramping from room temperature to 850° C. at 3.5° C./minute and then holding at 850° C. for 1 hour. The device was then allowed to cool to room temperature at a slow ramp rate of 3.5° C./minute. Throughout the heat treatment, hydrocarbon-free air from a cylinder was used to purge through the device at a flow rate of 150 cc/min.

Combustion catalyst was applied in the welded ICR-M devices as follows. Shims were heat treated in air by ramping from room temperature to 1000° C. at 3.5° C./minute and then holding at 1000° C. for 1 hour. Shims were then allowed to cool to room temperature at a slow ramp rate of 3.5° C./minute. The shim surfaces of the combustion zone were coated with an aqueous solution of Ce and Pd salts at a Ce:Pd ratio of 4:1. A cotton applicator was used to brush the solution onto the shims. A total of 3 coats were applied. The assembly was purged with compressed nitrogen to ensure that the air holes were fully cleared before drying. A drying step was conducted after each coating (about 80 to 100° C. for 30 to 240 minutes). Shims were calcined in air by ramping from room temperature to 850° C. at 3.5° C./minute and then holding at 850° C. for 1 hour. Shims were then allowed to cool to room temperature at a slow ramp rate of 3.5° C./minute.

Shims were heat treated in air by ramping from room temperature to 1000° C. at 3.5° C./minute and then holding at 1000° C. for 1 hour. Shims were then allowed to cool to room temperature at a slow ramp rate of 3.5° C./minute.

Combustion catalyst was applied in the welded ICR-N devices as follows: the shim surfaces of the combustion zone were coated with an aqueous solution of Ce and Pd salts at a Ce:Pd ratio of 4:1. A cotton applicator was used to brush the catalyst solution onto the shims. A total of 3 to 6 coats of Ce/Pd solution were applied. In between coats, the shims were dried at 100° C. for 1 hour. 1 coat of an aqueous Pt salt solution was added and followed by drying at 100° C. for 1 hr. Shims were calcined in air by ramping from room temperature to 850° C. at 3.5° C./minute and then holding at 850° C. for 1 hour. Shims were then allowed to cool to room temperature at a slow ramp rate of 3.5° C./minute. For the welded ICR-N3 device, a pre-mixed La—$Al_2O_3$—$ZrO_2$ powder slurry was applied onto the surfaces of the combustion zone forming a coating of catalyst support. The shims were dried at 100° C. for 1 hour Shims were then calcined in air by ramping from room temperature to 1000° C. at 3.5° C./minute and then holding at 1000° C. for 1 hour Shims were then allowed to cool to room temperature at a slow ramp rate of 3.5° C./minute. A Ce/Pd solution was applied onto the La—$Al_2O_3$—$ZrO_2$ support that was previously coated in the combustion zone on the shims. A total of 3 Ce/Pd coats were applied. In between coats, the shims were dried at 100° C. for 1 hour. Shims were then calcined by ramping from room temperature to 1000° C. at 3.5° C./minute and then holding at 1000° C. for 1 hour. Shims were then allowed to cool to room temperature at a slow ramp rate of 3.5° C./minute 1 coat of an aqueous Pt salt solution was then applied. The shims were dried at 100° C. for 1 hour. Shims were then calcined in air by ramping from room temperature to 900° C. at 3.5° C./minute and then holding at 900° C. for 1 hour. Shims were then allowed to cool to room temperature at a slow ramp rate of 3.5° C./minute.

Bonded ICR Examples 1 and 2

The microchannel ICR reactor system in these examples had the two-stream loop design described in the above section entitled Description of Preferred Embodiments. The streams entering the device may either be at ambient conditions or at a slightly elevated temperature. A series of microchannel exchangers were optionally used to provide additional preheat to the streams.

A multi-channel bonded ICR device was designed, fabricated, and operated for over 300 hours. This device was formed from stacking metal plates of various thicknesses (0.25, 0.36, 0.41, 0.51, 0.64, and 6.4 mm) with various portions cut away to form channels for flow of the several fluid streams and diffusion bonding the stack together, with thicker plates placed in the outermost edges of the stack of plates (like bookends). The device included 3 exothermic reaction (combustion) repeating units flanked by endothermic reaction (SMR) channels.

The process side of this diffusion bonded device was operated with an SMR contact time of 9 ms, 2.5:1 steam:C, about 865 C, and 12 atm SMR outlet pressure. The combustion side of was operated with a fuel composition of 5-10% $CH_4$ and 6-9% $CO_2$ (balance $H_2$) with 5-10% excess air, and about 7 psig outlet pressure (due to losses in valves and equipment downstream of the device). The gas chromatograph calibration was checked every 8 hours and was recalibrated as needed.

Installation/Startup

The process reactant was preheated to 260 to 290 C using a microchannel exchanger system consisting of two types of exchangers which include an array of parallel microchannels. Type 1 was a single pass exchanger containing 50 microchannels which were 2.5 mm×64 mm×0.25 mm and heated with a resistance heating rod (Watlow Cartridge Heater, number E3A50) 2.5 mm from the microchannel array. Type 2 was a dual pass exchanger containing 100 microchannels which were 2.5 mm×114 mm×0.25 mm and heated with a resistance heating rod (Watlow Cartridge Heater, number G6A6032) 2.5 mm from the microchannel array.

The combustion air was preheated to 160 to 170 C using a microchannel exchanger same as Type 2 exchanger described previously.

Combustion fuel was neat hydrogen to startup the device. Pure hydrogen was selected as the startup fuel to avoid any coking potential within the device, however it was anticipated that the device could also be started up with some amount of a hydrocarbon fuel in the mixture. The fuel was not preheated externally to the device. Alternatively, the fuel could have been preheated with either a microchannel exchanger or a conventional heat exchanger. The typical inlet fuel temperature as measured at the inlet to the ICR was 80 to 110 C. The temperature above ambient is a result of gas heating via losses by line conduction from the hardware.

All inlet and outlet stream temperatures were measured using type K thermocouples placed in the connecting tubes to the ICR reactor system approximately 5 to 10 cm from the inlet or outlet of the integrated heat exchanger on the ICR reactor system. Pressure transducers were added to each of the inlet and outlet streams at similar locations.

The device was installed by connecting five Inconel 600 Swagelock tube fittings to the appropriate welded tube stubs on the ICR reactor system. The entire device installation time was less than an hour.

Thermocouples were installed on the outer surface of the ICR reactor system along the length of the exchanger portion and the reactor portion.

The required equipment included: the reactant feed Brooks 5850e and 5851e series mass flow controllers, Omega model FMA-A23 mass flow meters, NoShok pressure transducers model 1001501127 and 1003001127, Omega latching relay controllers model CNI 1653-C24, Swagelok variable pressure relief valves, thermal conductivity detector gas chromatograph, NOVA model 300 CLD Chemiluminescent NO/NOx analyzer, etc. All equipment were calibrated and verified for proper operation. Flowrates were calibrated against a primary standard calibrator, the Dry-Cal DC-2M Primary Flow Calibrator, which was calibrated and certified by BIOS International. Pressure transducers were calibrated using a Fluke pressure calibrator model 718 1006 with a Fluke 700P07 or 700P06 pressure module which were calibrated and certified by Fluke. The gas chromatograph and NO/NOx analyzer were calibrated against calibration gases blended and certified by Praxair Distribution Inc.

The ICR reactor system was pressure tested by first applying a static pressure to the SMR reactant line while plugging the SMR product line. The applied pressure was 217 psig and was generated using a nitrogen fluid. The pressure was left on this side of the device. Concurrently, the combustion side was pressurized to 48 psig while the SMR side was under pressure. The combustion side pressure may not exceed the SMR side pressure during pressure testing to maintain the mechanical integrity of the device. The leak rate did not exceed 0.5 psig in 15 minutes, and then the ICR reactor system was ready for operation. The combustion catalyst was not reduced or treated prior to operation.

The SMR catalyst was reduced at about 120 to 150 C. The ICR reactor system was heated by using the integrated combustion portion of the reactor. This process was initiated by flowing nitrogen on the SMR side at 15.7 SLPM. This corresponds to a flowrate comparable to an equivalent contact time of 20 milliseconds during SMR catalyst reduction. Nitrogen was then fed to the combustion side through the primary air inlet at 12.0 SLPM and through the fuel inlet at 5.0 SLPM. Air was then blended with the nitrogen entering through the primary air line and fed at a rate of 0.51 sccm. The hydrogen was then started on the fuel inlet at a flowrate of 0.11 sccm, which corresponds to approximately 100% excess air. The hydrogen lit off at room temperature, and as soon as it did the fuel and air ratio was changed to achieve 5% excess air. The heat released from combustion heats the ICR reactor system. The heat up rate was roughly 5 C/minute.

Startup control was important for appropriate catalyst reduction to achieve a near isothermal (+/−30 C) temperature distribution along the length of the 7 inch catalyst section in the ICR reactor system. Control was achieved by varying the flowrates of the fuel hydrogen and air concurrently while keeping them at 5% excess air. Increases in the fuel hydrogen were offset by reductions in the fuel nitrogen, and increases in the air flowrate were offset by reductions in the nitrogen flowing through the primary air line. This maintained a relatively constant flowrate to the combustion side of the ICR reactor system. It was important to maintain a roughly equal total flowrate of fluids in the combustion side during startup to create a uniform temperature profile. If the combustion fluids flowrate drops by 50% or greater, then the front of the catalyst section becomes much hotter than the end of the catalyst section (+/−60 C or higher). If the flowrate of the combustion fluids increases by 50% or greater then the back end of the catalyst section becomes much hotter than the front end of the catalyst section (+/−60 C or higher). In both scenarios, the catalyst does not properly reduce.

The SMR catalyst was maintained at 120-150 C (+/−20 C) for one hour. During this hour, hydrogen at 10% of the nitrogen (1.57 SLPM H2 and 15.7 SLPM N2) flowed by the SMR catalyst with a corresponding equivalent contact time of 18 milliseconds.

After the one-hour catalyst reduction process, the hydrogen on the SMR process side was stopped. Nitrogen remains flowing on the SMR side at approximately 15.7 SLPM. The flowrate of nitrogen was roughly equal to the total flowrate of SMR process reactants corresponding to an 18 millisecond contact time. The 18 millisecond contact time was the first flowrate of process reactants and by setting the nitrogen flowrate to an equivalent value there was a lesser change in temperature profile distribution in the ICR reactor system when the change occurs from pure nitrogen during startup to operation of the ICR reactor system. Next the SMR side was pressurized to system operating pressure, 160 to 170 psig outlet pressure, at 10-15 psig/min.

While nitrogen was flowing on the SMR side at a contact time of 18 milliseconds, the combustion fluid flowrates were changed to heat the device to 600 C. Startup control was also critical for uniform heating of the device and control of heating rate (not to excel 5 C/min as described previously). Control was achieved by varying the flowrates of the hydrogen and air concurrently while keeping them at 1:2.5 ratio which corresponds to 5% excess air. Increases in the fuel and air flowrates were offset by reductions in the fuel nitrogen and primary air line nitrogen flowrates, respectively, to maintain a constant flowrate to the combustion side of the ICR reactor system. It was important to maintain a roughly equal total flowrate of fluids in the combustion side during startup to create a uniform temperature profile and not exceed 5 C/min.

To start the ICR combustion side heating, air was turned on through the primary air inlet line and hydrogen through the fuel inlet line as described above while nitrogen also continues to flow into the system through the primary air inlet line and fuel inlet line. The initial flowrate of air and hydrogen were discussed previously. The fluids were changed by increasing the air and hydrogen flowrates within a minute of each other while maintaining their ratio at 5% excess air and turning down both fuel and primary air line nitrogen to maintain a constant overall flowrate. The constant overall flowrate roughly corresponds to the total flowrate of combustion fuel and air required to operate the SMR reaction at 18 ms at 600 C. By the time the device reaches 600 C, the nitrogen will be reduced to zero.

If the air and hydrogen mixture did not light-off at room temperatures, then the microchannel exchanger system could be used to heat the ICR reactor system until light-off was obtained. Typically the combustion side lights off at room temperature to 60 C. After light-off, the microchannel exchanger system was set to maintain the inlet temperatures required for the ICR reactor system. Additionally, although air was not fed with fuel through the fuel inlet inline in this test, this could have been done to assist in combustion conversion.

When the SMR side reaches roughly 400 C, hydrogen was turned on the SMR reactant side at 15% of the total flowrate of steam corresponding to a 6:1 steam-to-carbon ratio at a contact time of 18 milliseconds. This was roughly 2.5 SLPM. Within one minute, the water pump on the SMR side was turned on to the liquid flowrate of 3 ml/min. Over the next 10 to 15 minutes, the liquid water flowrate was turned up in 3 ml/min increments until the flowrate corresponded to a 6:1 steam-to-carbon ratio at 18 milliseconds (12 ml/min). As the hydrogen and water feed rates increased, the nitrogen flowrate on the SMR side was correspondingly turned down to maintain the total stream at an 18 ms contact time.

The device continues to heat to 600 C by changing the flowrates on the combustion side as described earlier. When the device reaches 600 C, the combustion flows were slightly increased in preparation for the initiation of the SMR reaction and corresponding heat sink. The flows were increased to roughly 1.4 SLPM hydrogen through the fuel inlet line, and 3.51 SLPM air through the primary air inlet line. Within a minute, the SMR methane was turned on to match a 6:1 steam-to-carbon ratio at 18 milliseconds. First the nitrogen and then the hydrogen on the SMR side were turned off and were not used again until shutdown of the ICR reactor system.

The initiation of SMR reaction created a heat load which required an increase in the combustion flowrates of hydrogen and air until the temperature stabilized. Then device was then heated to the desired operating temperature for the reactor portion. As previously discussed, the primary air line nitrogen and fuel nitrogen were decreased as the primary air line air and fuel hydrogen were increased, respectively, until the nitrogen to the primary air line and the fuel line were off. The steam-to-carbon and contact time were varied to the desired experimental conditions. As the steam-to-carbon and contact time were varied, the heat load on the SMR side increases and the combustion side flows were increased to maintain the desired reactor temperature. The procedure for turning up the combustion side flows was air then fuel, while turning down combustion side flows was fuel than air.

For the device, the temperature of the reactor portion of the ICR was heated to at least 800 C before reducing the steam-to-carbon to 3:1 or below. During the transition from startup conditions to operating conditions, the procedure for changing conditions on the SMR process side was to increase water flowrate before increasing SMR process hydrocarbon flowrate (i.e. going to a higher steam-to-carbon ratio then back to the desired steam-to-carbon ratio).

Additionally, hydrocarbon feeds may be added to the combustion fuel during this time or earlier with a corresponding correction to the air flowrate to maintain proper fuel to air ratio. The procedure for this process was to first increase the combustion primary air by the flowrate required to maintain the desired excess air ratio, then turn on the hydrocarbon flowrate and then turn down the hydrogen flowrate by the same energy output that the hydrocarbon flowrate was turned up.

The shutdown process was the reverse of the start-up process.

Emergency Shutdown

The ICR reactor systems has several interlocks which will turn off the combustion and SMR process reactant flows if preset operating temperature or pressure high or low limitations were exceeded. If a limitation was exceeded, within milliseconds reactant flows were stopped via power-to-open valves and nitrogen was turned on at 3-5 SLPM to both the SMR and combustion sides of the ICR reactor system. This flushes the device of all combustible fluids in less than 100 milliseconds, and will continue to flow until operator intervention resets the system.

Control Strategies

Several control strategies were implemented during the startup, operation and shutdown of the ICR reactor system.

First, during startup nitrogen and air were put into the primary air inlet line, and nitrogen and fuel were put into the fuel inlet line to better mimic the flow distribution when operating at full capacity. In this way the air and fuel could be distributed and mixed in a more favorable way for the relatively small combustion flows required during startup. By making the startup mixture less flammable this procedure also promoted a uniform catalytic combustion as opposed to homogeneous combustion which could tend to concentrate the heat input to only small localized regions. The temperature profile of the ICR reactor system along the 178 mm reactor length were controlled with total combustion flowrate (i.e. contact time) and stoichiometry (i.e. excess air). If the beginning of the reaction zone was too cool, the flows were reduced (by reducing air and fuel together, or only reducing nitrogen while maintaining air and fuel flowrates constant) to decrease the temperature near the end of the reaction zone. Alternatively, if the end of the 178 mm reaction zone was too cool, the flowrates were increased to create higher temperatures in that area. The ratio of fuel to air was also used to control the temperature profile of the ICR reactor system in the reaction zone without increasing or decreasing the total heat input. When the excess air was increased, the temperature maximum moved upstream, while a decrease in excess air (to as low as 3-5%) moved the temperature maximum downstream.

Secondly, the air and fuel were varied in the manner described previously to maintain temperature. This was achieved with a simple feedback control loop. A thermocouple in the web area of the ICR reactor system was chosen as the control point. When the system got too cool, the feedback control increased the flowrate of air and fuel into the ICR reactor system while maintaining the desired ratio of fuel to air. If the system got too warm, the feedback control operated in the reverse manner.

Thirdly, since changes in the ICR reactor system were typically gradual over several hours, the use of preshutdown indicators/alarms was vital to successful operation. These pre-shutdown indicators trigger at 15-40% of the value of the interlocks, hence they warn operators well in advance of a condition which would shutdown the system allowing operators to react and control whatever parameter was moving out of range. This allows the ICR reactor system to be operated without constant supervision, but still be able to be corrected should the system drift out of specification.

Fourth, the use of nitrogen during startup to imitate the total flowrate entering the SMR process side reduces the temperature shock magnitude as the SMR reactants were turned on and the SMR nitrogen was turned off. This was important as the small size of the ICR reactor system and its quick response due to the microchannel architecture make it susceptible to sudden and potentially harmful temperature changes.

Fifth, when combustion flows were increased the air was turned up before the fuel to prevent entering a fuel rich regime momentarily in which the combustion chemistry could change and alter the temperature profile along the ICR reactor system.

Sixth, when SMR process side flows were increased the change was always made such that a higher steam-to-carbon ratio was achieved prior to the endpoint steam-to-carbon ratio. For example, if both water and hydrocarbon were to be increased, then the water was increased first and the hydrocarbon secondly.

Results

The reactor operated over 300 hours, continuously producing equilibrium SMR products at an apparent equilibrium temperature of about 865 C. During the 300 hours of operation, a 9 ms SMR contact time, ~12 bar outlet pressure, and a steam-to-carbon ratio of 2.5 to 1 was maintained. During the first 50 hours of operation 5% excess combustion air was used, after which 10% excess air was used. More than 70 hours of the bonded ICR continuous operation were carried out with 10% methane in the combustion fuel feed. During the demonstration, little or no loss was observed in either SMR or combustion activity.

Detailed data from the testing can be found in Table 1. After the initial 25 hours, complete combustion was observed with 5-10% methane in the combustion fuel. The SMR reaction absorbed nearly 75% of the heat provided by the combustion reaction. CO and NOx concentrations in the dry combustion effluent were less than 0.1% and 8 ppm, respectively. In Table 1, average reactor temperatures were assumed to be the average of the three skin temperature measurements closest to the U-turn on one face, spanning the last quarter of the reaction zone. Skin temperatures reported in Table 1 were measured along the centerline of one face, tracking the edge nearest the middle combustion exhaust channel. SMR contact time was calculated based on the entire volume of the six SMR reaction channels, including catalyst, spacers, and flow-by gap adjacent to the catalyst. The dimensions of each SMR reaction channel were 17.78 cm long by 0.965 cm wide by 0.051 cm tall, for a total volume of 5.23 cm$^3$ (including all six channels). Some error was found to be associated with dry product exit flow measurements due to changes in the dry test meter calibration, thought to be due to water accumulation in the test meter. This, combined with minor errors in mass flow controller and GC calibrations, contributed to carbon balance errors in the range of ±15%.

Figure 25:
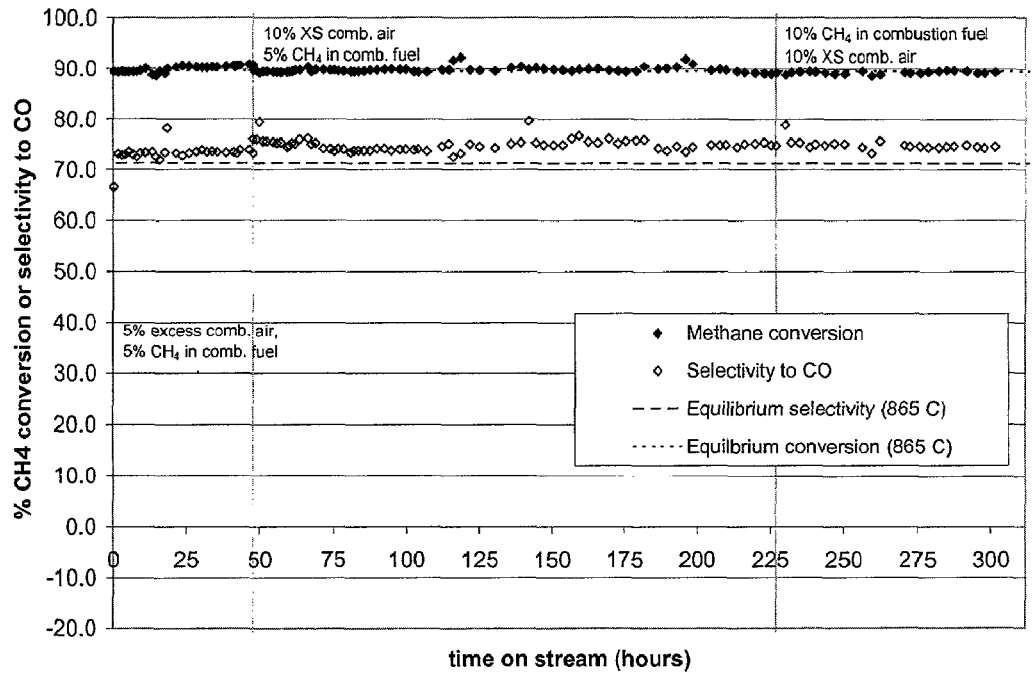
FIG. 25 shows measured SMR $CH_4$ conversion and selectivity to CO during operation of the bonded ICR device of Example 1 with methane in steam at 2.5:1 steam:C, 9 ms contact time, 900° C. average reactor temperature, and 12.8 atm average pressure. Also shown are predicted equilibrium values for conversion and selectivity at 865° C. and 12.8 atm (dashed lines).
Figure 26:
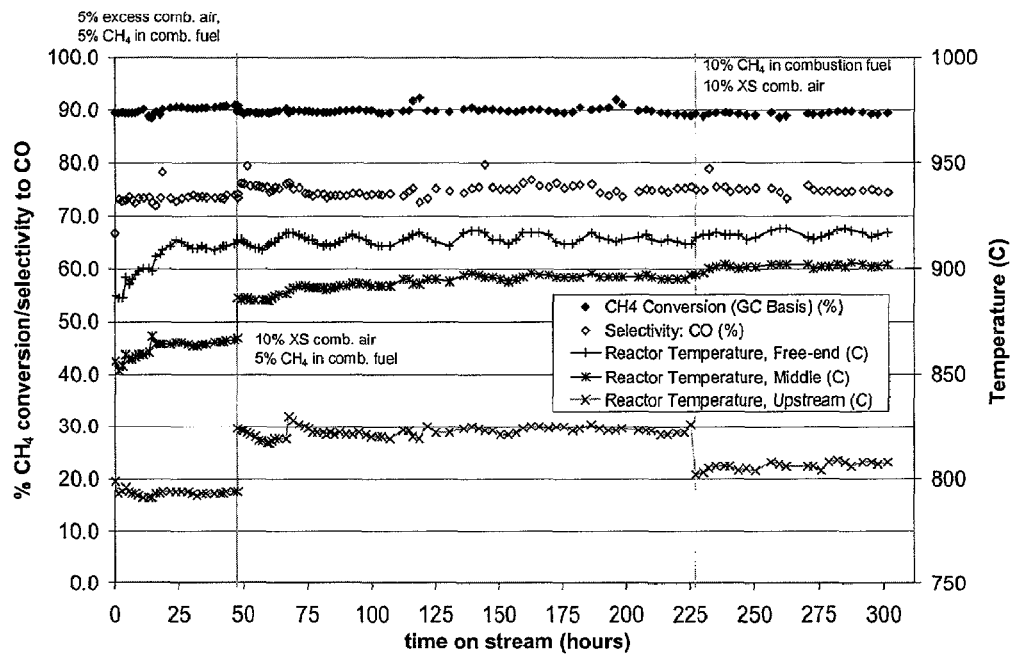
FIG. 26 shows measured SMR methane conversion and selectivity to CO (left axis) during operation of the bonded ICR device of Example 1 with methane in steam at 2.5:1 steam:C, 9 ms contact time, and 12 bar outlet pressure. Also shown are skin temperatures (right axis) measured near the inlet, middle, and end of the reaction zone.
Figure 27:
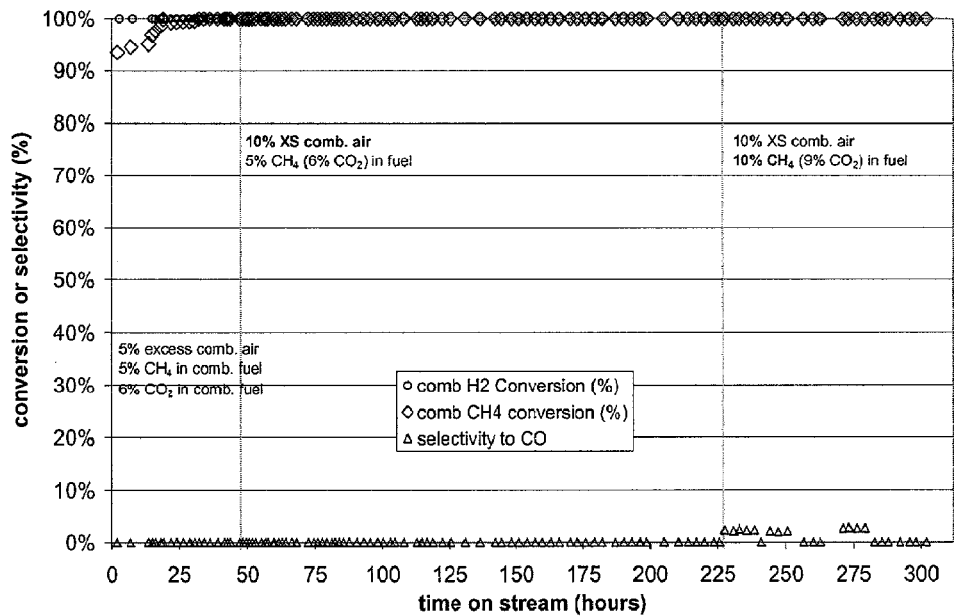
FIG. 27. shows measured values of combustion $H_2$ conversion and combustion $CH_4$ conversion and selectivity to CO during operation of the bonded ICR device of Example 1 for conditions of FIG. 26 and 9 ms combustion contact time.

Results during the 300 hours of operation of the device are shown in graphical form in FIGS. 25 to 27. Despite a few process upsets caused by balance of plant issues, the device performance was remarkably steady throughout the entire 300 hours of operation (see FIG. 25).

Device temperatures (see FIG. 26) were also quite steady during operation, although a pattern of cyclic behavior is seen in the temperatures which cycled with daily changes in the ambient temperature.

FIG. 27 shows the combustion performance. Note that during the first 25 hours of operation, the methane combustion conversion steadily improved until complete combustion was achieved. The dry exhaust showed no detectable CO until the methane concentration in the fuel stream was increased to 10% (about 225 hours on stream), at which point the CO concentration in the dry exhaust was <0.1%. The total combustion heat of reaction was the same for both the 5% and the 10% methane combustion fuel conditions, resulting in nearly identical average skin temperatures and SMR performance both before and after the change.

TABLE 1

Selected results from operation of the bonded ICR device of Example 1.

| | Initial performance | 50 hour 5% excess air | 225 hour 10% XS air | 10% CH4 |
|---|---|---|---|---|
| Time on stream (hours) | 1.5 | 46.5 | 225 | 298 |
| Air inlet gas temperature (° C.) | 163 | 162 | 164 | 164 |
| Fuel inlet gas temperature (° C.) | 81 | 81 | 84 | 84 |

TABLE 1-continued

Selected results from operation of the bonded ICR device of Example 1.

| | Initial performance | 50 hour 5% excess air | 225 hour 10% XS air | 10% CH4 |
|---|---|---|---|---|
| Exhaust gas temperature (° C.) | 330 | 332 | 343 | 347 |
| Air inlet pressure (Pa/$10^5$) | 2.12 | 2.13 | 2.21 | 2.25 |
| Fuel inlet pressure (Pa/$10^5$) | 2.30 | 2.31 | 2.43 | 2.50 |
| Exhaust outlet pressure (Pa/$10^5$) | 1.46 | 1.46 | 1.50 | 1.54 |
| Total fuel flow rate (SLPM) | 10.1 | 10.1 | 10.1 | 9.4 |
| Fuel $H_2$ content (%) | 89 | 89 | 89 | 81.3 |
| Fuel $CH_4$ content (%) | 5 | 5 | 5 | 9.7 |
| Fuel $CO_2$ content (%) | 6 | 6 | 6 | 9 |
| Air flow rate (SLPM) | 27.5 | 27.6 | 28.9 | 29.7 |
| % excess air (based on inlet) | 5 | 5 | 10 | 10 |
| % excess air (measured) | 12.9 | 12.8 | 25.0 | 27.5 |
| Combustion contact time (ms)$^a$ | 9.1 | 9.1 | 8.8 | 8.8 |
| Air pressure drop (Pa/$10^5$) | 0.66 | 0.67 | 0.72 | 0.72 |
| Fuel pressure drop (Pa/$10^5$) | 0.84 | 0.85 | 0.93 | 0.97 |
| Combustion $H_2$ conversion (%) | 100 | 100 | 100 | 100 |
| Combustion $CH_4$ conversion (%) | 93.5 | 100 | 100 | 100 |
| Comb. selectivity to $CO_2$ (%) | 100 | 100 | 100 | 100 |
| Comb. (carbon out)/(carbon in) | 0.49 | 0.50 | 0.62 | 0.67 |
| Combustion exhaust NOx (ppm) | not meas. | not meas. | not meas. | 7 |
| SMR inlet gas temperature (° C.) | 278 | 284 | 284 | 282 |
| SMR outlet gas temperature (° C.) | 317 | 324 | 326 | 326 |
| SMR inlet pressure (Pa/$10^5$) | 13.49 | 15.90 | 17.97 | 18.04 |
| SMR outlet pressure (Pa/$10^5$) | 12.32 | 12.39 | 12.18 | 12.25 |
| SMR average pressure (Pa/$10^5$) | 12.9 | 14.1 | 15.1 | 15.1 |
| SMR pressure drop (Pa/$10^5$) | 1.2 | 3.5 | 5.8 | 5.8 |
| SMR to comb. differential (Pa/$10^5$) | 11.0 | 12.3 | 13.1 | 13.1 |
| SMR $CH_4$ flow rate (SLPM) | 9.96 | 9.96 | 9.96 | 9.96 |
| SMR steam flow rate (SLPM) | 25.1 | 25.1 | 25.1 | 25.1 |
| Molar Steam to Methane Ratio | 2.5 | 2.5 | 2.5 | 2.5 |
| SMR contact time (ms) | 9.0 | 9.0 | 9.0 | 9.0 |
| $CH_4$ conversion (GC Basis) (%) | 89.3 | 90.8 | 88.9 | 89.2 |
| Selectivity: CO (%) | 72.9 | 73.4 | 74.9 | 74.4 |
| SMR (carbon out)/(carbon in) | 0.92 | 0.93 | 0.86 | 0.86 |
| Average reactor skin temp. (° C.)$^b$ | 876 | 901 | 902 | 905 |
| Equilibrium conversion T (° C.) | 863 | 873 | 860 | 862 |
| Equilibrium selectivity T (° C.) | 881 | 887 | ~900 | 898 |
| SMR rxn. heat/comb. rxn. Heat$^c$ | 0.740 | 0.746 | 0.733 | 0.734 |
| Average area heat flux (W/cm$^2$) | 14.0 | 14.2 | 14.0 | 14.0 |
| Reactor core volumetric flux (W/cm$^3$) | 64.7 | 65.9 | 64.6 | 64.8 |
| Endothermic reaction chamber flux (W/cm$^3$) | 275 | 280 | 275 | 275 |
| Skin temperature at u-turn (° C.) | 846 | 870 | 870 | 875 |
| Skin temperature 25.4 mm from u-turn (° C.) | 886 | 912 | 912 | 916 |
| Skin temperature 50.8 mm from u-turn (° C.) | 896 | 920 | 923 | 924 |
| Skin temperature 76 mm from u-turn (° C.) | 892 | 913 | 568 | 568 |
| Skin temperature 102 mm from u-turn (° C.) | 876 | 894 | 915 | 917 |
| Skin temperature 127 mm from u-turn (° C.) | 852 | 866 | 897 | 901 |
| Skin temperature 152 mm from u-turn (° C.) | 828 | 844 | 880 | 872 |
| Skin temperature 178 mm from u-turn (° C.) | 793 | 794 | 826 | 807 |
| Skin temperature 197 mm from u-turn (° C.) | 727 | 731 | 750 | 747 |
| Skin temperature 216 mm from u-turn (° C.) | 686 | 691 | 713 | 705 |
| Skin temperature 254 mm from u-turn (° C.) | 629 | 635 | 656 | 651 |

TABLE 1-continued

Selected results from operation of the bonded ICR device of Example 1.

|  | Initial performance | 50 hour 5% excess air | 225 hour 10% XS air | 10% CH4 |
|---|---|---|---|---|
| Skin temperature 343 mm from u-turn (° C.) | 487 | 492 | 506 | 504 |
| Skin temperature 431 mm from u-turn (° C.) | 352 | 357 | 363 | 363 |

[a]Combustion contact time is estimated assuming that all fuel and air pass through the entire fuel channel and that combustion only occurs in the region upstream of the U-turn.
[b]Average metal temperature over last quarter of reaction zone.
[c]Absolute value of ratio of isothermal heats of reaction (at estimated reaction temperatures), based on measured conversions and flow rates.

The average reactor temperature was calculated as the average of the perimeter metal or metal web thermocouple measurements made along the last 25-30% of the reactor (furthest downstream).

Over 300 hours of operation, the SMR reactant inlet pressure increased from 180 psig to about 245 psig while the SMR product outlet pressure was maintained at about 165 psig. SMR methane flow rate was maintained at 10 SLPM. SMR liquid water flow rate was maintained at 20 cc liquid per minute. The temperature of the SMR reactant inlet gas temperature was maintained at about 283 C and the SMR outlet gas temperature maintained at about 325 C throughout operation.

These results are superior to any prior art device that would be operated at the same contact time.

For the first 50 hours, the bonded ICR was operated with 5% excess air (by volume) for combustion, then 10% excess air for the next 250 hours. For the first 225 hours of operation the fuel contained 5% methane, 89% hydrogen and 6% $CO_2$, and then changed to 10% methane, 81% hydrogen and 9% $CO_2$ for the next 75 hours of operation. Throughout operation, the air inlet temperature was about 160 C, the fuel inlet temperature was about 80 C, and the exhaust gas temperature was about 330 C for the first 50 hours, increasing to about 343 C for the next 175 hours and then increasing to about 347 C for the last 75 hours.

Example 2

Bonded Device; Results and Discussion

The bonded ICR device of Example 2 was demonstrated using methane and steam at 2.5:1 steam:C, 850 C and 12.5 atm. Testing included 88 hours at 6 ms followed by >300 hours at 9 ms. Combustion fuel composition was 5-10% $CH_4$, 0-2% CO, 6% $CO_2$, and the balance $H_2$. Excess combustion air was maintained between 3 and 7%.

Figure 28:
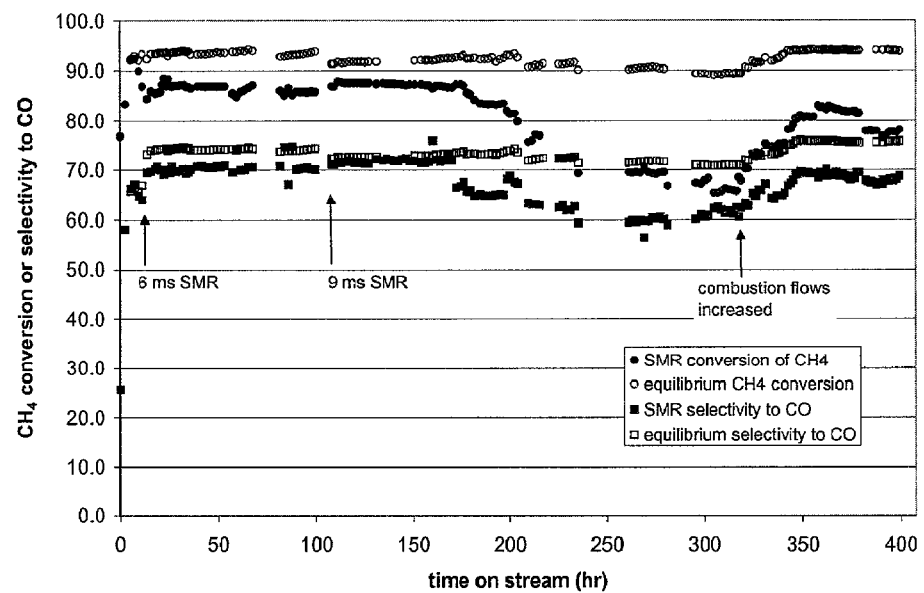
FIG. 28. shows measured SMR methane conversion and selectivity to CO during operation of the bonded ICR device of Example 2 with methane in steam at 2.5:1 steam:C, 850° C., 12.5 atm, and 6-9 ms contact time. Also shown are predicted equilibrium values for conversion and selectivity based on the average measured skin temperature in the last half of the reactor (i.e. closest to the free-end).
Figure 29:
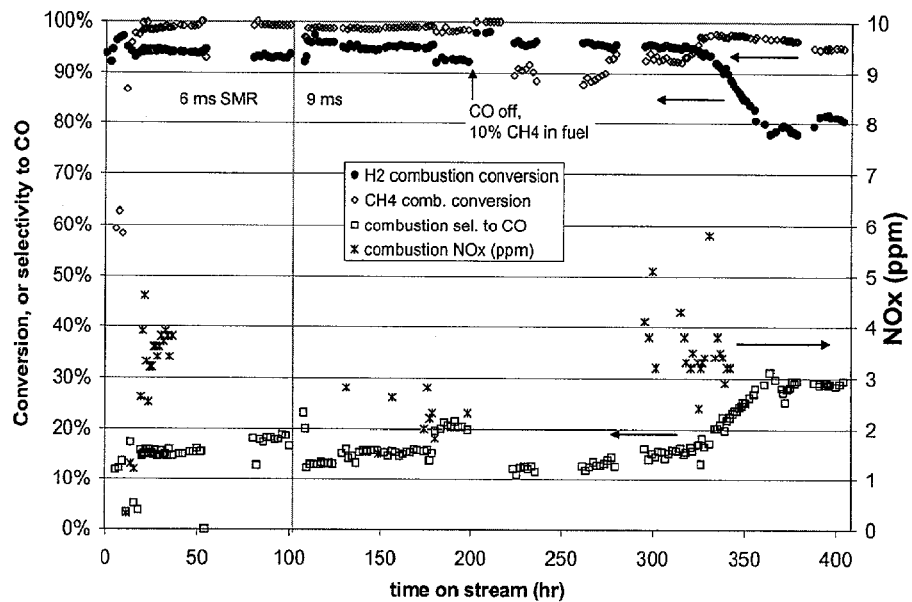
FIG. 29 shows measured combustion hydrogen conversion, methane conversion, and selectivity to CO (left axis) and dry combustion exhaust $NO_x$ concentrations (right axis) during operation of the bonded ICR device of Example 2. Combustion fuel composition was 5-10% $CH_4$, 2-0% CO, 6% $CO_2$, with the balance $H_2$. Note that selectivity to CO is defined as the fraction of CO and $CH_4$ fuel fed to the combustor which exits the combustor as CO.
Figure 30:
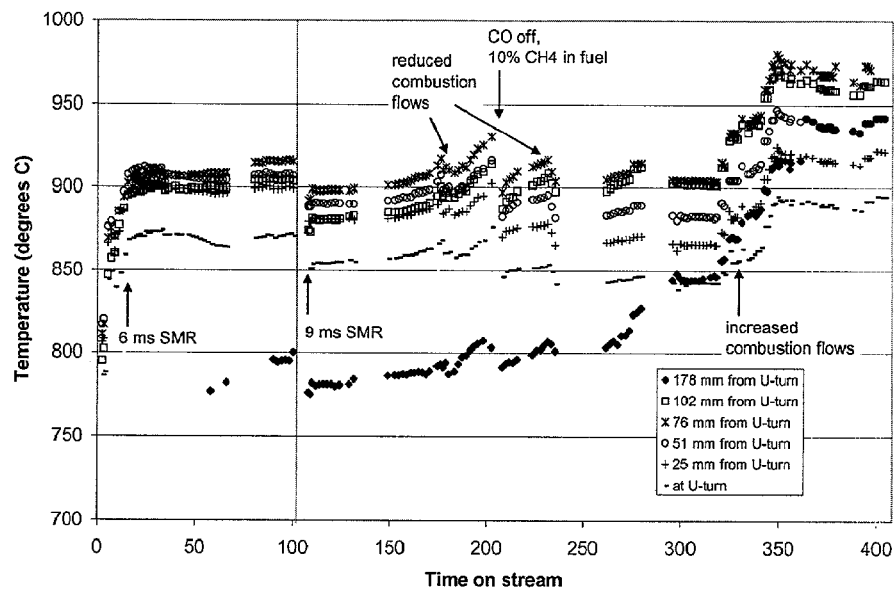
FIG. 30 shows measured skin temperatures along centerline during operation of the bonded ICR device of Example 2. Combustion fuel composition was 5-10% $CH_4$, 2-0% CO, 6% $CO_2$, with the balance $H_2$.
Figure 31:
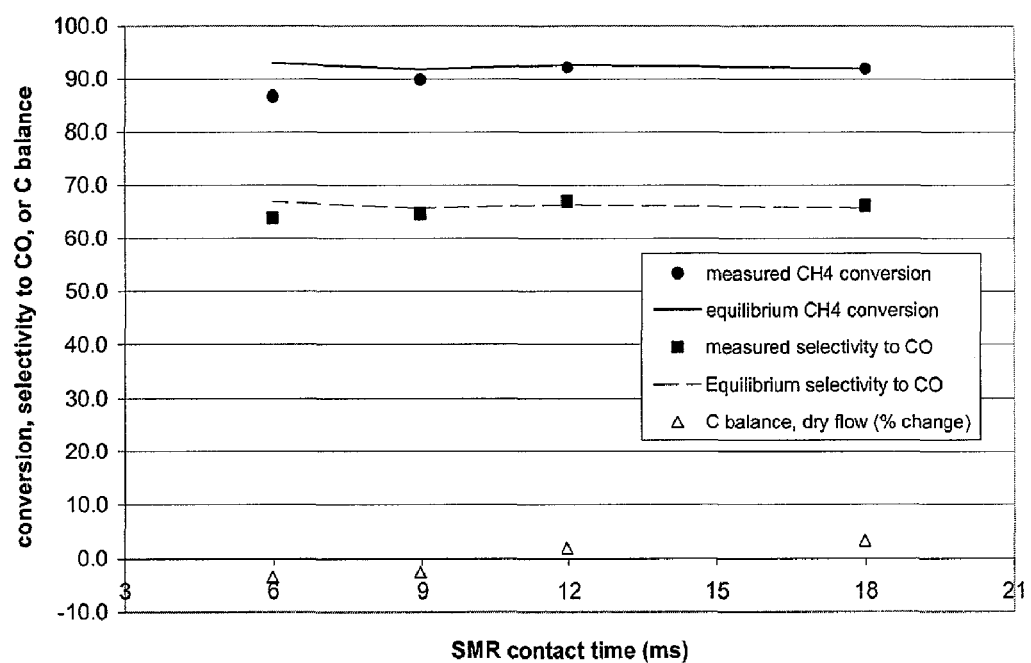
FIG. 31 shows measured SMR methane conversion, selectivity to CO, and carbon balance during operation of the bonded ICR device of Example 2 with methane in steam at 3:1 steam:C, 850° C., 12 atm, and 6-18 ms contact time. Also shown are predicted equilibrium values for conversion and selectivity based on the average measured skin temperature in the last half of the reactor (i.e. closest to the free end).

Results of the testing are shown in Table 2 and FIGS. 28-31. In Table 2, average reactor temperatures were assumed to be the average of the three skin temperature measurements closest to the U-turn on one face, spanning the last quarter of the reaction zone. Skin temperatures reported in Table 2 were measured along the centerline of one face, tracking the edge nearest the middle combustion exhaust channel FIG. 28 shows the SMR performance over the entire 400 hours of operation. In FIG. 29, combustion results are shown from the bonded ICR testing. One surprising result shown in FIG. 29 is combustion $CH_4$ conversions which exceed the $H_2$ conversion. Another is the increase in CO and decrease in $H_2$ conversion when the reactor is heated to above 950 C. One explanation for these observations is that the methane combustion does not go to completion in the combustion zone at these high combustion flow rates, partially oxidizing to hydrogen and carbon monoxide somewhere in the exhaust channel FIG. 30 shows how measured skin temperatures along the reactor length varied during operation. FIG. 31 shows SMR performance over a range of SMR contact times for a steam-to-carbon ratio of 3.0.

TABLE 2

Selected results from operation of the bonded ICR device of Example 2.

| Contact Time | 6 ms | 9 ms |
|---|---|---|
| Time on stream (hours) | 35 | 131 |
| Air inlet gas temperature (° C.) | 161 | 158 |
| Fuel inlet gas temperature (° C.) | 91 | 102 |
| Exhaust gas temperature (° C.) | 352 | 306 |
| Air inlet pressure (Pa/$10^5$) | 2.38 | 1.99 |
| Fuel inlet pressure (Pa/$10^5$) | 2.54 | 2.09 |
| Exhaust outlet pressure (Pa/$10^5$) | 1.67 | 1.47 |
| Total fuel flow rate (SLPM) | 14.4 | 9.76 |
| Fuel $H_2$ content (%) | 87.0 | 87.0 |
| Fuel $CH_4$ content (%) | 5.0 | 5.0 |
| Fuel $CO_2$ content (%) | 2.0 | 2.0 |
| Fuel CO content (%) | 6.0 | 6.0 |
| Air flow rate (SLPM) | 38.4 | 27.0 |
| % excess air (based on inlet) | 3 | 7 |
| % excess air (measured) | 6 | 11 |
| Combustion contact time (ms)[a] | 6.3 | 9.0 |
| Air pressure drop (Pa/$10^5$) | 0.71 | 0.52 |
| Fuel pressure drop (Pa/$10^5$) | 0.86 | 0.62 |
| Combustion $H_2$ conversion (%) | 94.0 | 94.8 |
| Combustion $CH_4$ conversion (%) | 98.8 | 98.4 |
| Comb. selectivity to $CO_2$ (%) | 84.2 | 84.1 |
| Comb. (carbon out)/(carbon in) | 0.79 | 0.78 |
| Combustion exhaust NOx (ppm) | 3.4 | 2.8 |
| SMR inlet gas temperature (° C.) | 280 | 269 |
| SMR outlet gas temperature (° C.) | 334 | 307 |
| SMR inlet pressure (Pa/$10^5$) | 13.14 | 13.08 |
| SMR outlet pressure (Pa/$10^5$) | 11.84 | 12.25 |
| SMR average pressure (Pa/$10^5$) | 12.5 | 12.7 |
| SMR pressure drop (Pa/$10^5$) | 1.3 | 0.8 |
| SMR to comb. differential (Pa/$10^5$) | 10.4 | 10.9 |
| SMR $CH_4$ flow rate (SLPM) | 14.94 | 9.96 |
| SMR steam flow rate (SLPM) | 37.52 | 25.06 |
| Molar Steam to Methane Ratio | 2.5 | 2.5 |
| SMR contact time (ms) | 6.0 | 9.0 |
| $CH_4$ conversion (GC Basis) (%) | 86.8 | 87.3 |
| Selectivity: CO (%) | 69.5 | 72.1 |
| SMR (carbon out)/(carbon in) | 0.93 | 0.97 |
| Average reactor skin temp. (° C.)[b] | 893 | 875 |
| Equilibrium conversion T (° C.) | 840 | 840 |
| Equilibrium selectivity T (° C.) | 840 | 870 |
| SMR rxn. heat/comb. rxn. heat[c] | 0.81 | 0.80 |
| Average area heat flux (W/cm$^2$) | 20.3 | 13.6 |
| Reactor core volumetric flux (W/cm$^3$) | 76.0 | 51.1 |
| Endothermic reaction chamber flux (W/cm$^3$) | 323 | 217 |
| Skin temperature at u-turn (° C.) | 872 | 853 |
| Skin temperature 25.4 mm from u-turn (° C.) | 900 | 881 |
| Skin temperature 50.8 mm from u-turn (° C.) | 908 | 891 |
| Skin temperature 76 mm from u-turn (° C.) | 906 | 899 |
| Skin temperature 102 mm from u-turn (° C.) | 899 | 883 |
| Skin temperature 127 mm from u-turn (° C.) | 585 | 573 |

TABLE 2-continued

Selected results from operation of the bonded ICR device of Example 2.

| Contact Time | 6 ms | 9 ms |
|---|---|---|
| Skin temperature 152 mm from u-turn (° C.) | 862 | 845 |
| Skin temperature 178 mm from u-turn (° C.) | 562 | 781 |
| Skin temperature 197 mm from u-turn (° C.) | 763 | 749 |
| Skin temperature 216 mm from u-turn (° C.) | 714 | 702 |
| Skin temperature 254 mm from u-turn (° C.) | 638 | 624 |
| Skin temperature 343 mm from u-turn (° C.) | 511 | 499 |
| Skin temperature 431 mm from u-turn (° C.) | 390 | 362 |

[a] Combustion contact time is estimated assuming that all fuel and air pass through the entire fuel channel and that combustion only occurs in the region upstream of the U-turn.
[b] Average metal temperature over last quarter of reaction zone.
[c] Absolute value of ratio of isothermal heats of reaction (at estimated reaction temperatures), based on measured conversions and flow rates.

As can be seen from the data in FIG. 31, there was essentially no change in results caused by varying contact time between 6 and 18 ms.

Welded ICR-N2

Installation/Startup

The microchannel ICR reactor system contains a series of integrated exchangers to preheat the process reactant, combustion air and combustion fuel. The integrated exchanger also cools the process product and combustion exhaust. The steams entering the device may either be at ambient conditions or at a slightly elevated temperature. A series of microchannel exchangers were optionally used to provide additional preheat to the streams. Additionally, the reactor portion of the ICR reactor system was surrounded by a conventional half-shell ceramic heater. This device was also used to provide heat, but to the reactor portion and was mounted ½ inch to ¾ inch from the exterior surface of the ICR reactor system.

The process reactant was preheated to 280 to 310 C using the microchannel exchanger system described above. The combustion air was preheated to 150 to 160 C using a microchannel exchanger same as Type 2 exchanger described previously.

Combustion fuel was neat hydrogen to startup the device. Pure hydrogen was selected as the startup fuel to avoid any coking potential within the device, however it was anticipated that the device could also be started up with some amount of a hydrocarbon fuel in the mixture. The fuel was not preheated externally to the device. Alternatively, the fuel could have been preheated with either a microchannel exchanger or a conventional heat exchanger. The typical inlet fuel temperature as measured at the inlet to the microchannel ICR reactor system was 110 to 120 C.

All inlet and outlet stream temperatures were measured using type K thermocouples placed in the connecting tubes to the ICR reactor system approximately 5 to 10 cm from the inlet or outlet of the integrated heat exchanger on the ICR reactor system. Pressure transducers were added to each of the inlet and outlet streams at similar locations.

The device was installed by connecting five Inconel 600 Swagelock tube fittings to the appropriate welded tube stubs on the ICR reactor system. The entire installation time was less than an hour.

Thermocouples were installed on the outer surface of the ICR reactor system along the length of the exchanger portion and the reactor portion.

The system equipment included: reactant feed Brooks 5850e and 5851e series mass flow controllers, Omega model FMA-A23 mass flow meters, NoShok pressure transducers model 1001501127 and 1003001127, Omega latching relay controllers model CNI 1653-C24, Swagelok variable pressure relief valves, thermal conductivity detector gas chromatograph, NOVA model 300 CLD Chemiluminescent NO/NOx analyzer, etc. The equipment were calibrated and verified for proper operation. Flowrates were calibrated against a primary standard calibrator, the Dry-Cal DC-2M Primary Flow Calibrator, which was calibrated and certified by BIOS International. Pressure transducers were calibrated using a Fluke pressure calibrator model 718 1006 with a Fluke 700P07 or 700P06 pressure module which were calibrated and certified by Fluke. The gas chromatograph and NO/NOx analyzer were calibrated against calibration gases blended and certified by Praxair Distribution Inc.

The ICR reactor system was pressure tested by first applying a static pressure to the SMR reactant line while plugging the SMR product line. The applied pressure was 205 psig and was generated using a nitrogen fluid. The pressure was left on this side of the device. Concurrently, the combustion side was pressurized to 55 psig while the SMR side was under pressure. The combustion side pressure may not exceed the SMR side pressure during pressure testing to maintain the mechanical integrity of the device. The leak rate did not exceed 0.5 psig in 15 minutes, and the ICR reactor system was ready for operation.

The combustion catalyst was reduced for one hour at room temperature with 1 SLPM hydrogen (55 millisecond contact time), no external heat was provided. The combustion fluids were then initiated in the following manner to achieve proper temperatures for SMR catalyst reduction. The SMR catalyst reduction temperature was 250 to 300 C. The ICR reactor system was preheated by using the integrated combustion portion of the reactor. The process was initiated by increasing the nitrogen flowrate on the SMR side to 2.5 SLPM. This corresponds to a contact time of 21 milliseconds. The hydrogen was then turned off on the combustion side fuel inlet. Nitrogen was then fed to the combustion side through the primary air inlet at 2.0 SLPM, and the fuel inlet at 1.0 SLPM. The air was then blended with the nitrogen and fed at a rate of 0.5 SLPM. Then the hydrogen was restarted on the combustion side fuel inlet at a flowrate of 200 sccm. The hydrogen lit off at room temperature. The heat released from combustion heats the ICR reactor system. The heat up rate was roughly 5 C/minute.

Startup control was important for appropriate catalyst reduction to achieve a near isothermal (+/−30 C) temperature distribution along the length of the 7 inch (178 mm) catalyst section in the ICR reactor system. Control was achieved by varying the flowrates of the hydrogen and air concurrently while keeping them at specified ratio which corresponds to 5% excess air. Increases in the fuel and air flowrates were offset by reductions in the fuel and primary air line nitrogen flowrates, respectively, to maintain a constant flowrate to the combustion side of the ICR reactor system. It was important to maintain a roughly equal total flowrate of fluids in the combustion side during startup to create a uniform temperature profile. If the combustion fluids flowrate drops by 50% or greater, then the front of the catalyst section becomes much hotter than the end of the catalyst section (+/−60 C or higher). If the flowrate of the combustion fluids increases by 50% or greater then the back end of the catalyst section becomes much hotter than the front end of the catalyst section (+/−60 C or higher). In both scenarios, the catalyst does not properly reduce. Once the temperature of the ICR reactor system reached 250 to 300 C in the reaction zone, the SMR hydrogen flowrate was gradually stepped in over one hour to 10% of the SMR nitrogen flowrate. After one hour, the SMR hydrogen was at 0.25 SLPM which corresponds to a contact time of 19 milliseconds and the one hour reduction time began.

The SMR catalyst was maintained at 250 to 300 C (+/−20 C) for one hour. During this hour, hydrogen at 10% of the nitrogen (0.25 SLPM H2 and 2.5 SLPM N2) flow by the SMR catalyst with a corresponding contact time of 19 milliseconds.

After the one-hour catalyst reduction process, the hydrogen on the SMR process side was stopped. Nitrogen remains flowing on the SMR side at approximately 2.5 SLPM. The flowrate of nitrogen was roughly equal to the total flowrate of SMR process reactants corresponding to an 18 millisecond contact time. The 18 millisecond contact time was the first flowrate of process reactants and by setting the nitrogen flowrate to an equivalent value there was a lesser change in temperature profile distribution in the ICR reactor system when the change occurs from pure nitrogen during startup to operation of the ICR reactor system.

Next the SMR side was pressurized to system operating pressure, 175 to 185 psig outlet pressure, at 10-15 psig/min. While nitrogen was flowing on the SMR side at a contact time of 18 milliseconds, the combustion fluid flowrates were changed to heat the device to 600 C. Startup control was also important for uniform heating of the device and control of heating rate (not to exceed 5 C/min as described previously). Control was achieved by varying the flowrates of the hydrogen and air concurrently while keeping them at 1:2.5 ratio which corresponds to 5% excess air. Increases in the fuel and air flowrates were offset by reductions in the fuel nitrogen and primary air line nitrogen flowrates, respectively, to maintain a constant flowrate to the combustion side of the ICR reactor system.

To start the ICR combustion side heating, air was turned on through the primary air inlet line and hydrogen through the fuel inlet line while nitrogen also continues to flow into the system through the primary air inlet line and fuel inlet line. The initial flowrate of air and hydrogen was discussed previously. The fluids were changed by increasing the air and hydrogen flowrates within a minute of each other while maintaining their ratio at 5% excess air and turning down both fuel and primary air line nitrogen to maintain a constant overall flowrate. The constant overall flowrate roughly corresponds to the total flowrate of combustion fuel and air required to operate the SMR reaction at 18 ms at 600 C. By the time the device reaches 600 C, the nitrogen was be reduced to zero.

If the air and hydrogen mixture did not light-off at room temperatures, then the microchannel exchanger system could be used to heat the ICR reactor system until light-off was obtained. Typically the combustion side lights off at room temperature to 60 C. After light-off, the microchannel exchanger system was set to maintain the inlet temperatures required for the ICR reactor system. Additionally, although air was not fed with fuel through the fuel inlet inline in this test, this could have been done to assist in combustion conversion.

When the SMR side reaches roughly 400 C, hydrogen was turned on the SMR reactant side at 15% of the total flowrate of steam corresponding to a 6:1 steam-to-carbon ratio at 18 milliseconds. This was roughly 380 sccm. Within one minute, the water pump on the SMR side was turned on to the liquid flowrate of 2 ml/min (corresponding to the initial process condition of 6:1 steam-to-carbon ratio at 18 milliseconds). As the hydrogen and water feed rates were increased, the nitrogen flowrate on the SMR side was correspondingly turned down to maintain the total stream at an 18 ms contact time.

The device continued to heat to 600 C by changing the flowrates on the combustion side as described previously. When the device reached 600 C, the POx catalyst required reduction. This was achieved by simply maintaining the POx region of the ICR reactor system at the required 600 C. With the feed of pure hydrogen, the catalyst was reduced as the air joined with the hydrogen downstream of the POx catalyst and combusted to provide the heat for reduction but did not interfere with reduction.

Then the SMR reaction was initiated by the following sequence of events which were all completed within one minute: the SMR methane was turned on to match a 6:1 steam-to-carbon ratio at 18 milliseconds, then the nitrogen and then the hydrogen on the SMR side were turned off and were not be used again until shutdown of the ICR reactor system.

The initiation of the SMR reaction caused the ICR reactor system to cool, so the combustion flows were increased until the temperature stabilized at 600 C (+40 C, −0 C) in the reactor portion of the ICR reactor system. During this time the nitrogen on the combustion side through the primary air inlet line and the fuel line were turned off. The device was then heated to 860 C at which point the steam-to-carbon ratio was changed to 3:1 and the contact time to 12 milliseconds. The flowrates of air through the primary air line and fuel through the fuel line were changed to maintain temperature. Then the externally mounted ceramic heater was employed to maintain the ICR reactor system at 860 C while the hydrogen fuel was turned down gradually until it was off. Then hydrocarbon and air were fed through the fuel inlet to the combustion side. While maintaining a hydrocarbon to oxygen ratio of 2:1, these flows were increased until the ceramic heater was no longer needed to provide heat to maintain temperature at which point the ceramic heater was turned off.

The combustion side flows were now altered to maintain the desired operating temperature for the reactor portion. The steam-to-carbon and contact time were varied to the desired experimental conditions. As the steam-to-carbon and contact time were varied, the heat load on the SMR side increases and the combustion side flows were increased to maintain the desired reactor temperature. The procedure for turning up the combustion side flows was to first increase the combustion primary air by the flowrate required to maintain the desired excess air ratio, and then turn up the hydrocarbon flowrate and fuel air in the same ratio.

For the device, the temperature of the reactor portion of the ICR was heated to at least 800 C before reducing the steam-to-carbon to 3:1 or below as proscribed by the desired run plan. During the transition from startup conditions to operating conditions, the procedure for changing conditions on the SMR process side was to increase water flowrate before increasing SMR process hydrocarbon flowrate (i.e. going to a higher steam-to-carbon ratio then back to the desired steam-to-carbon ratio).

Shut Down

The shutdown process was the inverse of the start-up process. Emergency shutdown procedures were the same as discussed previously.

Control Strategies

Several control strategies were implemented during the startup, operation and shutdown of the ICR reactor system. The first three of these control strategies are the same as discussed previously.

Fourth, the use of nitrogen during startup to imitate the total flowrate entering the SMR process side reduces the temperature shock magnitude as the SMR reactants were turned on and the SMR nitrogen was turned off. This was important as the small size of the ICR reactor system and its quick response due to the microchannel architecture make it susceptible to sudden and potentially harmful temperature changes.

Fifth, when combustion side flows were increased the air was turned up before the fuel to prevent entering a fuel rich regime momentarily in which the combustion chemistry could change and alter the temperature profile along the ICR reactor system.

Sixth, when SMR process side flows were increased the change was always made such that a higher steam-to-carbon ratio was achieved prior to the endpoint steam-to-carbon ratio. For example, if both water and hydrocarbon were to be increased, then the water was increased first and the hydrocarbon secondly.

Seventh, the use of the external ceramic heater surrounding the reactor portion of the ICR reactor system allowed the device to be started up on pure hydrogen as the combustion fuel and then safely and efficiently changed over to hydrocarbon fuel feed. This circumvented the need to enter into a potentially explosive region of hydrogen or methane in air concentrations prior to their entrance into the combustion region of the ICR reactor system.

Welded ICR-N3
Installation/Startup

The installation and operation of N3 follows the same procedure as N2 with the following exceptions:
1. The system was pressure tested at 290 psig on the SMR process side and 70 psig on the combustion side.
2. The SMR process inlet was preheated to 280 to 340 C.
3. The combustion side primary air inlet was preheated to 140 to 160 C.
4. The combustion side fuel inlet was preheated to 50 to 70 C.
5. Although the metholodgy was similar for N3 as N2, the flowrates used for initial light-off were different. Nitrogen was fed to the combustion side through the primary air inlet at 3.0 SLPM, while the fuel nitrogen was off. The fuel hydrogen was at 200 sccm and the primary air was 4.0 SLPM, which corresponds to 750% excess air. Light-off occurred at 200 C, and the heatup time was reduced by the use of the ceramic shell heater. Following light-off, N3 continued to be started up in the same manner as N2.
6. N3 did not contain a POx section of the ICR reactor system, consequently the POx section was not reduced. Rather when the device reached 600 C, the SMR reaction was then initiated as discussed in the N2 example.
7. The operating pressure was 185 to 195 psig at the SMR process side outlet.
8. When the ICR reactor system reached 600 C, the SMR reaction was initiated at 4.5:1 steam-to-carbon ratio and 18 milliseconds.

Control Strategies

The control strategies of N3 follow the same procedures as described for welded ICR N2 with the following exceptions:
1. Excess air was employed as a variable to obtain combustion side light-off of hydrogen. Although typically 5% excess air was used during hydrogen light-off, this variable was changed to 750% to achieve light-off for N3.

Results

The co-flow pattern was arranged between two combustion channels and one reformer channel. A flow-by design was made in reformer channel to provide low pressure drop by allowing the reactant stream in the channel to flow in a narrow gap (about 0.2 mm) between solid channel wall and a layer of porous engineered catalyst which is in intimate thermal contact with the heat transfer surface (solid metal between combustion and reformer channels. Two different designs were used in combustion channel, one was for methane direct combustion and the other was for partial oxidation of methane followed by methane, carbon monoxide and hydrogen combustion. A U-turn was designed to connect combustion exhaust channels and reformer product channel with combustion fuel and air channels and reformer reactant channel respectively. A recuperator was integrated directly with reactor to balance heat distribution between five streams, which include reformer reactant, product, combustion air, fuel and exhaust flow. Both the reformer and combustion streams follow a loop flow pattern. The reformer reactant comes up the outer side of the loop, which had porous engineering catalyst on one side of the solid channel wall, and returned in the adjacent product channel, where there was no catalyst. The combustion fuel entered the outer sides of the second M, where air was jetted into the combustion channel from air channel, which was between fuel channel and exhaust channel, and heat was transferred to the adjacent reformer reactant channel. The exhaust stream exits the center of the second M. This integrated device was the combination of two halves of two adjacent two-stream loops. This integrated reactor test results demonstrated that the concept can be scaled up for commercial application.

Start Up 1

After the reactor was stabilized at 850° C., an external ceramic heater was turned on to maintain reactor temperature while combustion hydrogen was turn down gradually till it was shut off. Methane was introduced to combustion fuel channel and ramp up gradually while external ceramic heater was turned down gradually to maintain reactor temperature. After the reactor steady state was established when ceramic heater was turned off, both reformer and combustion sides can be adjusted to target conditions.

Start Up 2

After POx catalyst was reduced at 600° C. for 1 hour, combustion hydrogen was shut off to drop the reactor temperature to 400° C. and then an external ceramic heater was turned on to maintain the reactor temperature. As the reactor temperature was 400° C., combustion fuel and air were introduced to combustion channel to heat up reactor to 600° C. Ceramic heater was shut off during the heating up. After both reformer and combustion sides were stabilized at 600° C., water and hydrogen (15% of vapor volume) were introduced to reformer side while maintaining inert flow. Once water flow was established, methane was turned on, while hydrogen and inert was shut off, to maintain at 6:1 steam-to-carbon ratio and 18 ms contact time in reformer side. Then the reformer side was heated up to 850° C. by increasing hydrogen and air flow rate in combustion side. Then water and methane flow in reformer side can be adjusted to target conditions by maintaining constant reactor temperature, which can be accomplished by adjusting combustion fuel and air flow.

Results and Discussion for Welded ICR N2 and N3

Example

Welded ICR-N2 was designed to test the effectiveness of partial oxidation of methane (POx) and then combustion of methane. This was done by solution coating 100 ppi metal foam with POx catalyst. N2 operated for a total of 606 hours and these results are shown in Tables 3 and 4. For roughly 40 hours of this test, natural gas was used on both the process and combustion side without change in performance. In general the design had good performance with POx followed by combustion.

N2 also successfully demonstrated a simplified start-up procedure. Devices can be heated with hydrogen initially to preheat the device (or alternatively the device can be heated with an external heater). During the switch from a hydrogen fuel in the fuel line to a POx fuel mixture in a safe manner, the device is anticipated to cool. It is anticipated that the device will not cool to below 400 C. This start-up procedure was tested by heating the reactor to between 375 and 400° C. and initiating the POx feed. There were no problems heating with this method as the POx catalyst lit off extremely well. The entire start-up procedure after initiation of the POx feed was remarkably similar to starting the SMR on pure hydrogen. This test was repeated twice and the same results were observed.

TABLE 4

Temperature profile of N2

| Location | 1 | 2 | 3 | 4 |
|---|---|---|---|---|
| SMR reactant | CH4 | CH4 | CH4 | NG |
| SMR S:C | 4.8 | 4.8 | 3 | 3 |
| SMR CT | 4.3 | 4.3 | 6 | 6 |
| ICR fuel | CH4 | CH4 | CH4 | NG |
| ICR CH4 conversion/% | 96.2 | 92.1 | 98.3 | 97.7 |
| TC22 (2" above SMR zone) ° C. | 789 | 780 | 799 | 798 |
| TC23 (0.5" above SMR zone) ° C. | 778 | 768 | 779 | 780 |
| TC24 (0.18" of 7" SMR zone) ° C. | 857 | 844 | 857 | 855 |
| TC25 (0.79" of 7" SMR zone) ° C. | 836 | 823 | 836 | 838 |
| TC27 (2.25" of 7" SMR zone) ° C. | 847 | 827 | 837 | 837 |
| TC28 (2.97" of 7" SMR zone) ° C. | 848 | 825 | 848 | 850 |
| TC29 (3.57" of 7" SMR zone) ° C. | 849 | 825 | 849 | 854 |
| TC31 (4.94" of 7" SMR zone) ° C. | 865 | 838 | 870 | 875 |
| TC32 (6.34" of 7" SMR zone) ° C. | 877 | 848 | 884 | 891 |

TABLE 3

| Welded ICR N2 (POx assisted combustion) results | | | | |
|---|---|---|---|---|
| Air inlet gas temperature (° C.) | 160 | 152 | 153 | 151 |
| fuel inlet gas temperature (° C.) | 160 | 160 | 157 | 153 |
| Exhaust gas temperature (° C.) | 357 | 353 | 356 | 355 |
| Air inlet gas pressure (psig) | 26.06 | 25.05 | 26.37 | 26.16 |
| Total fuel flow rate (SLPM) | 1.2 CH4 | 1.18 CH4 | 1.2 CH4 | 1.2 NG |
| Fuel H2 content (%) | 0 | 0 | 0 | 0 |
| Fuel CH4 or NG content (%) | 100% CH4 | 100% CH4 | 100% CH4 | 100% NG |
| Air channel flow rate (SLPM) | 11.5 | 11.32 | 11.5 | 11.5 |
| POx premixed air flow rate (SLPM) | 2.86 | 2.81 | 2.97 | 2.97 |
| Fuel to O2 ratio of POx | 2 | 2 | 1.95 | 1.95 |
| % excess air | 25 | 25 | 25 | 25 |
| ICR contact time (ms) | 4.3 | 4.4 | 4.3 | 4.3 |
| Air pressure drop (psi) | 18.74 | 17.74 | 18.65 | 19.03 |
| Fuel pressure drop (psi) | 93.70 | 91.79 | 91.76 | 95.91 |
| Combustion H2 conversion (%) | Na | Na | Na | Na |
| Combustion CH4 conversion (%) | 96.2 | 92.1 | 98.3 | 95.5 |
| Comb. Selectivity to CO (%) | 5.2 | 2.0 | 11.5 | 6.2 |
| Combustion exhaust NOx (ppm) | 5.2 | Na | Na | Na |
| Combustion CO exhaust (ppm) | 3820 | 1403 | 8545 | 4542 |
| Thermo loss (W)* | 389.1 | 395.8 | 365.7 | 365.0 |
| SMR heat duty (W)[c] | 303.9 | 295.5 | 310.6 | 311.5 |
| Combustion heat duty (W)[d] | 699.7 | 697.8 | 679.8 | 662.6 |
| SMR heat duty/combustion heat duty | 0.43 | 0.42 | 0.46 | 0.47 |
| SMR inlet gas temperature (° C.) | 306 | 305 | 303 | 301 |
| SMR outlet gas temperature (° C.) | 339 | 337 | 322 | 322 |
| SMR inlet pressure (psig) | 201.3 | 200.6 | 198.4 | 197.11 |
| SMR outlet pressure (psig) | 168.1 | 167.9 | 176.7 | 174.89 |
| Pressure gradient between SMR channel and fuel channel (Psi) | 130.99 | 131.33 | 134.74 | 131.38 |
| SMR CH4 or NG flow rate (SLPM) | 2.08 CH4 | 2.08 CH4 | 2.18 CH4 | 2.13 NG |
| SMR steam flow rate (CCM) | 8.04 | 8.04 | 5.30 | 5.44 |
| Molar steam-to-carbon ratio | 4.8 | 4.8 | 3.03 | 3.07 |
| SMR contact time (ms) | 4.3 | 4.3 | 6.0 | 5.9 |
| SMR CH4 conversion (GC Basis) (%) | 93.4 | 91.3 | 89.2 | 91.7 |
| SMR Selectivity: CO (%) | 51.7 | 49.8 | 65.1 | 64.1 |
| Average web temperature (° C.) | 868 | 840 | 875 | 881 |
| Equilibrium conversion temperature (° C.) | 811 | 795 | 847.3 | 863.4 |
| Equilibrium selectivity temperature (° C.) | 846 | 828 | 856.7 | 847.9 |
| SMR pressure drop (psi) | 33.2 | 32.7 | 22.73 | 22.22 |
| Average heat flux (W/cm2) | 17.7 | 17.2 | 18.1 | 18.2 |
| Average reactor core volumetric flux (W/cm3)[a, e] | 66.4 | 64.6 | 67.9 | 68.1 |
| Endothermic Chamber heat flux (W/cm3)[f] | 278.8 | 271.1 | 285 | 285.8 |
| Time on Stream (Hr) | 277 | 278 | 565 | 576 |

*Thermal loss included enthalpy of reactant temperature change from inlet to reaction temperature, enthalpy of product temperature change from reaction temperature to outlet temperature and enthalpy of isothermal reaction of both SMR and combustion sides.
[a]the volume is the sum of SMR channel volume, fuel channel volume and metal volume between SMR and fuel channels.
[c, d]only include isothermal reaction heat at reaction temperature
[e]the volume is reactor core volume
[f]the volume is reactor chamber volume TABLE 4-continued Temperature profile of N2

| Location | 1 | 2 | 3 | 4 |
|---|---|---|---|---|
| TC47 (0.02" below SMR zone) ° C. | 862 | 833 | 871 | 877 |
| ICR U-turn gas T/° C. | 869 | 840 | 878 | 884 |
| Product U-turn gas T/° C. | 857 | 827 | 865 | 871 |

Example

Welded ICR N3 was designed to test the effectiveness of combustion of CH4 by placing a slurry washcoat on the walls of the combustion zone; this device operated without POx. The conversion of CH4 was greater than 95% when the SMR side was running at 3:1 Steam: Carbon and 6 ms contact time. The results of N3 are shown in Tables 5 and 6.

TABLE 5

Welded ICR N3 (direct CH4 combustion) results

| | | | |
|---|---|---|---|
| Air inlet gas temperature (° C.) | 160 | 157 | 162 |
| fuel inlet gas temperature (° C.) | 67 | 66 | 69 |
| Exhaust gas temperature (° C.) | 331 | 339 | 339 |
| Air inlet gas pressure (psig) | 18.95 | 20.96 | 20.87 |
| Fuel inlet gas pressure (psig) | 17.88 | 19.57 | 19.52 |
| Exhaust gas pressure (psig) | 7.93 | 9.37 | 9.14 |
| Total fuel flow rate (SLPM) | 0.958 CH4 | 0.958 NG | 0.958 NG |
| Fuel H2 content (%) | 0 | 0 | 0 |
| Fuel CH4 or NG content(%) | 100% CH4 | 100% NG | 100% NG |
| Air flow rate (SLPM) | 9.58 | 9.58 | 10.5 |
| % excess air | 5 | 5 | 15 |
| ICR contact time (ms) | 5.2 | 5.2 | 4.8 |
| Air pressure drop (psi) | 11.02 | 11.60 | 11.73 |
| Fuel pressure drop (psi) | 9.95 | 10.20 | 10.38 |
| Pressure gradient between air and fuel channel (Psi) | 0.535 | 0.695 | 0.675 |
| Combustion H2 conversion (%) | Na | Na | Na |
| Combustion CH4 conversion (%) | 96.8 | 96.8 | 100.0 |
| Comb. Selectivity to CO (%) | 6.4 | 0 | 0 |
| Combustion exhaust NOx (ppm) | Na | Na | Na |
| Combustion CO exhaust (ppm) | 5765 | 0 | 0 |
| Thermo loss (W)* | 251.7 | 260.5 | 265.2 |
| SMR heat duty (W)$^c$ | 290.8 | 293.3 | 307.0 |
| Combustion heat duty (W)$^d$ | 541 | 553.2 | 571.4 |
| SMR reaction heat/Combustion reaction heat | 0.54 | 0.53 | 0.54 |
| SMR inlet gas temperature (° C.) | 337 | 339 | 339 |
| SMR outlet gas temperature (° C.) | 343 | 346 | 346 |
| SMR inlet pressure (psig) | 224.4 | 223.6 | 229.4 |
| SMR outlet pressure (psig) | 206.7 | 204.8 | 207.6 |
| Pressure gradient between SMR and fuel channel (psi) | 202.65 | 199.73 | 204.2 |
| SMR CH4 or NG flow rate (SLPM) | 2.18 CH4 | 2.18 CH4 | 2.18 NG |
| SMR steam flow rate (SLPM) | 5.3 | 5.3 | 5.4 |
| Molar steam-to-carbon ratio | 3.03 | 3.03 | 2.98 |
| SMR contact time (ms) | 6.0 | 6.0 | 5.9 |
| SMR CH4 conversion (GC Basis) (%) | 84.5 | 85.3 | 89.7 |
| SMR Selectivity: CO (%) | 59.3 | 58.5 | 56.1 |
| SMR Average web temperature (° C.) | 834 | 816 | 817 |
| Equilibrium conversion temperature (° C.) | 820 | 824 | 851 |
| Equilibrium selectivity temperature (° C.) | 812 | 807 | 792 |
| SMR pressure drop (psi) | 17.7 | 18.8 | 21.8 |
| Average heat flux (W/cm2) | 16.9 | 17.1 | 17.9 |
| Average reactor core volumetric flux (W/cm3)$^{ae}$ | 63.5 | 64.1 | 67.1 |

TABLE 5-continued

Welded ICR N3 (direct CH4 combustion) results

| | | | |
|---|---|---|---|
| Endothermic Chamber heat flux (W/cm3)$^f$ | 267 | 269 | 282 |
| Time on Stream (Hrs) | 22 | 37 | 63 |

*Thermal loss included enthalpy of reactant temperature change from inlet to reaction temperature, enthalpy of product temperature change from reaction temperature to outlet temperature and enthalpy of isothermal reaction of both SMR and combustion sides.
$^a$the volume is the sum of SMR channel volume, fuel channel volume and metal volume between SMR and fuel channels.
$^{c,d}$only include isothermal reaction heat at reaction temperature
$^e$the volume is reactor core volume
$^f$the volume is reactor chamber volume

TABLE 6

Temperature profile of N3

| SMR reactant | CH4 | CH4 | NG |
|---|---|---|---|
| SMR S:C | 3.03 | 3.03 | 2.98 |
| SMR CT | 6.0 | 6.0 | 5.9 |
| ICR fuel | CH4 | NG | NG |
| ICR CH4 conversion/% | 96.8 | 96.8 | 100 |
| TC22 (2" above SMR zone) ° C. | 686 | 694 | 693 |
| TC23 (0.5" above SMR zone) ° C. | 734 | 745 | 744 |
| TC24 (0.06" of 7" SMR zone) ° C. | 724 | 726 | 720 |
| TC25 (0.32" of 7" SMR zone) ° C. | 808 | 821 | 817 |
| TC26 (0.95" of 7" SMR zone) ° C. | 827 | 838 | 840 |
| TC27 (1.37" of 7" SMR zone) ° C. | 815 | 826 | 830 |
| TC28 (2.22" of 7" SMR zone) ° C. | 804 | 814 | 819 |
| TC29 (2.94" of 7" SMR zone) ° C. | 826 | 836 | 843 |
| TC31 (4.34" of 7" SMR zone) ° C. | 809 | 793 | 791 |
| TC32 (4.91" of 7" SMR zone) ° C. | 833 | 816 | 818 |
| TC47 (6.31" of 7" SMR zone) ° C. | 834 | 815 | 816 |
| ICR U-turn gas T/° C. | 884 | 848 | 847 |
| Product U-turn gas T/° C. | 827 | 812 | 814 |

The integral 5-stream exchanger of N3 was evaluated for performance, corresponding data are shown in Tables 7-9. The heat exchanger flux was calculated by summing the total heat gained by the cold streams and dividing by the heat exchanger core volume.

An energy balance for the exchanger was calculated by summing the heat gained by the cold streams and dividing by the heat lost by the hot streams.

The residence times were calculated at the average measured temperature and pressure of the streams in the heat exchanger and are reported in milliseconds (ms). Residence time in each exchanger microchannel is calculated as the total interior microchannel volume for a particular fluid divided by the actual volumetric flowrate. For each fluid stream, the volumetric flowrate was an average over the inlet and outlet conditions.

The temperatures of the fluids exiting the hot end of the heat exchanger could not be directly measured because of the integral reactor. Therefore, a thermocouple was placed in the metal web near the hot end of the heat exchanger and this temperature was used to estimate the temperature of the cold streams (air, fuel, reactant) exiting the heat exchanger. The product and exhaust inlet temperatures to the hot end of the heat exchanger were estimated to be approximately 20° C. less than the measured U-turn gas temperature of the respective stream.

For the condition corresponding to second data column of Table 5, the welded ICR N3 has a heat exchanger flux of 14.2 W/cm$^3$ and has less than 10% heat exchanger heat losses. The heat gained by the cold streams and lost by the hot streams are approximately 255 W and 265 W, respectively. The internal heat exchanger volume is 17.95 cm3.

A parameter known as the Interstream Planar Heat Transfer Area Percent (IPHTAP) was calculated. This parameter is defined as the ratio of area through which heat is transferred to neighboring channels with different fluids to the total surface area in the channel. The total surface area exclusively includes rib, fins, surfaces that are not adjacent to another fluid-bearing channel, and surface area enhancers, if present.

TABLE 7

N3 integral heat exchanger temperatures

|  | Units |  |
| --- | --- | --- |
| T air in | ° C. | 157 |
| T fuel in | ° C. | 66 |
| T air out | ° C. | 745 |
| T fuel out | ° C. | 745 |
| T exhaust in | ° C. | 828 |
| T exhaust out | ° C. | 339 |
| T reactant out | ° C. | 745 |
| T reactant in | ° C. | 339 |
| T product in | ° C. | 792 |
| T product out | ° C. | 346 |

TABLE 8

N3 integral heat exchanger flowrates

|  | Flowrate (SLPM) |
| --- | --- |
| Air flowrate | 9.58 |
| Fuel flowrate | 0.958 |
| Reactant CH4 flowrate | 2.18 |
| Reactant water flowrate | 5.3 |
| SMR product flowrate | 9.15 |
| Exhaust flowrate | 10.54 |

TABLE 9

N3 integral heat exchanger performance

|  | Residence time (ms) | IPHTAP (%) |
| --- | --- | --- |
| Air stream | 3.9 | 86 |
| Fuel stream | 49.1 | 94 |
| Reactant stream | 24.5 | 97 |
| Product stream | 26.8 | 46 |
| Exhaust stream | 3.6 | 42 |

Welded ICR-M1

Installation/Startup

The microchannel ICR reactor system contains a series of integrated exchangers to preheat the process reactant, combustion air and combustion fuel. The integrated exchanger also cools the process product and combustion exhaust. The steams entering the device may either be at ambient conditions or at a slightly elevated temperature. A series of microchannel exchangers were optionally used to provide additional preheat to the streams.

The process reactant was preheated to roughly 275 to 300 C and the combustion air was preheated to 150 to 170 C using microchannel exchanger systems as described previously.

Combustion fuel was neat hydrogen to startup the device. Pure hydrogen was selected as the startup fuel to avoid any coking potential within the device, however it was anticipated that the device could also be started up with some amount of a hydrocarbon fuel in the mixture. The fuel was not preheated externally to the device. Alternatively, the fuel could have been preheated with either a microchannel exchanger or a conventional heat exchanger. The typical inlet fuel temperature as measured at the inlet to the microchannel ICR reactor system was 100 to 125 C.

All inlet and outlet stream temperatures were measured using type K thermocouples placed in the connecting tubes to the ICR reactor system approximately 5 to 10 cm from the inlet or outlet of the integrated heat exchanger on the ICR reactor system. Pressure transducers were added to each of the inlet and outlet streams at similar locations.

The device was installed by connecting five Inconel 600 Swagelock tube fittings to the appropriate welded tube stubs on the ICR reactor system. Thermocouples were installed on the outer surface of the ICR reactor system along the length of the exchanger portion and the reactor portion. Additionally, several 0.02 inch thermocouples were inserted into thermal wells built into the reactor and recuperator portions.

The reactant feed Brooks 5850e and 5851e series mass flow controllers, Omega model FMA-A23 mass flow meters, NoShok pressure transducers model 1001501127 and 1003001127, Omega latching relay controllers model CNI 1653-C24, Swagelok variable pressure relief valves, thermal conductivity detector gas chromatograph, NOVA model 300 CLD Chemiluminescent NO/NOx analyzer, etc were calibrated and verified for proper operation. Flowrates were calibrated against a primary standard calibrator, the Dry-Cal DC-2M Primary Flow Calibrator, which was calibrated and certified by BIOS International. Pressure transducers were calibrated using a Fluke pressure calibrator model 718 1006 with a Fluke 700P07 or 700P06 pressure module which were calibrated and certified by Fluke. The gas chromatograph and NO/NOx analyzer were calibrated against calibration gases blended and certified by Praxair Distribution Inc.

The ICR reactor system was pressure tested by first applying a static pressure to the SMR reactant line while plugging the SMR product line. The applied pressure was 200 psig and was generated using a nitrogen fluid. The pressure was left on this side of the device. Concurrently, the combustion side was pressurized to 75 psig while the SMR side was under pressure. The combustion side pressure may not exceed the SMR side pressure during pressure testing to maintain the mechanical integrity of the device.

The leak rate did not exceed 0.5 psig in 15 minutes, and the ICR reactor system was ready for operation.

Catalyst reduction of the SMR and combustion sides was initiated by first flowing nitrogen and hydrogen to the SMR and ICR reactant inlets. Typical SMR side flowrates were 2.5 SLPM nitrogen, and 0.25 SLPM hydrogen, while ICR side flowrates were 3.0 SLPM nitrogen and 0.3 SLPM hydrogen (both flows were 10% hydrogen, balance nitrogen). The ICR side flows were entered through the fuel inlet and no fluid was entered into the primary air inlet line. The microchannel exchangers were then used to preheat the gases to the ICR reactor system to 120 to 150 C and hold temperatures for 1 hour while not exceeding this range. The ICR reactor system heating rate was 2.5 to 5 C/min. The contact time during SMR and ICR reduction was 19 and 17 milliseconds, respectively. Typically the contact time was not allowed to exceed 20 milliseconds during reduction.

After the one-hour catalyst reduction process, the hydrogen on the SMR process side and ICR combustion side was stopped. Nitrogen remains flowing on the SMR side at approximately 3.0 SLPM. The flowrate of nitrogen was equal to the total flowrate of SMR process reactants corresponding to an 18 millisecond contact time. The 18 millisecond contact time was the first flowrate of process reactants, and by setting the nitrogen flowrate to an equivalent value there was a lesser change in temperature profile distribution in the ICR reactor system when the change occurs from pure nitrogen during startup to operation of the ICR reactor system. Nitrogen on the ICR side remains on at roughly 2.0 SLPM.

Next the SMR side was pressurized to system operating pressure, 160 to 170 psig outlet pressure, at 10-15 psig/min. While nitrogen was flowing on the SMR side at a contact time of 18 milliseconds, the combustion fluid flowrates were changed to heat the device to 600 C. Startup control was critical for uniform heating of the device and control of heating rate (not to excel 5 C/min as described previously). Control was achieved by varying the flowrates of the hydrogen and air concurrently while keeping them at 1:2.5 ratio which corresponds to 5% excess air. Increases in the fuel and air flowrates were offset by reductions in the nitrogen flowrate flowing in the fuel inlet line and the primary air inlet line, respectively, to maintain a constant flowrate to the combustion side of the ICR reactor system. It was important to maintain a roughly equal total flowrate of fluids in the combustion side during startup to create a uniform temperature profile. If the combustion fluids flowrate drops by 50% or greater, then the front of the catalyst section becomes much hotter than the end of the catalyst section (+/−60 C or higher). If the flowrate of the combustion fluids increases by 50% or greater then the back end of the catalyst section becomes much hotter than the front end of the catalyst section (+/−60 C or higher). In both scenarios, the device will not maintain uniform heating and the heating rate will likely exceed the specified 5 C/min.

To start the ICR combustion side heating, air was turned on through the primary air inlet line and hydrogen through the fuel inlet line as described above while nitrogen also continues to flow into the system through the primary air inlet line and the fuel line. The initial flowrate of air and hydrogen was roughly 20% of the energy needed to drive the SMR reaction at 18 milliseconds and 6:1 steam-to-carbon, which was the first point at which the SMR process reactants will be turned on. The fluids were changed by increasing the air and hydrogen flowrates within a minute of each other while maintaining their ratio at 5% excess air and turning down fuel and primary air line nitrogen to maintain a constant overall flowrate. The constant overall flowrate roughly corresponds to the total flowrate of combustion fuel and air required to operate the SMR reaction at 18 ms at 600 C. By the time the device reaches 600 C, the nitrogen will be reduced to zero.

If the air and hydrogen mixture does not light-off at reduction temperatures, then the microchannel exchanger system was used to heat the ICR reactor system until light-off was obtained. Typically the combustion side lights off at reduction temperatures, 120-150 C. After light-off, the microchannel exchanger system was set to maintain the inlet temperatures required for the ICR reactor system. Additionally, although air was not fed with fuel through the fuel inlet inline in this test, this could be done to assist in combustion conversion.

When the SMR side reaches roughly 400 C, hydrogen was turned on the SMR reactant side at 15% of the total flowrate of steam corresponding to a 6:1 steam-to-carbon ratio at 18 milliseconds. This was roughly 400 sccm. Within one minute, the water pump on the SMR side was turned on to the liquid flowrate corresponding to a 6:1 steam-to-carbon ratio at 18 milliseconds (2 ml/min) As the hydrogen and water were fed to the SMR side, the nitrogen flowrate on the SMR side was correspondingly turned down to maintain the total stream at an 18 ms contact time.

The device continues to heat to 600 C by changing the flowrates on the combustion side as described earlier. When the device reaches 600 C, the combustion flows were increased in preparation for the initiation of the SMR reaction and corresponding heat sink. The flows were increased to roughly 500 sccm H2 through the fuel inlet line and 1.3 SLPM air through the primary air inlet line, which was about 50% of the expected heat load of the SMR process side. Additionally, nitrogen was decreased to roughly 500 sccm also through the primary air inlet line and the fuel nitrogen was reduced to 500 sccm. Within a minute, the SMR methane was turned on to match a 6:1 steam-to-carbon ratio at 18 milliseconds. First the nitrogen and then the hydrogen on the SMR side was then turned off and will not be used again until shutdown of the ICR reactor system.

The combustion flows were increased until the temperature stabilizes at 600 C (+40 C, −0 C) in the reactor portion of the ICR reactor system. During this time the nitrogen on the combustion side through the primary air inlet line and fuel line was turned off. The device was then heated to the desired operating temperature for the reactor portion. The steam-to-carbon and contact time were varied to the desired experimental conditions. As the steam-to-carbon and contact time were varied, the heat load on the SMR side increases and the combustion side flows were increased to maintain the desired reactor temperature. The procedure for turning up the combustion side flows was air then fuel, while turning down combustion side flows was fuel than air.

For the device, the temperature of the reactor portion of the ICR was heated to at least 800 C before reducing the steam-to-carbon to 3:1 or below. During the transition from startup conditions to operating conditions, the procedure for changing conditions on the SMR process side was to increase water flowrate before increasing SMR process hydrocarbon flowrate (i.e. going to a higher steam-to-carbon ratio then back to the desired steam-to-carbon ratio).

Additionally, hydrocarbon feeds may be added to the combustion fuel during this time or earlier with a corresponding correction to the air flowrate to maintain proper fuel to air ratio. The procedure for this process was to first increase the combustion primary air by the flowrate required to maintain the desired excess air ratio, then turn on the hydrocarbon flowrate and then turn down the hydrogen flowrate by the same energy output that the hydrocarbon flowrate was turned up.

The shutdown process was the reverse of the start-up process. The emergency shutdown procedure and the control strategies were the same as discussed previously.

Results

The Welded ICR-M1 was tested over a wide range of process conditions, including 12-20 bar average SMR pressure, 4-18 ms SMR contact time (900000-200000 $hr^{-1}$ GHSV), and steam-to-carbon ratios from 6:1 to 1.25:1, yielding 800-850° C. equilibrium conversion and selectivity performance. Combustion performance was evaluated using hydrogen fuel, and hydrogen/hydrocarbon fuel mixtures containing 5-10% $CH_4$ or natural gas and 8% $CO_2$. In addition, combustion performance using 5-50% excess air was evaluated. The M1 reactor was operated continuously for over 300 hours with no decrease in process performance.

Figure 32:
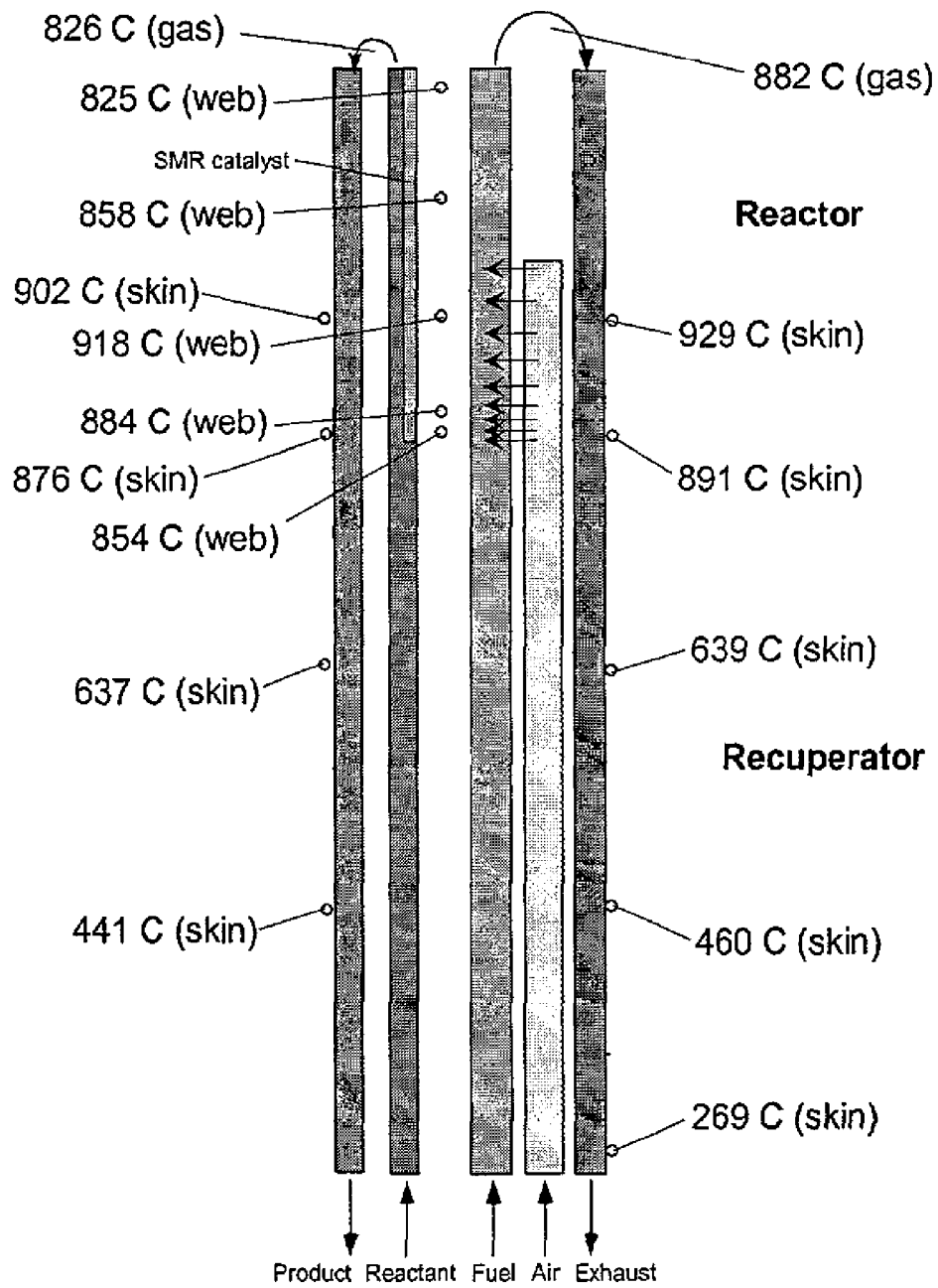
FIG. 32 is a schematic illustration of the welded ICR device M1 (not to scale) showing relative thermocouple placement and a typical measured thermal profile (868° C. average web temperature, 13 atm SMR, 2:1 steam:C, 6 ms contact time, combustion fuel composition of 87% H2, 7% CH4, 8% CO2, and 25% excess combustion air). Web temperatures were measured inside thermowells in the metal web between the SMR and combustion flows and skin temperatures were taken from thermocouples taped to the device exterior beneath the insulation.

Web temperatures were measured inside thermowells extended 1 mm deep beyond the perimeter metal into the metal web between the SMR and combustion flows. FIG. 32 shows thermocouple locations and a typical measured temperature profile at conditions corresponding to an 840° C. SMR equilibrium selectivity and conversion at a 6 ms SMR contact time. The temperature profile peaked in the center of the device and then decreased down the length of the reactor.

The detailed results of a few selected tests using the welded device M1 are shown in Table 10. As shown in the table, steam-to-carbon ratios as low as 1.25:1 were evaluated and surprisingly the device did not produce discernable quantities of coke. The device was operated up to 20 bar absolute pressure and evaluated with methane in the combustion fuel stream up to 10%. Note that metal temperatures are maintained below 950° C. along the entire reactor zone even when near stoichiometric combustion mixtures were used. $NO_x$ values in the combustion effluent surprisingly never exceeded 5 ppm, even when the maximum reactor temperature was raised to 925 C.

Figure 33:
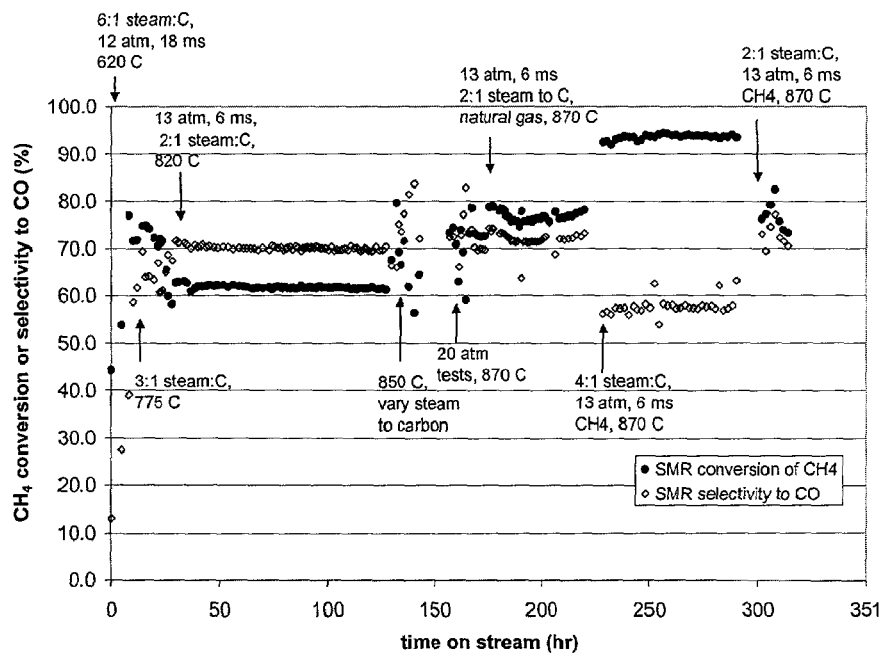
FIG. 33 shows measured SMR methane conversion and selectivity to CO over the first 300 hours of operation of the welded ICR device M1.
Figure 34:
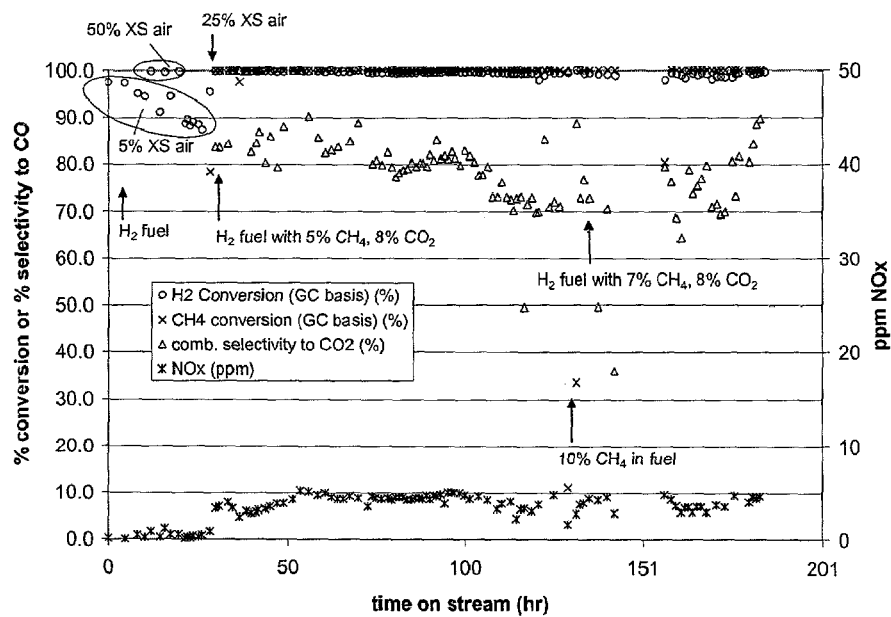
FIG. 34 shows measured combustion hydrogen conversion, methane conversion and selectivity to $CO_2$ (left axis) and dry combustion exhaust $NO_x$ concentrations (right axis) over the first 200 hours of operation of the welded ICR device M1.

FIG. 33 shows a simplified overview of the types of SMR conditions over which the welded device M1 was tested during 300 hours of continuous operation. No evidence of SMR deactivation was seen during the entire 300 hours of operation. FIG. 34 shows combustion performance data for the first 200 hours. Note the consistently high conversions and low NO levels from microchannel catalytic combustion. The presence of some CO in the combustion products suggests that some portion of the combustion occurred in the gas phase (non-catalytic). It should also be noted that the inadvertent omission of the flow stabilization porous insert from one of the fuel channels caused a mal-distribution of fuel between the two channels in the welded device M1. This is consistent with the observed partial combustion hydrogen conversion for 5% excess air overall (one channel runs fuel rich, the other fuel lean, leading to uncombusted fuel in one channel and air in the other), and the complete fuel conversion observed in tests using 25-50% excess air.

The welded ICR devices M1 and M2 (as well as the bonded ICR device of Example 2) each included a porous flow stabilization insert in each fuel channel immediately upstream of the first point of air injection. These porous inserts were made from rectangular pieces of FeCrAlloy foam (~95 pores per inch) measuring 0.7 mm thick, 13 mm long (flow direction) by about 5 mm wide.

The flow stabilization inserts prevented combustion flow instabilities. One example of combustion flow instability can occur during hydrogen combustion where a flame may travel from the point of air and fuel mixing to a point further upstream in the fuel line due to the high flame speeds of hydrogen flames. In addition, because the volumetric fuel flows are generally much smaller than the volumetric air flows, it is possible for air to travel upstream on one side of the fuel channel and combust in the fuel channel while combustion products travel downstream on the other side of the same channel. This would cause heat to be added upstream of the desired location in an uncontrolled fashion. Such instabilities are more likely when air and fuel streams are undiluted, creating local stoichiometric mixtures where they are first mixed. Thus there is a need to stabilize the combustion flows immediately upstream of the first point of mixing of fuel and air. The flow stabilization inserts prevent such undesirable combustion behavior by distributing the fuel flow over the entire fuel channel just prior to mixing with air, increasing the local velocity of the fuel, and providing high surface area small diameter passageways to quench the combustion flame intermediate species (i.e. free radicals) which propagate combustion. This flow stabilization feature could be fabricated in any of a variety of different forms by those skilled in the art.

In the bonded ICR device of Example 1 the combustion flow stabilization function was provided by narrowing the fuel channel to 0.25 mm until the point immediately upstream of the first point of air injection, where the channel widened to the full 0.66 mm height. The narrow fuel channel passageway was located immediately adjacent to the wall in which the air injection orifices were located. The fuel channel widened in a single step change away from the wall containing the air injection orifices, effectively cutting 0.41 mm deep into the wall opposite the air injection orifices.

The narrow fuel channel in the bonded ICR device of Example 1 provided combustion flow stabilization in much the same way as the flow stabilization inserts of the welded ICR device M1. Specifically, the narrow fuel passageway increased the local velocity of the fuel and provided a small diameter passageway to quench combustion flame intermediate species (i.e. free radicals) which propagate combustion flames. Multiple parallel narrow passageways could also be used to provide the same function.

Combustion and catalytic combustion in microchannels is facilitated by the excellent heat transfer provided by flow in microchannels, allowing more flammable mixtures (i.e. near-stoichiometric or low excess air) to be used and providing continuous preheat of combustion reactants immediately upstream of the combustion reaction zone. These two characteristics of microchannel combustion (use of near-stoichiometric mixtures and continuous reactant preheat) have a stabilizing and promoting effect on the combustion and catalytic combustion of more difficult to combust fuels, such as methane. For this reason, combustion or catalytic combustion can be performed in microchannels at contact times much lower than conventional technology, allowing intensified heat delivery in a compact reactor.

The device of Example X(1) the welded ICR device M1 was carefully cut open after being shut down to look for carbonaceous deposits. Despite operation at conditions which are known to be coke prone in conventional SMR reactors, No carbon (coke) formation was seen in the combustion channels and very little coke formation was seen on the process (SMR) catalyst and in the process channels of the device of Example X(1) the welded ICR device M1. In fact, except for the upstream-most inch or so, the catalyst was completely coke free, as was the U-turn area, despite several obvious dead-flow zones. It is thought that many of the free-radical intermediates which play a role in the formation of coke from hydrocarbons are essentially "quenched" by the proximity of the wall to the gas stream, much like homogeneous combustion reactions are quenched by reducing the diameter of the combustion walls below a given diameter.

Figure 35:
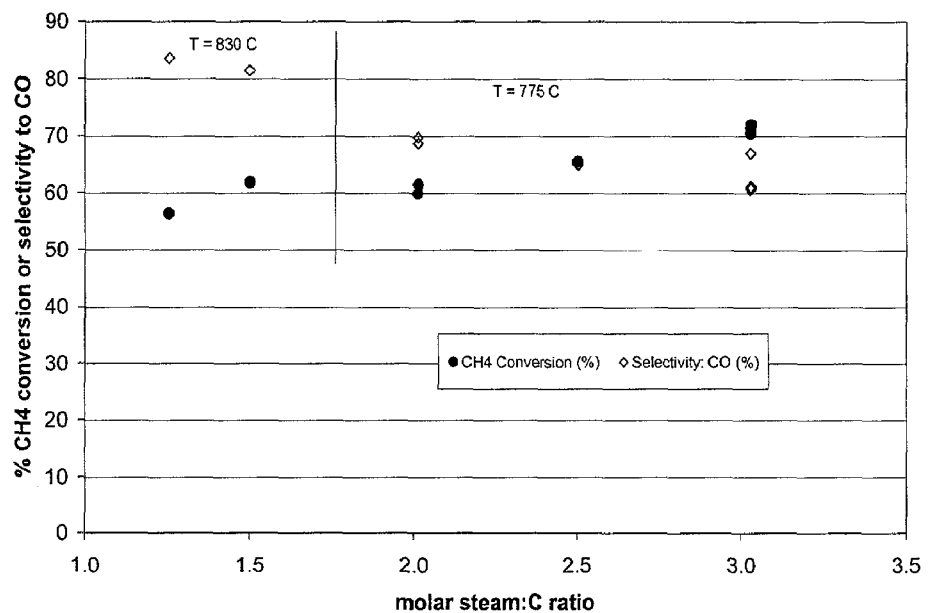
FIG. 35 shows measured SMR methane conversion and selectivity to CO at 13 atm, 775-830° C., and 6 ms SMR contact time in the welded ICR device M1. These data were taken after the first 125 hours of testing.
Figure 36:
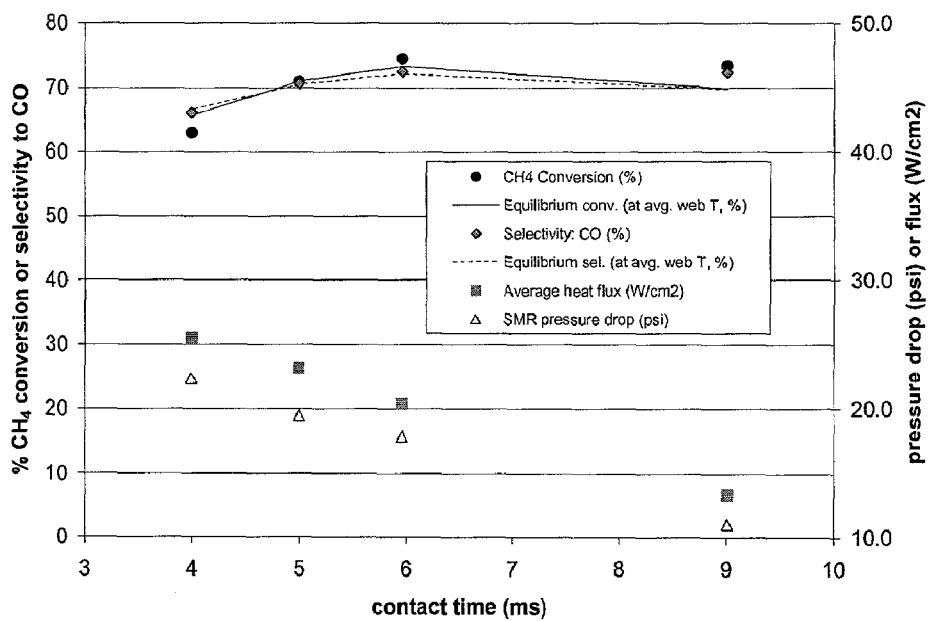
FIG. 36 shows a comparison of measured SMR methane conversion and selectivity to CO (left axis) at 20 atm, 823-855° C. measured average reactor temperature, and 2:1 steam:C with equilibrium values predicted at the measured average reactor temperature in the welded ICR device M1. Also shown are the measured SMR pressure drop, and the average reactor area heat flux (right axis).
Figure 37:
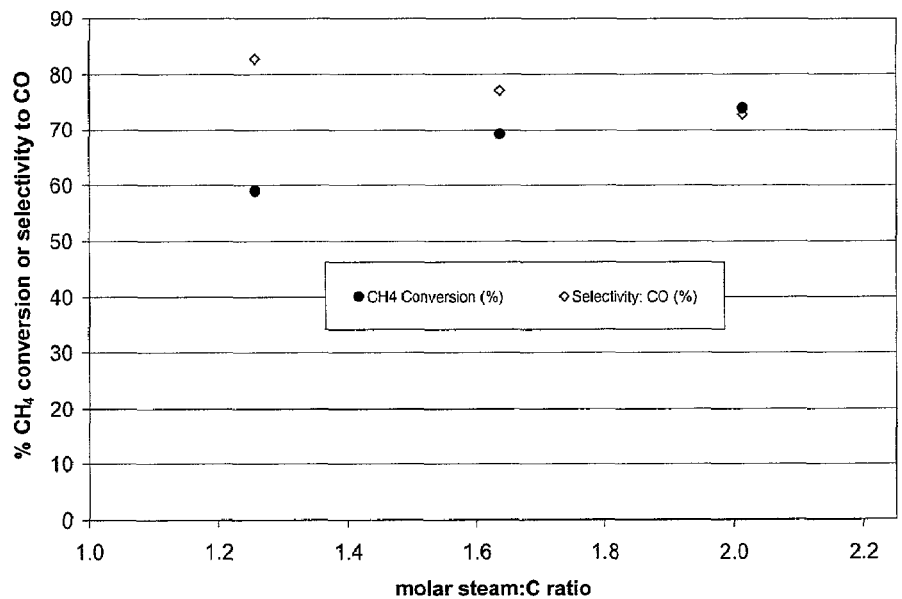
FIG. 37 shows a comparison of measured SMR methane conversion and selectivity to CO at 20 atm, 850° C. measured average reactor temperature (over the last 25% of the reactor), and 6 ms SMR contact time in the welded ICR device M1.

After about 150 hours of testing the temperature was reduced to ~600° C. and the SMR pressure and load were removed for 8 hours during change out of some of the demonstration equipment required to investigate higher pressure operation and shorter contact times. Surprisingly, after this changeover when the SMR load was re-applied and the pressure increased to 20 bar the SMR approach to equilibrium changed from ~60° C. to about ~35° C. (compare second and third columns in Table 10. It is thought that the pressure cycle may have caused better contact between the wall and the catalyst, since the change was accompanied by a significant increase in the fraction of combustion heat which is absorbed by the SMR reaction. FIG. 35 shows SMR performance data before the pressure cycle, and FIGS. 36-37 show SMR performance data after the pressure cycle.

TABLE 10

| | Selected results from operation of the welded ICR device M1. | | | | |
|---|---|---|---|---|---|
| | $H_2$ fuel only | Before cycling in pressure | After cycling pressure | Lowest S:C, 20 atm | Lowest S:C, NG |
| Time on stream (hours) | 26 | 136 | 168 | 165 | 182 |
| Air inlet gas temperature (° C.) | 159 | 155 | 155 | 155 | 155 |
| Fuel inlet gas temperature (° C.) | 102 | 112 | 113 | 112 | 115 |
| Combustion U-turn gas temp. (° C.) | 787 | 882 | 887 | 892 | 870 |
| Exhaust gas temperature (° C.) | 317 | 363 | 352 | 352 | 354 |
| Air inlet pressure (Pa/$10^5$) | 2.21 | 2.91 | 2.80 | 2.79 | 2.81 |
| Fuel inlet pressure (Pa/$10^5$) | 1.85 | 2.33 | 2.29 | 2.27 | 2.30 |
| Exhaust outlet pressure (Pa/$10^5$) | 1.14 | 1.16 | 1.16 | 1.15 | 1.14 |
| Total fuel flow rate (SLPM) | 3.16 | 3.41 | 3.12 | 3.12 | 3.09 |
| Fuel $H_2$ content (%) | 100 | 85 | 85 | 85 | 85 |
| Fuel $CH_4$ content (%) | 0 | 7 | 7 | 7 | 7 (NG)[c] |
| Fuel $CO_2$ content (%) | 0 | 8 | 8 | 8 | 8 |
| Air flow rate (SLPM) | 7.9 | 11.5 | 10.5 | 10.5 | 10.4 |
| % excess air (based on inlet) | 5 | 25 | 25 | 25 | 25 |
| % excess air (measured) | 2.4 | 24 | 26 | 25 | 26 |
| Combustion contact time (ms)[a] | 5.0 | 3.8 | 4.1 | 4.1 | 4.2 |
| Air pressure drop (Pa/$10^5$) | 1.06 | 1.75 | 1.63 | 1.64 | 1.66 |
| Fuel pressure drop (Pa/$10^5$) | 0.71 | 1.17 | 1.12 | 1.12 | 1.16 |
| Combustion $H_2$ conversion (%) | 87.4 | 99.2 | 99.6 | 99 | 99.3 |
| Combustion $CH_4$ conversion (%) | — | 100 | 100 | 100 | 100 |
| Comb. selectivity to $CO_2$ (%) | — | 72.9 | 76.9 | 74 | 84.4 |
| Comb. (carbon out)/(carbon in) | — | 0.93 | 1.06 | 1.01 | 1.04 |
| Combustion exhaust $NO_x$ (ppm) | 0.4 | 4.4 | 3.5 | 2.9 | 4.6 |
| SMR inlet gas temperature (° C.) | 288 | 288 | 285 | 288 | 286 |
| SMR U-turn gas temp. (° C.) | 762 | 822 | 829 | 934 | 822 |
| SMR outlet gas temperature (° C.) | 295 | 308 | 301 | 302 | 303 |
| SMR inlet pressure (Pa/$10^5$) | 13.59 | 13.83 | 14.04 | 20.31 | 14.32 |
| SMR outlet pressure (Pa/$10^5$) | 11.75 | 12.11 | 12.32 | 19.14 | 12.52 |
| SMR average pressure (Pa/$10^5$) | 12.7 | 13.0 | 13.2 | 19.7 | 13.4 |
| SMR pressure drop (Pa/$10^5$) | 1.8 | 1.7 | 1.7 | 1.2 | 1.8 |
| SMR to comb. differential (Pa/$10^5$) | 11.2 | 11.2 | 11.5 | 18.0 | 11.7 |
| SMR $CH_4$ flow rate (SLPM) | 2.91 | 2.91 | 2.91 | 3.87 | 2.84 (NG)[b] |
| SMR steam flow rate (SLPM) | 5.86 | 5.86 | 5.86 | 4.86 | 5.86 |
| Molar Steam to Methane Ratio | 2.0 | 2.0 | 2.0 | 1.26 | 2.0 |
| SMR contact time (ms) | 6.0 | 6.0 | 6.0 | 6.0 | 6.0 |
| $CH_4$ conversion (GC Basis) (%) | 59.9 | 71.4 | 78.5 | 59.0 | 78.3 |
| Selectivity: CO (%) | 68.7 | 77.3 | 74.1 | 82.8 | 73.4 |
| SMR (carbon out)/(carbon in) | 1.10 | 1.14 | 0.96 | 0.78 | 0.96 |
| Average reactor web temp. (° C.)[e] | 775 | 835 | 843 | 846 | 835 |
| Equilibrium conversion T (° C.) | 760 | 804 | 834 | 846 | 833 |
| Equilibrium selectivity T (° C.) | 807 | 867 | 841 | 872 | 836 |
| SMR rxn. heat/comb. rxn. heat[d] | 0.55 | 0.53 | 0.64 | 0.64 | 0.63 |
| Average area heat flux (W/$cm^2$) | 16.2 | 19.7 | 21.5 | 21.8 | 20.9 |
| Reactor core volumetric flux (W/$cm^3$) | 60.8 | 73.8 | 80.7 | 81.8 | 78.5 |
| Endothermic reaction chamber flux (W/$cm^3$) | 319 | 387 | 424 | 429 | 412 |

TABLE 10-continued

Selected results from operation of the welded ICR device M1.

|  | H₂ fuel only | Before cycling in pressure | After cycling pressure | Lowest S:C, 20 atm | Lowest S:C, NG |
|---|---|---|---|---|---|
| Temperature on skin 109 mm from u-turn, product side (° C.) | 834 | 890 | 897 | 892 | 899 |
| Temperature on skin 163 mm from u-turn, product side (° C.) | 831 | 869 | 863 | 858 | 871 |
| Temperature on skin 173 mm from u-turn, product side (° C.) | 614 | 637 | 633 | 630 | 635 |
| Temperature on skin 368 mm from u-turn, product side (° C.) | 422 | 446 | 438 | 438 | 440 |
| Temperature in web at u-turn (° C.) | 761 | 820 | 827 | 831 | 819 |
| Temperature in web 47 mm from u-turn (° C.) | 789 | 851 | 858 | 861 | 850 |
| Temperature in web 106 mm from u-turn (° C.) | 844 | 911 | 918 | 914 | 914 |
| Temperature in web 141 mm from u-turn (° C.) | 495 | 514 | 513 | 510 | 514 |
| Temperature in web 163 mm from u-turn (° C.) | 838 | 876 | 871 | 865 | 879 |
| Temperature in web 170 mm from u-turn (° C.) | 541 | 508 | 844 | 839 | 849 |
| Temperature in web at u-turn, combustion side (° C.) | 787 | 882 | 887 | 892 | 870 |
| Temperature on skin 109 mm from u-turn, combustion side (° C.) | 858 | 922 | 926 | 921 | 926 |
| Temperature on skin 163 mm from u-turn, combustion side (° C.) | 847 | 884 | 877 | 871 | 886 |
| Temperature on skin 272 mm from u-turn, combustion side (° C.) | 614 | 637 | 634 | 631 | 636 |
| Temperature on skin 368 mm from u-turn, combustion side (° C.) | 438 | 462 | 457 | 456 | 459 |
| Temperature on skin 496 mm from u-turn, combustion side (° C.) | 256 | 272 | 268 | 267 | 269 |

[a]Combustion contact time is estimated assuming that all fuel and air pass through the entire fuel channel and that combustion only occurs in the region upstream of the U-turn.
[b]Natural gas, with approximate composition of 95.8% methane, 2.3% ethane, 0.3% propane, 0.1% butane, 1.5% inerts.
[c]Average metal temperature over last quarter of reaction zone.
[d]Absolute value of ratio of isothermal heats of reaction (at estimated reaction temperatures), based on measured conversions and flow rates.

Some error was found to be associated with dry product exit flow measurements due to changes in the dry test meter calibration, thought to be due to water accumulation in the test meter. This, combined with minor errors in mass flow controller and GC calibrations, contributed to carbon balance errors in the range of ±12%.

Welded ICR-M2
Installation/Startup

The installation of M2 follows the same procedure as M1 with the following exceptions:

The system was pressure tested at 300 psig on the SMR process side and 60 psig on the combustion side.

The SMR process inlet was heated to 230 to 300 C.

The combustion primary air inlet preheat was 150 C to 170 C initially, but at approximately 25 hours on stream the preheat was lost, reducing the primary air inlet temperature to 30 to 40 C with no apparent change in performance of the combustion side or the SMR process side.

The combustion side fuel inlet was preheated to 60 to 95 C.

The combustion side catalyst was not reduced. It was used without reduction, and lit-off at roughly 50 C.

The combustion side light-off was achieved using a fuel rich condition, which was tested to determine if fuel rich or fuel lean combustion reactant feeds offered better startup control.

The combustion fluids were initiated in the following manner to achieve proper temperatures for SMR catalyst reduction. The SMR catalyst reduction temperature was roughly 120 to 150 C. The ICR reactor system was preheated by using the integrated combustion portion of the reactor. The process was initiated by increasing SMR side nitrogen flowrate 2.5 SLPM, and the hydrogen flow to 250 sccm. Both nitrogen and the 10% hydrogen were left on during the heatup of the ICR reactor system and one hour reduction time for the SMR. This corresponds to a contact time of 19 milliseconds, and the contact time was not allowed to exceed 20 milliseconds during reduction. Nitrogen was then fed to the combustion side through the primary air inlet at roughly 1.0 SLPM, and the fuel inlet line at roughly 500 sccm. The air was then blended with the primary air line nitrogen and fed at a rate of 1.5 sccm. Then the hydrogen was started on the combustion fuel inlet at a flowrate of 600 sccm. The hydrogen lit off at roughly 50 C. The heat released from combustion heats the ICR reactor system. The heat up rate was roughly 5 C/minute. Startup control was important for appropriate catalyst reduction to achieve a near isothermal (+/−30 C) temperature distribution along the length of the 7 inch catalyst section in the ICR reactor system. Control was achieved by varying the flowrates of the hydrogen and air concurrently while keeping them at a 1.2:1 ratio which corresponds to ~50% excess air. Increases in the fuel and air flowrates were offset by reductions in the fuel and primary air line nitrogen flowrates, respectively, to maintain a constant flowrate to the combustion side of the ICR reactor system. It was important to maintain a roughly equal total flowrate of fluids in the combustion side during startup to create a uniform temperature profile. If the combustion fluids flowrates drops by 50% or greater, then the front of the catalyst section becomes much hotter than the end of the catalyst section (+/−60 C or higher). If the flowrate of the combustion fluids increases by 50% or greater then the back end of the catalyst section becomes much hotter than the front end of the catalyst section (+/−60 C or higher). In both scenarios, the catalyst does not properly reduce. Once the ICR reactor system reaches 120 to 150 C, the one hour reduction time begins. Following the one hour SMR reduction time, the device is heated as described in M1. System operating pressure was both 160-170 psig and 260-270 psig at the SMR process outlet and was changed between alternatively.

Results

The welded ICR device M2 was successfully operated over a wide range of process conditions, including 12-20.5 bar average SMR pressure, 3.8-18 ms SMR contact time (947000-200000 $hr^{-1}$ GHSV), and steam-to-carbon ratios from 6:1 to 2:1, yielding 825-870° C. equilibrium performance. Combustion performance was evaluated using hydrogen fuel, and hydrogen/hydrocarbon fuel mixtures containing 5-7% $CH_4$ or natural gas and 8% $CO_2$. In addition, combustion performance using 5-10% excess air was shown. In all, the reactor was operated continuously for over 350 hours with no decrease in process performance.

The welded ICR device M2 was designed with 12 jets per channel (versus 9 in welded ICR device M1) with the last jet only 33 mm from the end of the reaction channel. The increased number of jets reduced the observed combustion air pressure drop relative to the 9 jet design. The jets were also more uniformly spread out over the length of the reaction zone, producing a more uniform temperature gradient in the reactor and better SMR performance at a given reactor temperature.

Figure 38:
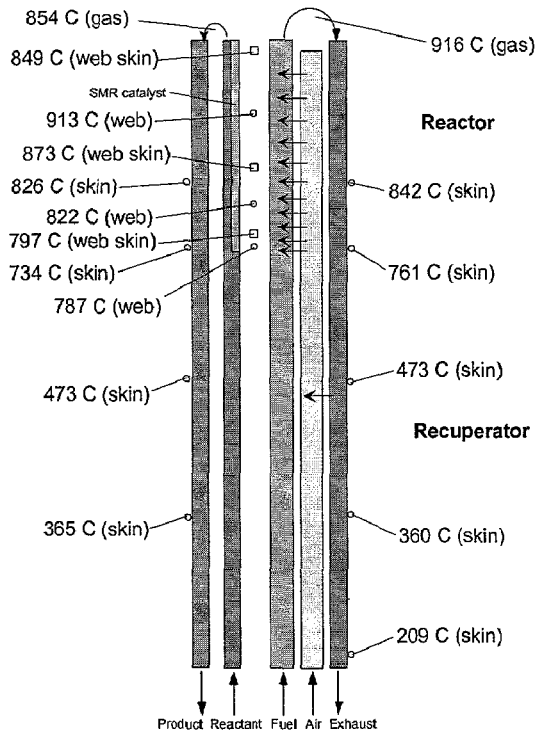
FIG. 38 shows a typical temperature profile for the welded ICR device M2 (not to scale) showing relative thermocouple placement and a typical measured thermal profile. Reactor conditions were 13 bar SMR, 2:1 steam:C, 6 ms contact time, combustion fuel composition of 89% H2, 5% CH4, 6% CO2, and 5% excess combustion air. Web temperatures were measured inside thermowells in the metal web between the SMR and combustion flows and skin temperatures were taken from thermocouples taped to the device exterior beneath the insulation.
Figure 39:
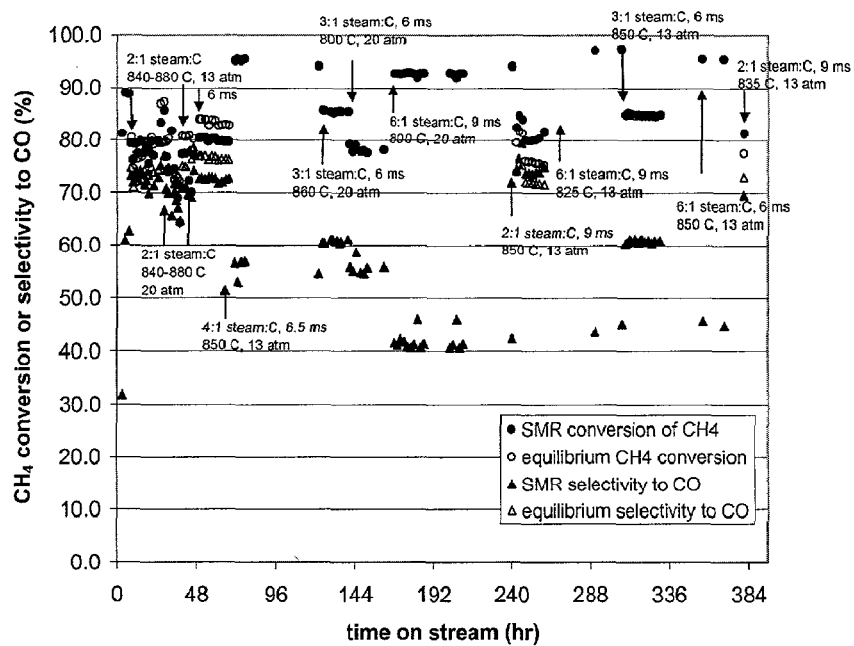
FIG. 39 shows a measured SMR methane conversion and selectivity to CO over the first 200 hours of operation of the welded ICR device M2.
Figure 40:
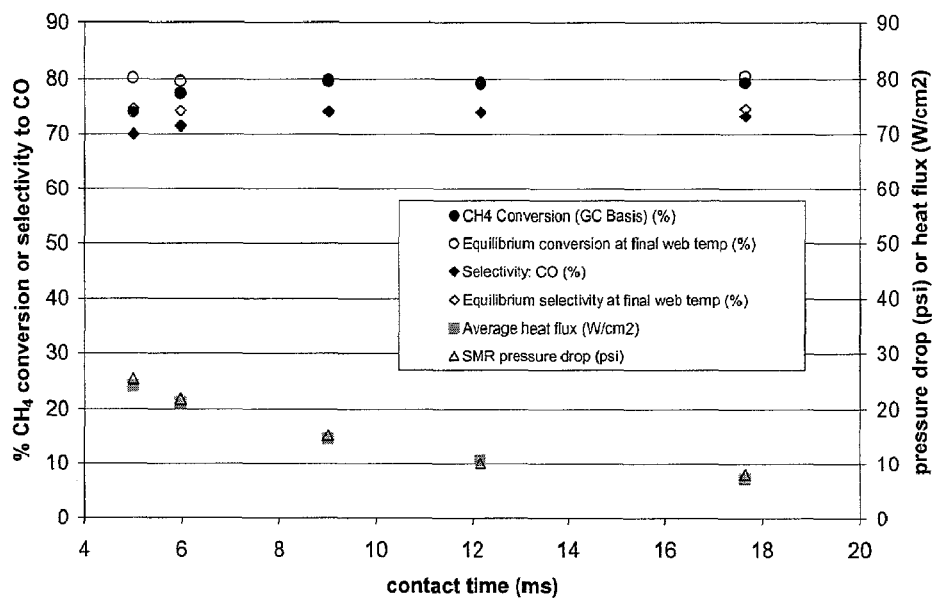
FIG. 40 shows a comparison of measured SMR methane conversion and selectivity to CO at 13 bar, 850° C., and 2:1 steam:C with equilibrium values predicted at the measured average web temperature in the welded ICR device M2. Also shown are the measured SMR pressure drop and the average reactor heat flux, based on the SMR heat of reaction.
Figure 41:
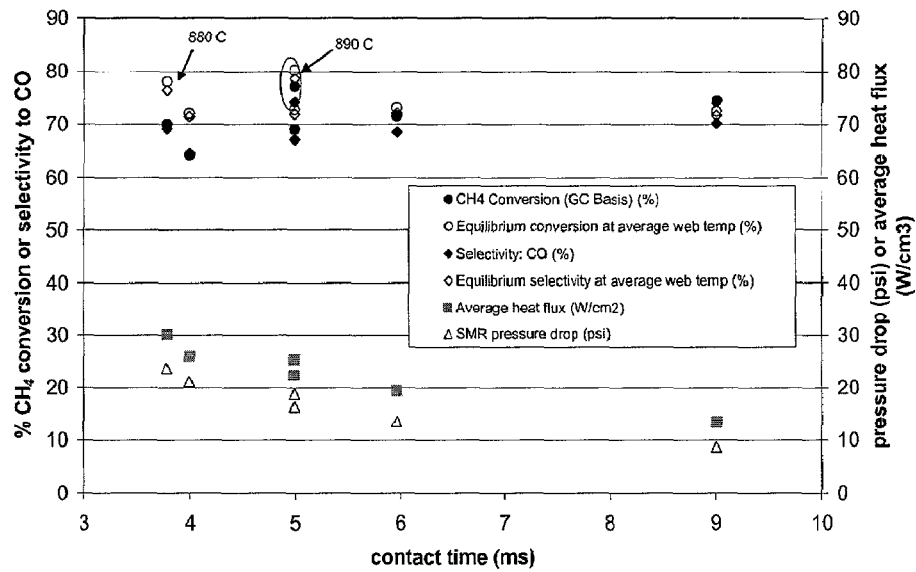
FIG. 41 shows a comparison of measured SMR methane conversion and selectivity to CO at ~20 bar, 850° C., and 2:1 steam:C with equilibrium values predicted at the measured average web temperature in the final 44 mm of the welded ICR device M2. Note that for two of the conditions, the web temperatures were 880 and 890° C., as indicated. Also shown are the measured SMR pressure drop and the average reactor heat flux, based on the SMR heat of reaction.
Figure 42:
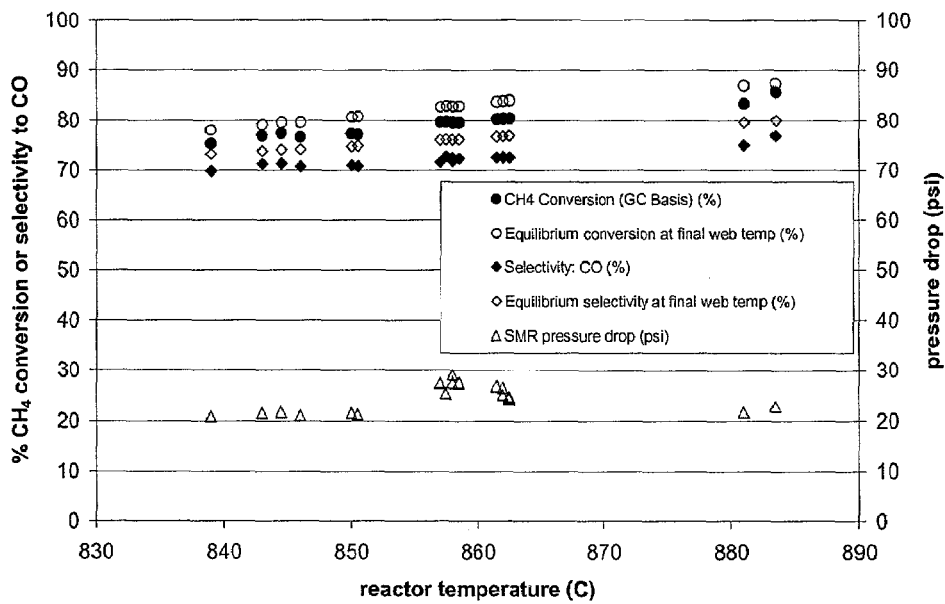
FIG. 42 shows a comparison of measured SMR methane conversion and selectivity to CO at 13 bar, 6 ms SMR contact time, and 2:1 steam:C with equilibrium values corresponding to the measured average web temperature in the final 44 mm of the reaction zone of welded ICR M2. Also shown are the measured SMR pressure drop and the average reactor heat flux, based on the SMR heat of reaction.

The detailed results of a few selected tests using the welded ICR device M2 are shown in Table 11. In Table 11 it can be seen that essentially complete hydrogen combustion was achieved in this reactor with only 5% excess combustion air. $NO_x$ levels in the dry combustion effluent were consistently below 2 ppm, and never exceeded 5 ppm. The results in Table 11 also include volumetric fluxes of 112-116 W/cc, reached during operation of the welded ICR device M2 at 2:1 steam:C and pressures (average) of 18-20.5 bar while producing syngas equilibrated at 830-840° C. The corresponding SMR space velocity for these performance data is 947000 $hr^{-1}$ (3.8 ms contact time). SMR performance is also excellent at longer SMR contact times, most notably at 5 ms and 21 bar (2:1 steam:C), for which syngas was produced with an equilibrium composition corresponding to an apparent temperature of 870° C. A typical temperature profile for the welded ICR device M2 is shown in FIG. 38.

Other performance data for the welded ICR device M2 are shown in FIGS. 39-42. The SMR reactor performed as an equilibrium reactor for SMR contact times as low as 5 ms, both at 13 bar (FIGS. 40) and 20 bar (FIG. 41) The equilibrium approach temperature appears to begin to diverge from the measured final web temperature as SMR contact time is decreased below 6 ms (FIGS. 40-41) for this device. These results show the effectiveness of distributed air combustion in obtaining high area heat fluxes (15-31 $W/cm^2$) while avoiding hot spots and SMR catalyst deactivation.

TABLE 11

Selected results from operation of the welded ICR device M2.

|  | $H_2$ fuel only | Low P, low XS air | Highest flux | High P high flux | High P highest T |
|---|---|---|---|---|---|
| Time on stream (hours) | 19 | 26 | 43 | 45 | 46 |
| Air inlet gas temperature (° C.) | 150 | 95 | 32 | 32 | 31 |
| Fuel inlet gas temperature (° C.) | 74 | 67 | 60 | 59 | 60 |
| Combustion U-turn gas temp. (° C.) | 878 | 920 | 955 | 947 | 945 |
| Exhaust gas temperature (° C.) | 286 | 298 | 346 | 342 | 316 |
| Air inlet pressure ($Pa/10^5$) | 2.05 | 2.34 | 2.97 | 2.92 | 2.70 |
| Fuel inlet pressure ($Pa/10^5$) | 1.78 | 2.03 | 2.50 | 2.46 | 2.30 |
| Exhaust outlet pressure ($Pa/10^5$) | 1.19 | 1.20 | 1.27 | 1.28 | 1.25 |
| Total fuel flow rate (SLPM) | 2.90 | 3.52 | 4.82 | 4.68 | 4.08 |
| Fuel $H_2$ content (%) | 100 | 89 | 87 | 87 | 87 |
| Fuel $CH_4$ content (%) | 0 | 5 | 7 | 7 | 7.0 |
| Fuel $CO_2$ content (%) | 0 | 6 | 6 | 6 | 6.0 |
| Air flow rate (SLPM) | 7.26 | 9.6 | 14.5 | 14.1 | 12.3 |
| % excess air (based on inlet) | 5 | 5 | 10 | 10 | 10 |
| % excess air (measured) | 7 | 5 | 5 | 5 | 5 |
| Combustion contact time (ms)$^a$ | 5.4 | 4.2 | 2.9 | 2.9 | 3.4 |
| Air pressure drop ($Pa/10^5$) | 0.85 | 1.14 | 1.70 | 1.65 | 1.45 |
| Fuel pressure drop ($Pa/10^5$) | 0.59 | 0.83 | 1.23 | 1.19 | 1.05 |
| Combustion $H_2$ conversion (%) | 99.7 | 99.8 | 99.5 | 99.5 | 99.6 |
| Combustion $CH_4$ conversion (%) | — | 41.4 | 34.0 | 25.3 | 34.7 |
| Comb. selectivity to $CO_2$ (%) | — | 84.0 | 55.0 | 35.2 | 66.9 |
| Comb. (carbon out)/(carbon in) | — | 0.936 | 0.86 | 0.85 | 1.13 |
| Combustion exhaust NOx (ppm) | 0.7 | 0.8 | 1.9 | 1.0 | 1.8 |
| SMR inlet gas temperature (° C.) | 258 | 239 | 265 | 266 | 249 |
| SMR U-turn gas temp. (° C.) | 813 | 856 | 859 | 859 | 874 |

TABLE 11-continued

Selected results from operation of the welded ICR device M2.

|  | H₂ fuel only | Low P, low XS air | Highest flux | High P high flux | High P highest T |
|---|---|---|---|---|---|
| SMR outlet gas temperature (° C.) | 277 | 266 | 294 | 294 | 270 |
| SMR inlet pressure (Pa/10⁵) | 14.04 | 14.18 | 19.00 | 21.35 | 20.93 |
| SMR outlet pressure (Pa/10⁵) | 12.59 | 12.66 | 17.00 | 19.69 | 19.62 |
| SMR average pressure (Pa/10⁵) | 13.3 | 13.4 | 18.0 | 20.5 | 20.3 |
| SMR pressure drop (Pa/10⁵) | 1.4 | 1.5 | 2.0 | 1.7 | 1.3 |
| SMR to comb. differential (Pa/10⁵) | 11.8 | 11.8 | 16.1 | 18.7 | 18.5 |
| SMR CH₄ flow rate (SLPM) | 2.91 | 2.91 | 4.59 | 4.59 | 3.49 |
| SMR steam flow rate (SLPM) | 5.86 | 5.86 | 9.23 | 9.23 | 6.98 |
| Molar Steam to Methane Ratio | 2.0 | 2.0 | 2.0 | 2.0 | 2.0 |
| SMR contact time (ms) | 6.0 | 6.0 | 3.8 | 3.8 | 5.0 |
| CH₄ conversion (GC Basis) (%) | 75.3 | 83.4 | 72.1 | 70.0 | 77.0 |
| Selectivity: CO (%) | 69.8 | 75.0 | 69.5 | 69.0 | 74.1 |
| SMR (carbon out)/(carbon in) | 1.17 | 0.86 | 1.10 | 1.10 | 1.16 |
| Average reactor web temp. (° C.)[b] | 839 | 881 | 881 | 879 | 890 |
| Equilibrium conversion T (° C.) | 825 | 863 | 838 | 841 | 871 |
| Equilibrium selectivity T (° C.) | 816 | 851 | 831 | 836 | 869 |
| SMR rxn. heat/comb. rxn. heat[c] | 0.660 | 0.646 | 0.645 | 0.652 | 0.623 |
| Average heat flux (W/cm²) | 20.5 | 22.9 | 31.0 | 30.1 | 25.4 |
| Reactor core volumetric flux (W/cm³) | 76.9 | 86.0 | 116.3 | 112.7 | 95.1 |
| Endothermic reaction chamber flux (W/cm³) | 404 | 452 | 611 | 592 | 499 |
| Temperature in web at u-turn (° C.) | 849 | 808 | 849 | 859 | 858 |
| Temperature in web 44 mm from u-turn (° C.) | 913 | 870 | 913 | 903 | 899 |
| Temperature in web 104 mm from u-turn (° C.) | 877 | 828 | 877 | 887 | 884 |
| Temperature in web 110 mm from u-turn (° C.) | 873 | 825 | 873 | 886 | 882 |
| Temperature in web 137 mm from u-turn (° C.) | 838 | 800 | 838 | 858 | 855 |
| Temperature in web 143 mm from u-turn (° C.) | 822 | 795 | 822 | 845 | 841 |
| Temperature in web 161 mm from u-turn (° C.) | 797 | 768 | 797 | 816 | 813 |
| Temperature in web 170 mm from u-turn (° C.) | 787 | 769 | 787 | 800 | 797 |
| Temperature in skin 110 mm from u-turn, combustion side (° C.) | 842 | 802 | 842 | 864 | 861 |
| Temperature in skin 178 mm from u-turn, combustion side (° C.) | 761 | 735 | 761 | 777 | 775 |
| Temperature in skin 260 mm from u-turn, combustion side (° C.) | 473 | 468 | 473 | 491 | 491 |
| Temperature in skin 374 mm from u-turn, combustion side (° C.) | 360 | 364 | 360 | 379 | 379 |
| Temperature in skin 504 mm from u-turn, combustion side (° C.) | 209 | 219 | 209 | 216 | 215 |

[a]Combustion contact time is estimated assuming that all fuel and air pass through the entire fuel channel and that combustion only occurs in the region upstream of the U-turn.
[b]Average metal temperature over last quarter of reaction zone.
[c]Absolute value of ratio of isothermal heats of reaction (at estimated reaction temperatures), based on measured conversions and flow rates.

We claim:

1. An integrated reactor, comprising: an exothermic microchannel comprising an exothermic reaction catalyst; an endothermic reaction microchannel adjacent the exothermic microchannel and comprising an endothermic reaction catalyst, the endothermic reaction catalyst having a length, in the direction of flow, of at least 10 cm; and a wall separating the exothermic reaction catalyst and the endothermic reaction catalyst; wherein a gap of at least 0.2 mm exists between a wall of the endothermic reaction microchannel and a surface of the endothermic reaction catalyst; wherein the endothermic reaction catalyst has a length of at least 17 cm.

2. The integrated reactor of claim 1 wherein the endothermic reaction microchannel has a height (the dimension perpendicular to flow and defining the shortest distance from the center of the endothermic reaction microchannel to the exothermic microchannel) of 0.5 mm or less.

3. The integrated reactor of claim 1 wherein the endothermic reaction catalyst is a catalyst insert and wherein spacers press the catalyst against the wall separating the exothermic reaction catalyst and the endothermic reaction catalyst.

4. The integrated reactor of claim 1 wherein the wall separating the exothermic and endothermic reaction catalysts is comprised of a nickel-based alloy.

5. The integrated reactor of 1 wherein the endothermic reaction microchannel comprises an endothermic reaction chamber having a height and/or width of about 2 mm or less.

6. The integrated reactor of 1 wherein the endothermic reaction catalyst comprises a steam reforming catalyst.

7. The integrated reactor of claim 1 wherein the endothermic reaction catalyst comprises a steam reforming catalyst, and wherein the exothermic reaction catalyst comprises a combustion catalyst.

8. An integrated reactor, comprising: an exothermic microchannel comprising an exothermic reaction catalyst; an endothermic reaction microchannel adjacent the exothermic microchannel and comprising an endothermic reaction catalyst, the endothermic reaction catalyst having a length, in the direction of flow, of at least 10 cm; and a wall separating the exothermic reaction catalyst and the endothermic reaction catalyst; wherein at least one wall defining the exothermic microchannel contains apertures connecting gas flow between the exothermic microchannel and an adjacent oxidant channel.

9. The integrated reactor of claim 8 wherein the exothermic reaction catalyst is a combustion catalyst.

10. The integrated reactor of claim 8 wherein the exothermic microchannel comprises a combustion chamber.

11. The integrated reactor of claim 10 wherein an exhaust chamber is located downstream of the combustion chamber and wherein the exhaust chamber comprises a combustion catalyst; and wherein the endothermic reaction catalyst is a steam reforming catalyst and wherein the endothermic reaction microchannel does not have a catalyst downstream of the steam reforming catalyst.

12. The integrated reactor of claim 8 wherein the endothermic reaction catalyst is a catalyst insert.

13. The integrated reactor of claim 8 wherein the endothermic reaction catalyst has a length of at least 17 cm.

14. The integrated reactor of claim 8 wherein the exothermic microchannel comprises a partial oxidation reaction chamber comprising a partial oxidation catalyst followed by a combustion chamber.

15. The integrated reactor of claim 8 comprising two exothermic microchannels that each have a u-bend and that merge into a single exhaust channel after the u-bend.

16. The integrated reactor of claim 8 comprising a flow stabilization feature disposed upstream of the first of the apertures.

17. The integrated reactor of claim 16 wherein the flow stabilization feature comprises a porous insert.

18. The integrated reactor of claim 8 wherein the endothermic reaction catalyst comprises a steam reforming catalyst.

* * * * *